(12) United States Patent
Sato et al.

(10) Patent No.: US 7,706,918 B2
(45) Date of Patent: Apr. 27, 2010

(54) ARTICLE HOLDING SYSTEM, ROBOT, AND METHOD OF CONTROLLING ROBOT

(75) Inventors: Satoshi Sato, Osaka (JP); Masamichi Nakagawa, Osaka (JP); Kunio Nobori, Osaka (JP); Mikiya Nakata, Nara (JP); Kenji Kondo, Kyoto (JP)

(73) Assignee: Panasonic Corporation, Osaka (JP)

( * ) Notice: Subject to any disclaimer, the term of this patent is extended or adjusted under 35 U.S.C. 154(b) by 444 days.

(21) Appl. No.: 11/653,470

(22) Filed: Jan. 12, 2007

(65) Prior Publication Data

US 2007/0239315 A1 Oct. 11, 2007

Related U.S. Application Data

(63) Continuation of application No. PCT/JP2005/012915, filed on Jul. 13, 2005.

(30) Foreign Application Priority Data

Jul. 13, 2004 (JP) ............... 2004-206032

(51) Int. Cl.
*B25J 15/00* (2006.01)
(52) U.S. Cl. .................... 700/245; 318/568.1
(58) Field of Classification Search ............ 700/247, 700/248, 250, 251, 252, 253, 254, 255, 257, 700/259, 260, 262, 264, 246; 318/568.1, 318/568.11, 568.12, 568.14, 568.17; 901/1, 901/2, 4, 43, 47
See application file for complete search history.

(56) References Cited

U.S. PATENT DOCUMENTS

| | | | | |
|---|---|---|---|---|
| 5,845,048 | A * | 12/1998 | Masumoto | .................. 706/20 |
| 6,968,081 | B1 * | 11/2005 | Judson et al. | ............... 382/157 |
| 7,177,459 | B1 * | 2/2007 | Watanabe et al. | .......... 382/151 |
| 2003/0156493 | A1 | 8/2003 | Bayer | |
| 2004/0086368 | A1 * | 5/2004 | Downs et al. | ............... 414/741 |
| 2005/0218679 | A1 | 10/2005 | Yokoyama et al. | |

FOREIGN PATENT DOCUMENTS

| | | |
|---|---|---|
| JP | 64-002882 | 1/1989 |
| JP | 3-92045 | 4/1991 |
| JP | 1976349 | 7/1994 |
| JP | 6-63291 | 9/1994 |
| JP | 8-132379 | 5/1996 |
| JP | 09-267276 | 10/1997 |
| JP | 2710856 | 10/1997 |
| JP | 2001-096484 | 4/2001 |
| JP | 2002-215665 | 8/2002 |
| JP | 2002-267599 | 9/2002 |
| JP | 2004-090099 | 3/2004 |
| JP | 2004-188533 | 7/2004 |
| WO | WO-2004-000508 | 12/2003 |

* cited by examiner

*Primary Examiner*—Dalena Tran
(74) *Attorney, Agent, or Firm*—Harness, Dickey & Pierce, P.L.C.

(57) ABSTRACT

An article holding system includes a recognizing device for recognizing the state of the holding object, a holding method specifying means for specifying the holding method according to the state recognized by the recognizing device, and a holding device for holding the holding object according to the holding method specified by the holding method specifying means.

20 Claims, 51 Drawing Sheets

OBJECT : GLASS

| STATE | HOLDING METHOD |
|---|---|
| WITH CONTENT | • FINGER TYPE HAND<br>• REQUIRE ORIENTATION CONTROL |
| WITHOUT CONTENT | • SUCTION HAND<br>• NOT REQUIRE ORIENTATION CONTROL |

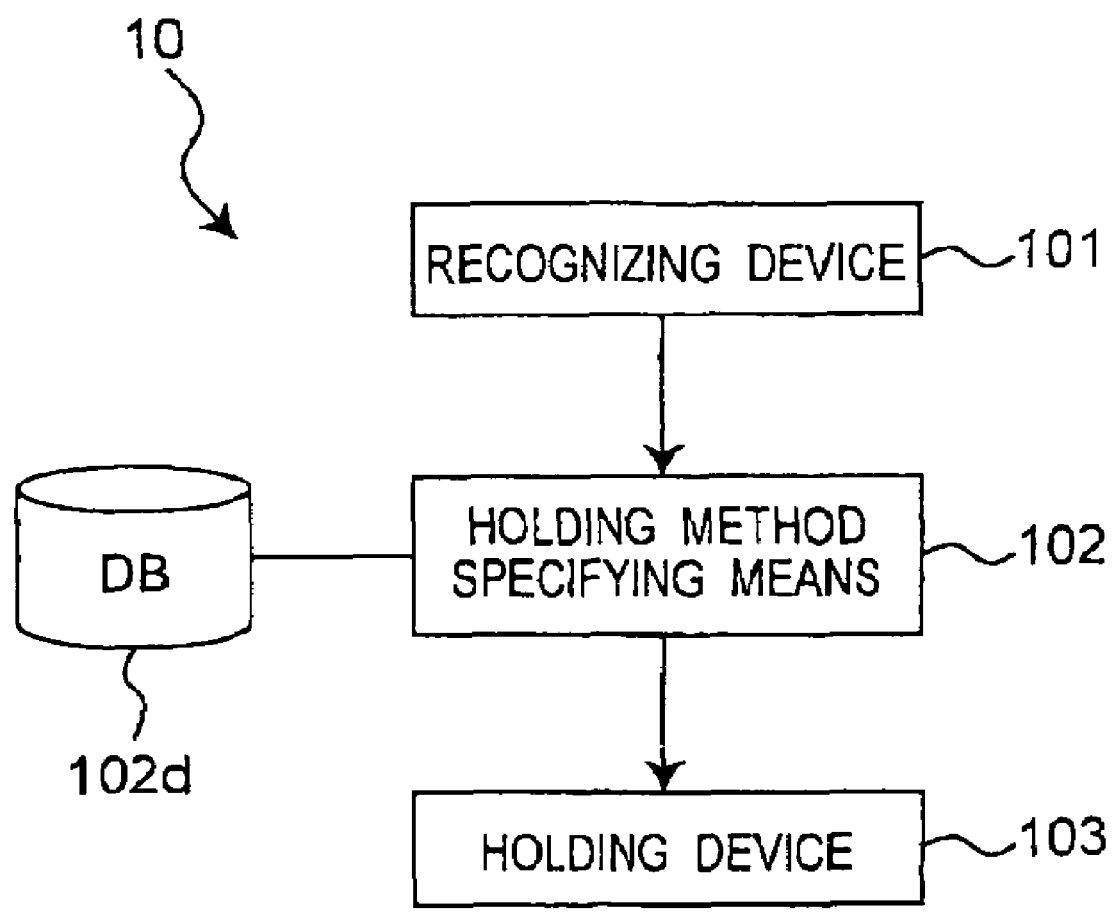

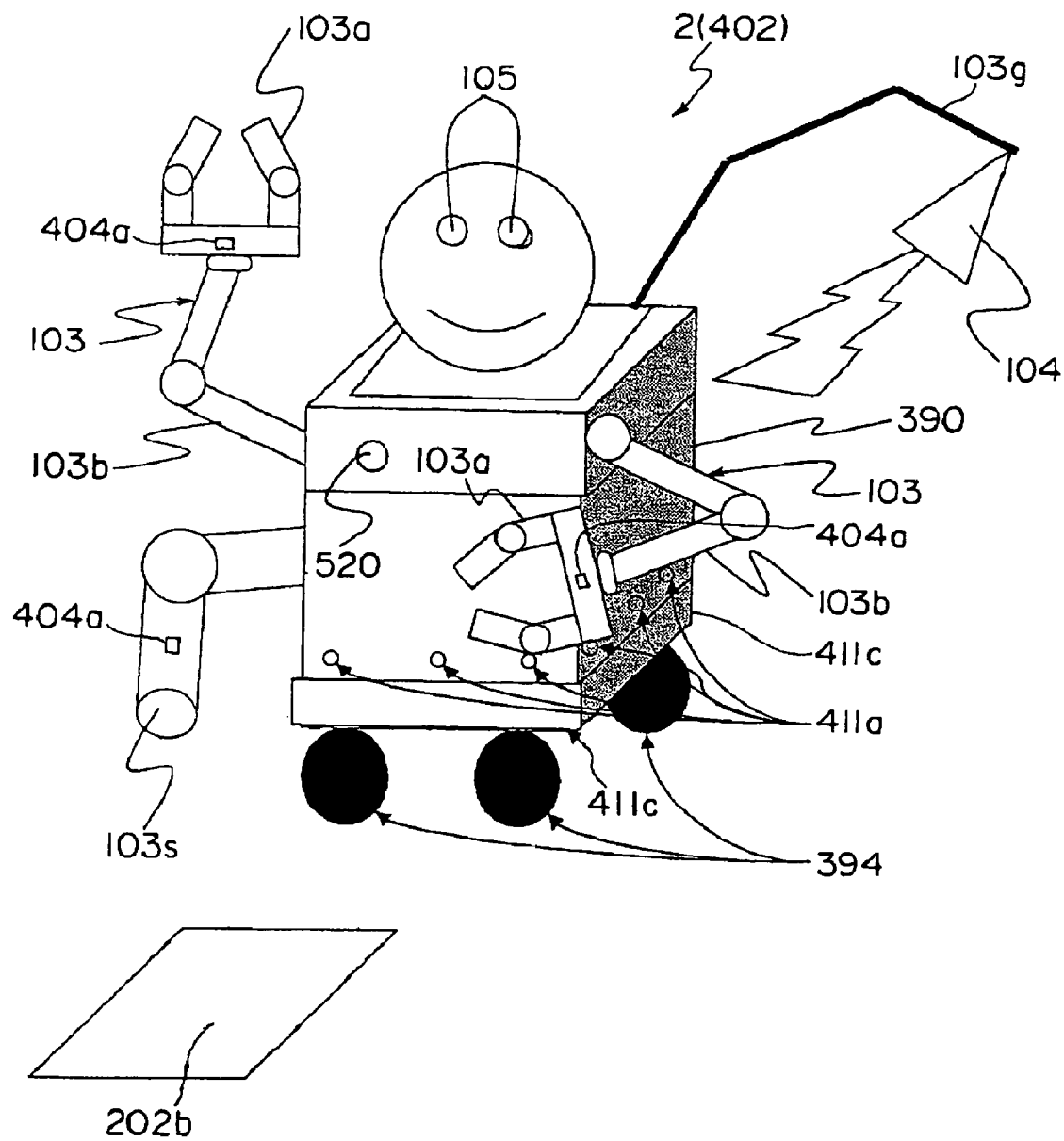

Fig. 2D
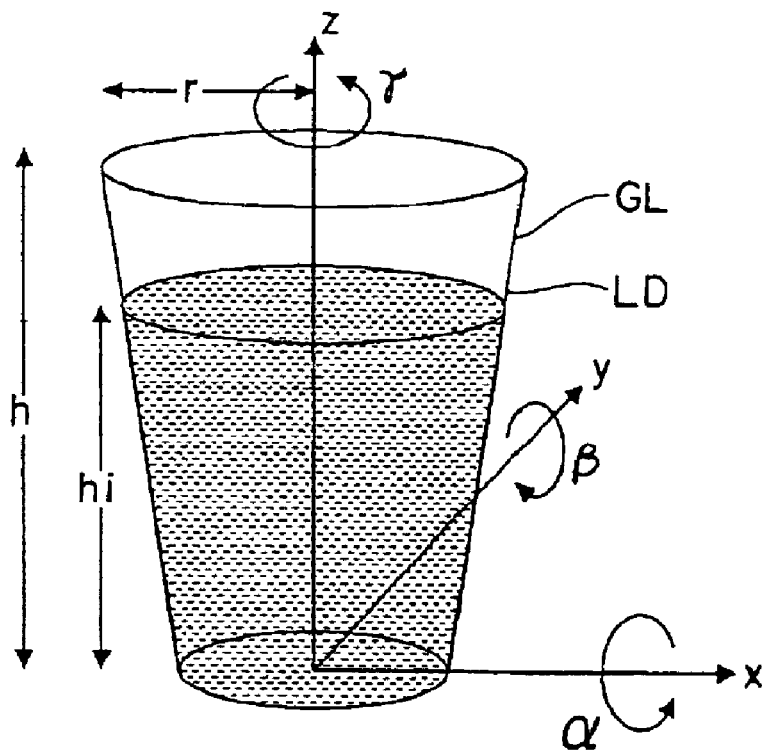
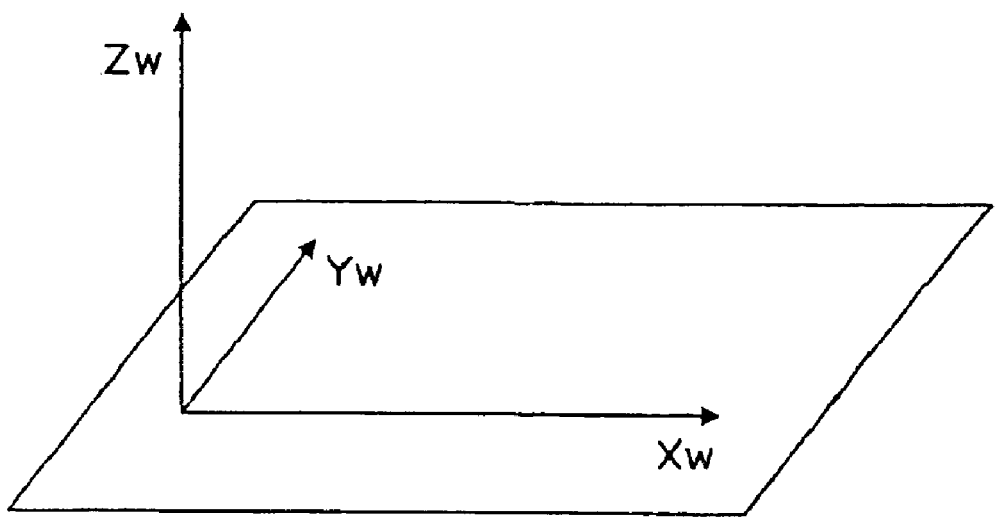

Fig.2E

| HOLDING LEVEL | ACCEPTABLE VARIATION RANGE (deg) |
|---|---|
| Level 5 | NOT CONVEYABLE |
| Level 4 | < 1.0 |
| Level 3 | < 3.0 |
| Level 2 | < 5.0 |
| Level 1 | NO ORIENTATION CONTROL |

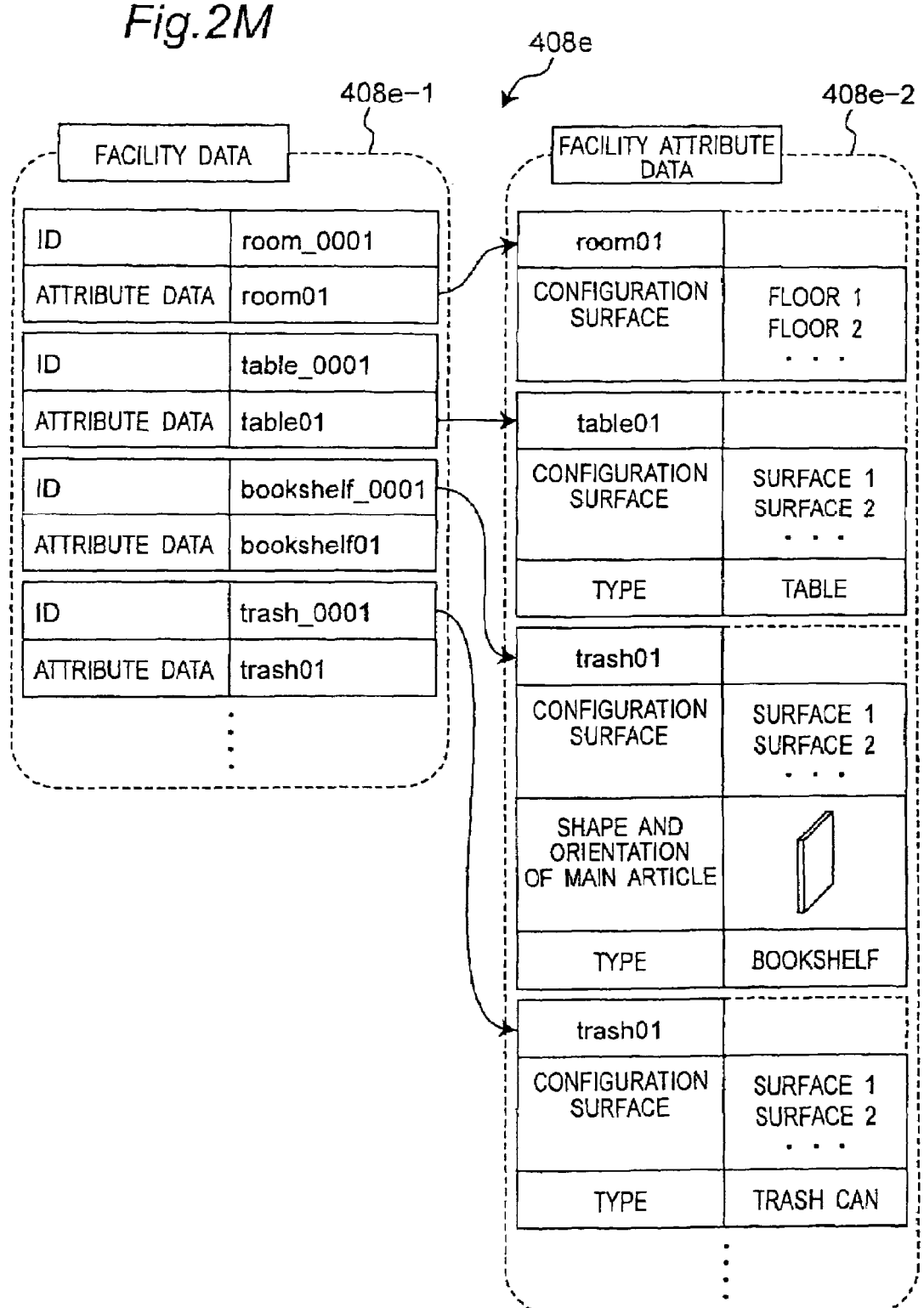

*Fig.3A*
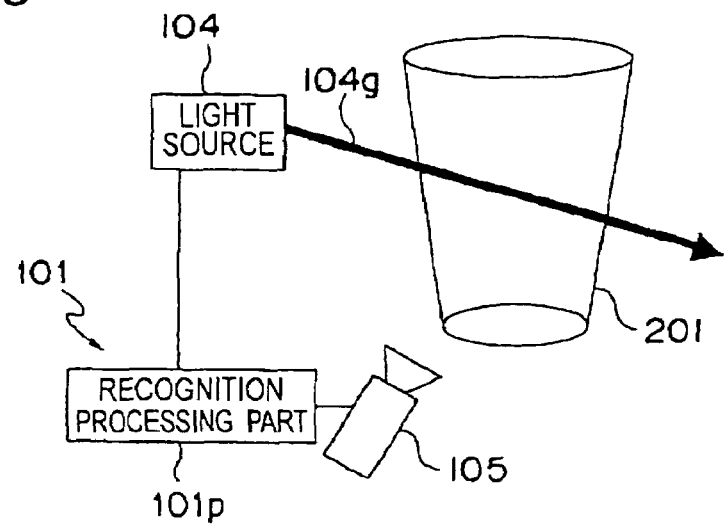
*Fig.3B*
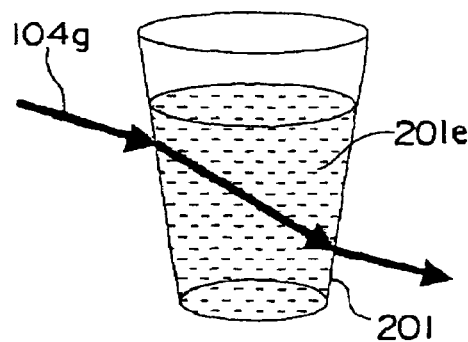
*Fig.4A*
OBJECT : GLASS
| STATE | HOLDING METHOD |
|---|---|
| WITH CONTENT | · FINGER TYPE HAND<br>· REQUIRE ORIENTATION CONTROL |
| WITHOUT CONTENT | · SUCTION HAND<br>· NOT REQUIRE ORIENTATION CONTROL |

| FINGER TYPE HAND | PINCH WITH SINGLE ARM<br>SANDWICH WITH BOTH ARMS |
|---|---|
| SUCTION HAND | SUCK |
| SUCTION HAND & FINGER TYPE HAND | PINCH WITH SINGLE ARM AFTER SUCTION,<br>SANDWICH WITH BOTH ARMS AFTER SUCTION,<br>PLACE ON BOTH ARMS,<br>AND PRESS DOWN WITH SUCTION HAND |

Fig. 6
OBJECT: PAPER
| STATE | HOLDING METHOD |
|---|---|
|  |  103s |
|  | 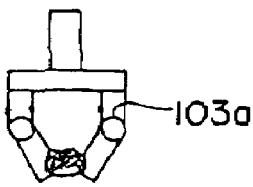 103a |
| 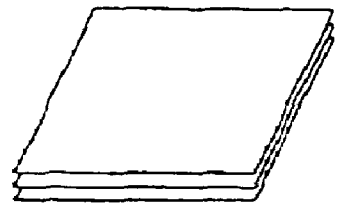 | 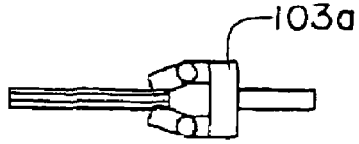 103a |

Fig.7
OBJECT : CLOTHES
| STATE | MOST SUITABLE HOLDING METHOD |
|---|---|
| 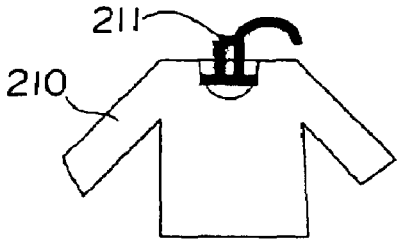 | 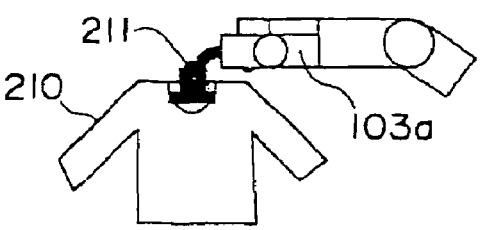 |
| 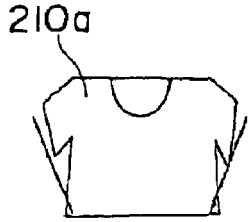 | 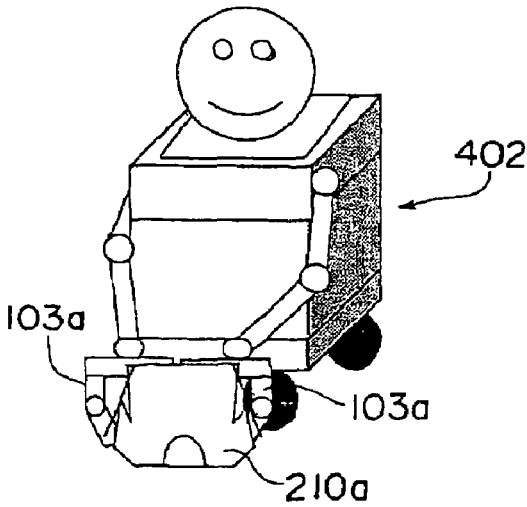 |
| 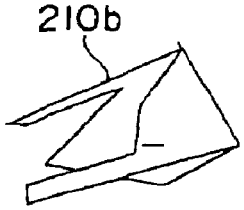 | 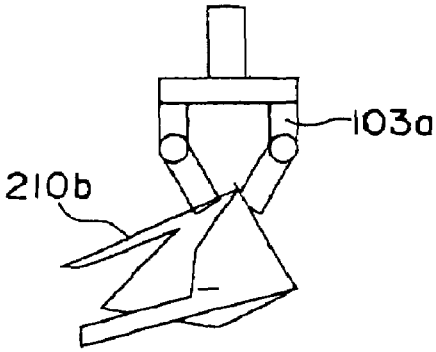 |

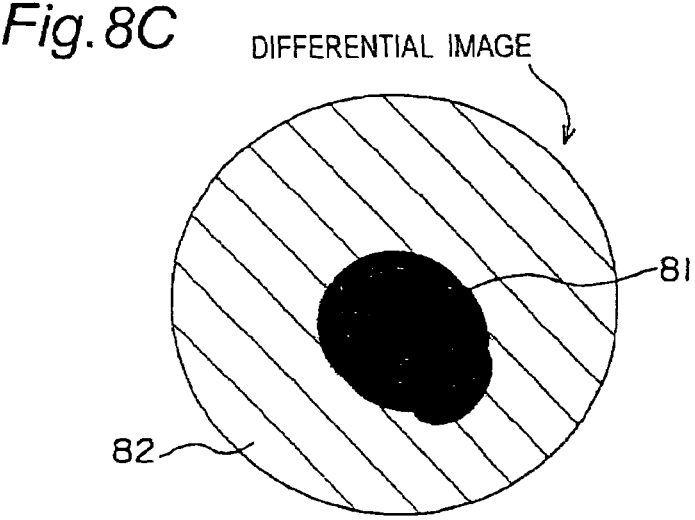
Fig. 8C  DIFFERENTIAL IMAGE
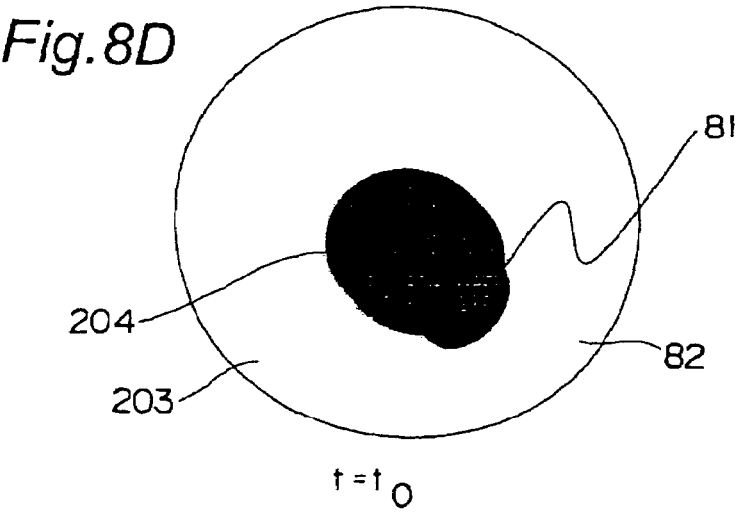
Fig. 8D
$t = t_0$
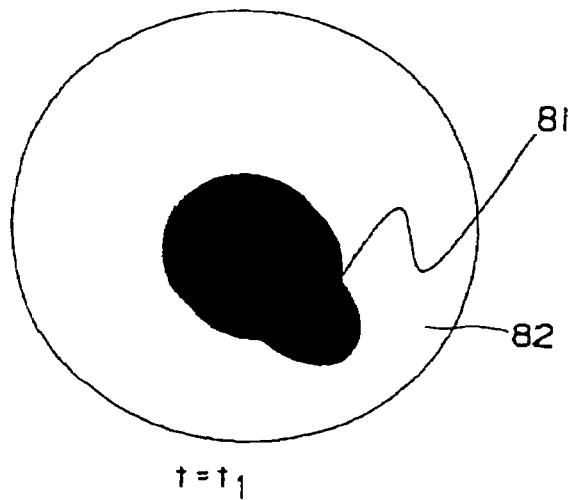
Fig. 8E
$t = t_1$

DIFFERENTIAL REGION

| STATE | HOLDING METHOD |
|---|---|
| REGION WITH DIFFERENCE | HOLDABLE REGION |
| REGION WITHOUT DIFFERENCE | NON-HOLDABLE REGION |

Fig. 1 2 A
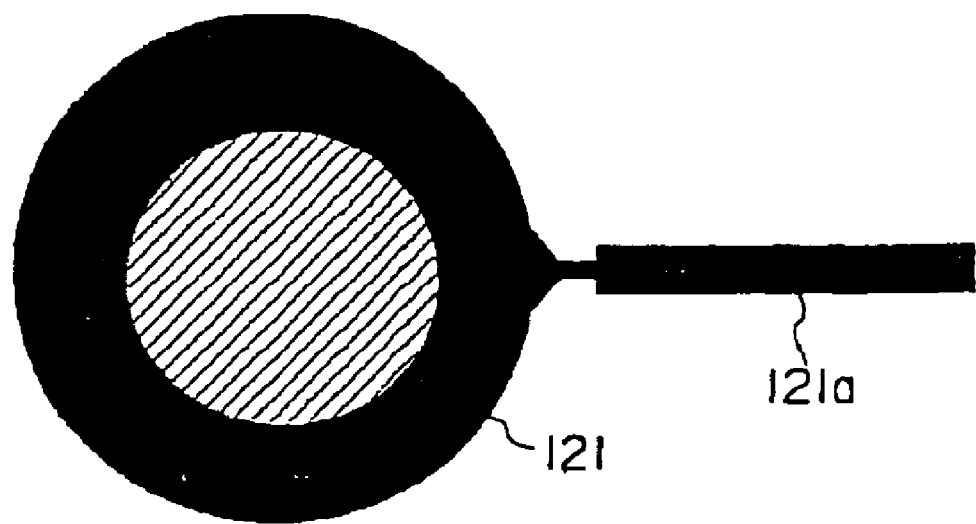

*Fig.12B*
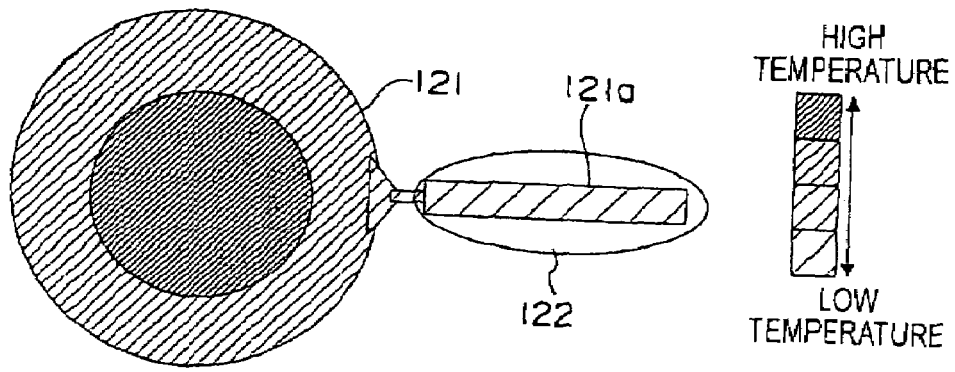
*Fig.12C*
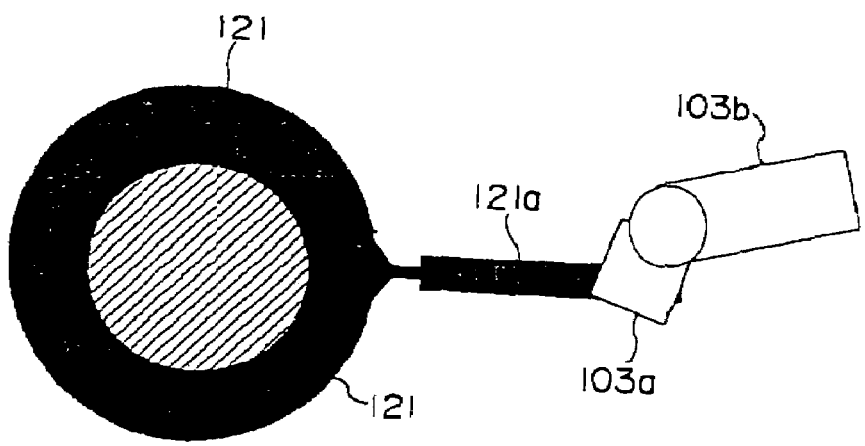
*Fig.12D*
| STATE | HOLDING METHOD |
|---|---|
| $T \leq Th\_TH$ | HOLDABLE REGION |
| $T > Th\_TH$ | NON-HOLDABLE REGION |

Fig.12E
| STATE | HOLDING METHOD |
|---|---|
| $t < Th_{TL}$ | • REQUIRE ORIENTATION CONTROL<br>• HIGH MOVEMENT SPEED |
| $Th_{TL} \leq t < Th_{TH}$ | • REQUIRE ORIENTATION CONTROL<br>• LOW MOVEMENT SPEED |
| $t \geq Th_{TH}$ | • CANNOT BE HELD |
Fig.12F
| STATE | HOLDING METHOD |
|---|---|
| REMOVAL FROM PORTABLE GAS STOVE WITHIN 30 MINUTES | 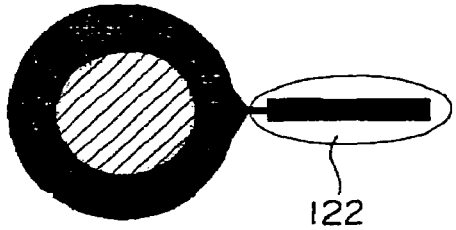 122 |
| OTHER THAN ABOVE | 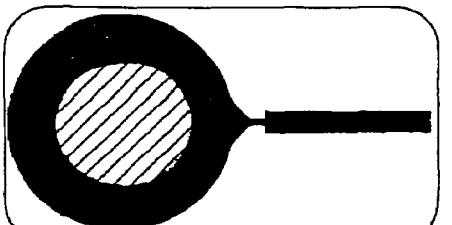 122 |

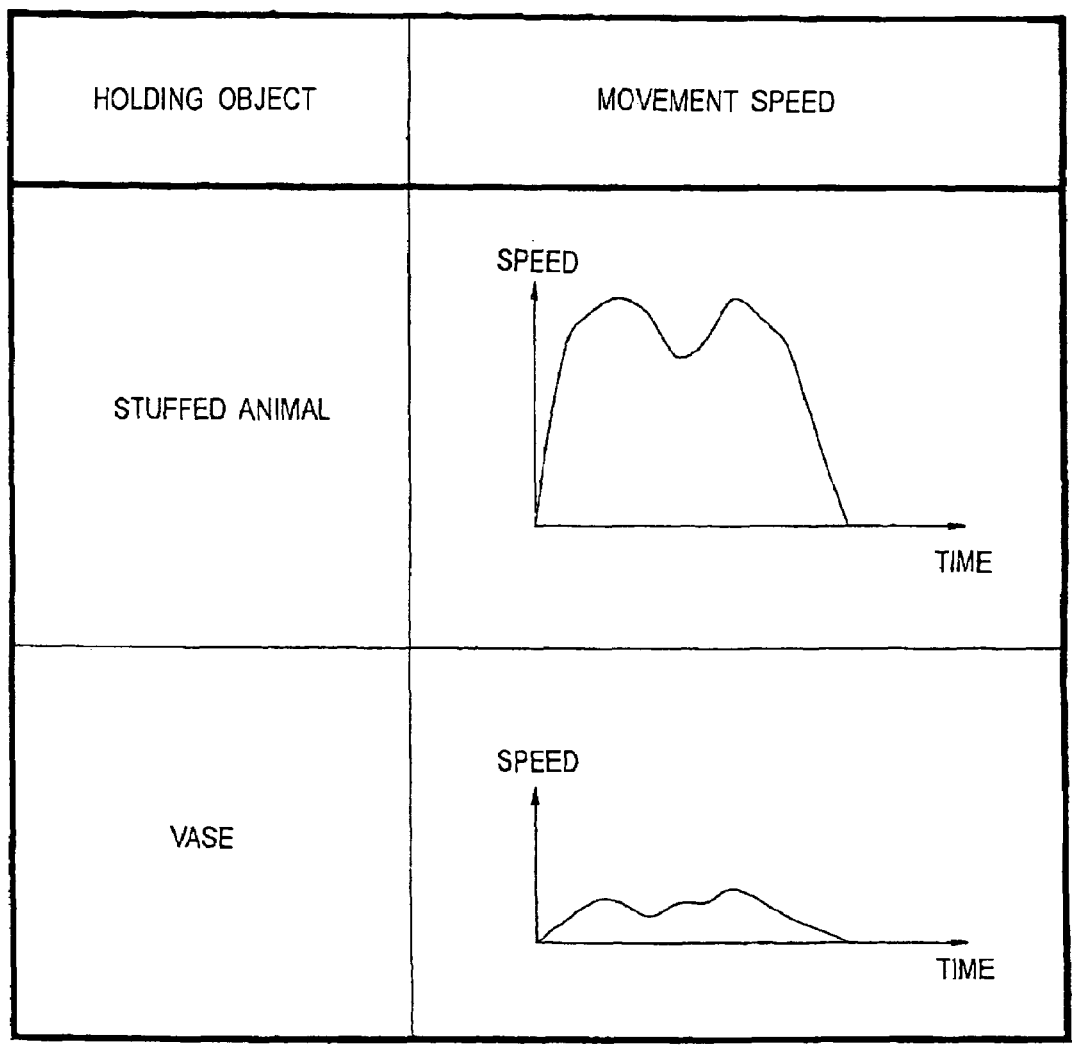

Fig. 28

| HOLDING LEVEL | HOLDING METHOD |
|---|---|
| Level 4 | • TWO ARMS<br>• WITH ORIENTATION CONTROL<br>• LOW SPEED |
| Level 3 | • TWO ARMS<br>• WITH ORIENTATION CONTROL<br>• MEDIUM SPEED |
| Level 2 | • SINGLE ARM<br>• WITH ORIENTATION CONTROL<br>• MEDIUM SPEED |
| Level 1 | • SINGLE ARM<br>• NO ORIENTATION CONTROL<br>• HIGH SPEED |

Fig. 29

| HOLDING LEVEL | SINGLE ARM | TWO ARM |
|---|---|---|
| Level 4 | • CANNOT BE HELD | • WITH ORIENTATION CONTROL<br>• LOW SPEED |
| Level 3 | • WITH ORIENTATION CONTROL<br>• LOW SPEED | • WITH ORIENTATION CONTROL<br>• MEDIUM SPEED |
| Level 2 | • WITH ORIENTATION CONTROL<br>• MEDIUM SPEED | • WITH ORIENTATION CONTROL<br>• HIGH SPEED |
| Level 1 | • NO ORIENTATION CONTROL<br>• HIGH SPEED | • NO ORIENTATION CONTROL<br>• HIGH SPEED |

Fig.30

| STATE | HOLDING METHOD |
|---|---|
| $\|\hat{K}_d - K_{dp}\| < Th_{Kd}$<br>$\|\hat{K}_s - K_{sp}\| < Th_{Ks}$<br>$\|\hat{\sigma} - \sigma_p\| < Th_\sigma$ | HOLDABLE REGION |
| OTHER THAN ABOVE | NON-HOLDABLE REGION |

Fig.31

| STATE | HOLDING METHOD |
|---|---|
| MADE OF GLASS | TORQUE : $T_{Lg}$ |
| MADE OF PAPER | TORQUE : $T_{Lp}$ |

ARTICLE HOLDING SYSTEM, ROBOT, AND METHOD OF CONTROLLING ROBOT

This is a continuation application of International Application No. PCT/JP2005/012915, filed Jul. 13, 2005.

BACKGROUND OF THE INVENTION

The present invention relates to an article holding system for performing the holding of an article according to the state of the article, a robot for holding the article according to the state of the article, and a method of controlling the robot.

A device that is limited to holding a holding object of one type such as vegetable, cloth or the like, and that includes a handling section configured so as to be able to suitably hold the holding object is known as the conventional holding device (see e.g., patent documents 1, 2).

A holding device, including a plurality of handling sections corresponding to each type of holding object so as to be able to suitably hold each of the plurality of types of holding objects, and selecting the most suitable handling section according to the type of the holding object is also known (see e.g. patent document 3).

A holding device, storing with characteristic data of each type of holding object and the operating information for the relevant holding object in association with each other when a plurality of types of holding objects are present, for recognizing the type of holding object with a visual sensor based on the characteristic data and holding the same with the operation corresponding to the recognized holding object is also known (see e.g., patent document 4).

Patent document 1: Japanese Patent Publication No. 1976349

Patent document 2: Japanese Laid-Open Patent Publication No. 8-132379

Patent document 3: Japanese Patent Publication No. 2710856

Patent document 4: Japanese Laid-Open Patent Publication No. 64-2882

The holding device disclosed in each document is used in the field of a so-called FA (Factory Automation) such as factory or warehouse, and thus the type of holding object is limited and the information such as shape data, material data, holding position data at the holding object that become necessary when holding with the holding device are obtained in advance for each type of holding object.

On the other hand, mounting the holding device on a robot, for example, and having the robot perform the task in spaces where people live (hereinafter referred to as living space) such as general households, offices, hotels, shops, hospitals etc. is also considered. However, since the number of types of articles present in the living space is great, the number of types of holding objects of the holding device also becomes great.

Therefore, obtaining in advance the information that is necessary in holding for all the types of articles becomes difficult, and the article without the information may not be held.

Furthermore, the information that is necessary in holding may not be obtained in advance, in the living space. For example, although the portion where food is not dished up must be held (gripped) when holding a dished-up plate, at which position the food will be dished up cannot be determined in advance. In other words, the information necessary in holding cannot be obtained in advance.

Moreover, although the state of the holding object barely changes in factories and the like, the state of the article may change by the minute in the living space. For example, the paper normally is in a state of sheet form, but the form may change entirely if crumpled up into a ball. In this case, even if the information necessary in holding the article is obtained in advance, that is, the information in holding the paper in a sheet form is obtained in the above example, the relevant information will not be useful when holding the crumpled paper An object of the present invention, in view of the above situations, is to provide an article holding system, a robot, and a method capable of controlling the robot to most suitably hold a wide variety of articles according to the state thereof.

SUMMARY OF THE INVENTION

The present invention is configured as below to accomplish the above object.

According to a first aspect of the present invention, there is provided a method of controlling a holding robot for holding an article in a living space using a holding device means of the robot; the method comprising steps of recognizing a condition of a holding object out of the articles in the living space; specifying one article holding method out of different article holding methods, according to the condition recognized in the recognizing step; and holding the holding object with the holding device means according to the article holding method specified in the specifying step.

According to a second aspect of the present invention, there is provided a robot comprising:

a recognizing device for recognizing a condition of a holding object out of articles in living space;

a holding method database for storing different article holding methods according to conditions of the holding object;

an article holding method specifying means for specifying one article holding method out of different article holding methods, according to the condition recognized by the recognizing device; and a holding device for holding the holding object with reference to the article holding method specified by the article holding method specifying means.

According to a 19th aspect of the present invention, there is provided an article holding system for holding an article in a living space, the holding system comprising:

a recognizing device for recognizing a condition of a holding object out of articles in the living space; and a robot for holding the holding object based on recognized result of the recognizing device; wherein the robot includes, a holding method specifying means for specifying the holding method corresponding to the condition recognized by the recognizing device; and a holding device for holding the holding object according to the holding method specified by the holding method specifying means.

According to such configuration, the condition of the holding object is recognized by the recognizing device, and the holding method corresponding to the recognized result is specified by the holding method specifying means. Thus, the most suitable holding method corresponding to the condition of various articles is specified, and the holding object is held by the holding device according to the most suitable holding method.

The article holding system of the present invention is a holding system for holding the article by controlling the robot. The article holding system by the robot includes the recognizing device for recognizing the condition of the holding object, and the holding device for holding the holding object based on the recognized result of the recognizing device.

The holding device includes the holding method specifying means for specifying the holding method corresponding to the condition recognized by the recognizing device, and the holding device for holding the holding object according to the holding method specified by the holding method specifying means.

According to the article holding system, the robot, and the method of controlling the robot of the present invention, the condition of the holding object is recognized, and the holding method is specified according to the recognized result, and thus the most suitable holding method corresponding to the condition of various articles is specified, and the holding object is held according to the most suitable holding method.

BRIEF DESCRIPTION OF THE DRAWINGS

These and other aspects and features of the present invention will become clear from the following description taken in conjunction with the preferred embodiments thereof with reference to the accompanying drawings, in which:

FIG. 1 is a block diagram showing a configuration of an article holding system according to a first embodiment of the present invention;

FIG. 2A is a schematic view illustrating a robot equipped with the article holding system according to the first embodiment of the present invention;

FIG. 2D is an explanatory view of a coordinate system set when controlling the orientation;

FIG. 2E is a view, that is a table showing the acceptable variation range in the α and β directions with respect to the holding level, indicating the information stored in the database;

FIG. 2M is a view showing one example of a table stored in a facility database attached to the environment map;

FIG. 3A is an explanatory view showing an example of a sensing device using a laser light in the first embodiment of the present invention;

FIG. 3B is an explanatory view showing an example of a sensing device using a laser light in the first embodiment of the present invention;

FIG. 6 is a view exemplifying a table stored in the database storing the holding method sets for the paper;

FIG. 7 is a view exemplifying a table stored in the database storing the holding methods set for the clothes;

FIG. 12A is a view exemplifying the holding method corresponding to the temperature distribution of the frying pan;

FIG. 12B is a view exemplifying the holding method corresponding to the temperature distribution of the frying pan;

FIG. 12C is a view exemplifying the holding method corresponding to the temperature distribution of the frying pan;

FIG. 12D is an explanatory view of when a portion whose temperature T is lower than the threshold temperature $Th_{TH}$ is considered as a holdable region and the portion whose temperature T is higher than the threshold temperature $Th_{TH}$ is a non-holdable region;

FIG. 12E is an explanatory view of when possibility of holding the object is selected and the orientation control and the movement speed are selected based on the relationship of the temperature of the object with the predetermined upper limit temperature and the lower limit temperature;

FIG. 12F is a view of a table of when the recognizing device uses the history information and the positional information of an article;

FIG. 26 is a view showing an example in which the holding method of each article is set in a table format based on the result learnt by the learning means;

FIG. 27 is a view showing one example of a table associating the holding level of specifying the learnt holding method of each article and each article;

FIG. 28 is a view showing an example of setting holding method of each article and the holding level in a table format;

FIG. 29 is a view showing one example of a table for using a single arm, two arms, two holding methods according to the situations;

FIG. 30 is a view showing one example of specifying the region of food placed on a plate and specifying a holdable region and a non-holdable region of the plate using the difference between an estimated reflectance parameter and a reflectance parameter of the plate; and FIG. 31 is a view showing in a table format one example of a holding method corresponding to the recognized material.

DETAILED DESCRIPTION OF THE PREFERRED EMBODIMENTS

Figure 2B:
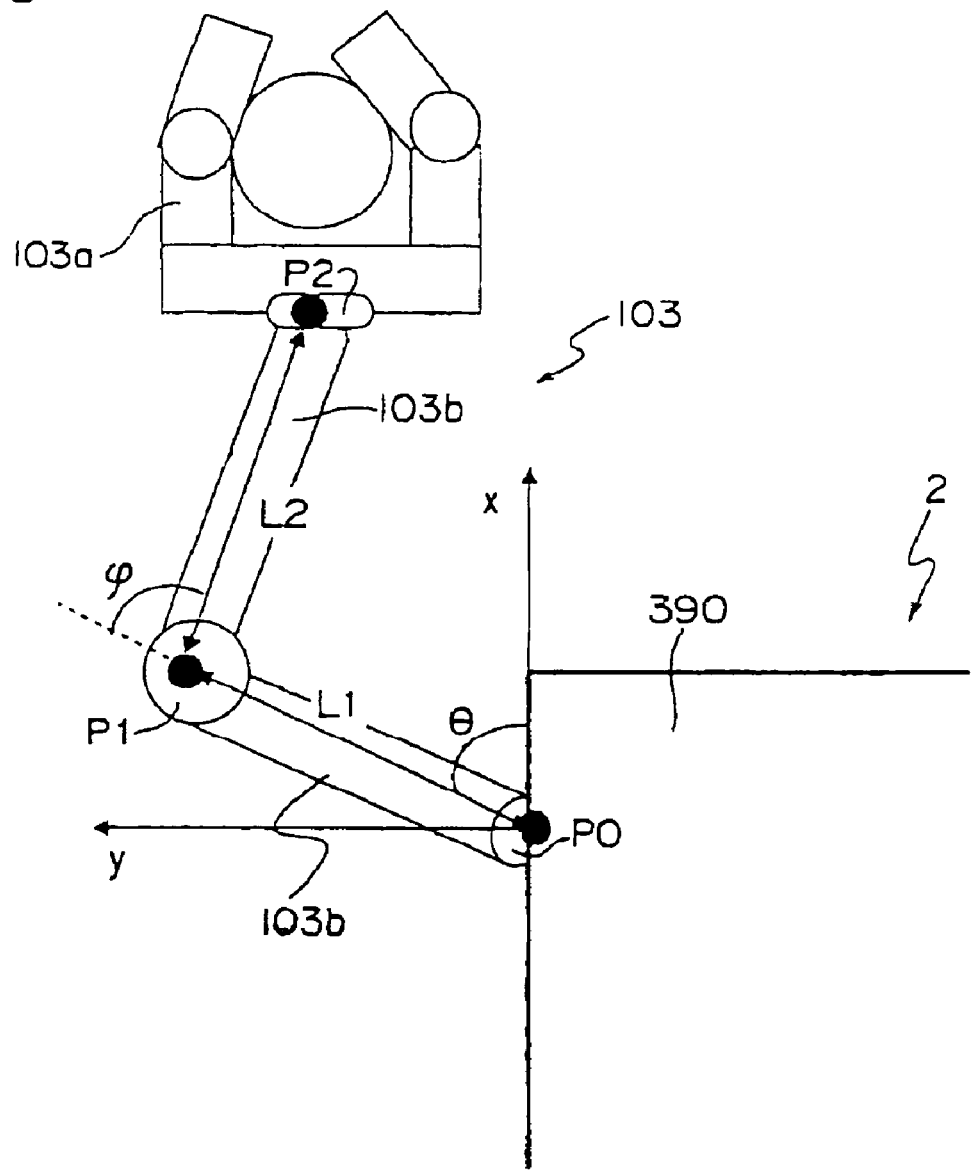
FIG. 2B is a schematic view of a holding device of the article holding system for performing orientation control.

Before the description of the present invention proceeds, it is to be noted that like parts are designated by like reference numerals throughout the accompanying drawings.

It should be noted before continuing with the description of the present invention that same reference characters are denoted for the same components throughout the accompanying drawings.

Various aspects of the present invention will first be explained before describing the embodiments of the present invention.

According to a first aspect of the present invention, there is provided a method of controlling a holding robot for holding an article in a living space using a holding device of the robot; the method including the steps of recognizing a condition of a holding object out of the articles in the living space; specifying one article holding method out of different article holding methods according to the condition recognized in the recognizing step; and holding the holding object with the holding device, according to the article holding method specified in the specifying step.

According to a second aspect of the present invention, there is provided a robot comprising:

a recognizing device for recognizing a condition of a holding object out of articles in living space;

a holding method database for storing different article holding methods according to conditions of the holding object;

an article holding method specifying means for specifying one article holding method out of different article holding methods, according to the condition recognized by the recognizing device; and a holding device for holding the holding object with reference to the article holding method specified by the article holding method specifying means.

According to a third aspect of the present invention, there is provided the robot according to the second aspect, wherein the holding object is an article whose form including shape, temperature, and content changes;

the recognizing device recognizes the form of the holding object as the condition of the holding object; and the article holding method specifying means specifies the one article holding method out of the different article holding methods in the holding method database according to the form serving as the condition recognized by the recognizing device.

According to a fourth aspect of the present invention, there is provided the robot according to the second aspect, wherein article holding methods for a plurality of different holding objects are stored as the holding object in the holding method database, the different holding objects being articles having same article ID information and having different form such as shape, temperature, and content, and the article holding method being stored so that the holding method differs as is the form of the article changes.

According to a fifth aspect of the present invention, there is provided the robot according to any one of the second to fourth aspects, wherein the recognizing device recognizes the condition of the holding object that changes with respect to time.

According to a sixth aspect of the present invention, there is provided the robot according to the fifth aspect, wherein the holding object is an article capable of accommodating an object inside;

the recognizing device recognizes whether or not the object is accommodated inside the holding object; and the article holding method specifying means specifies the one article holding method out of the different article holding methods, according to a condition of whether or not the object is accommodated inside the holding object recognized by the recognizing device.

According to a seventh aspect of the present invention, there is provided the robot according to the sixth aspect, wherein the holding object has light transmissive property;

the recognizing device recognizes whether or not the object is accommodated inside the holding object using is refraction of light at the holding object; and the article holding method specifying means specifies the one article holding method out of the different article holding methods, according to the condition of whether or not the object is accommodated inside the holding object recognized by the recognizing device.

According to an eighth aspect of the present invention, there is provided the robot according to the fourth aspect, wherein the recognizing device recognizes a temperature distribution of the holding object; and the article holding method specifying means specifies the one article holding method out of the different article holding methods, according to a condition of the temperature distribution of the holding object recognized by the recognizing device.

According to a ninth aspect of the present invention, there is provided the robot according to the eighth aspect, wherein the holding object is cooking equipment or dish; and the holding method specifying means specifies a holding position of the cooking equipment or the dish based on a temperature distribution of the cooking equipment or the dish recognized by the recognizing device.

According to a 10th aspect of the present invention, there is provided the robot according to the fifth aspect, wherein the holding object is paper or clothes.

According to an 11th aspect of the present invention, there is provided the robot according to the fifth aspect, wherein the recognizing device recognizes whether or not an object is placed on the holding object; and the article holding method specifying means specifies the one article holding method out of the different article holding methods, according to a condition of whether or not the object is placed on the holding object recognized by the recognizing device.

According to a 12th aspect of the present invention, there is provided the robot according to the 11th aspect, wherein the holding object is a dish.

According to a 13th aspect of the present invention, there is provided the robot according to the second aspect, further comprising a learning means for learning the holding method; wherein the learning means references a holding operation of the article performed by human, learns the holding method of the article, and stores the learnt holding method in the holding method database in association with the article.

According to a 14th aspect of the present invention, there is provided the robot according to the second aspect, wherein a holding method set in advance for each of articles is stored in the holding method database;

the holding method specifying means selects the holding method of the holding object from the holding methods set in advance in the holding method database with reference to recognized result of the recognizing device; and the holding method specifying means further selects the holding method set for an article having material or shape close to the holding object from the holding method database and sets the selected holding method as the holding method of the holding object when the holding method corresponding to the recognized result is not set in advance in the holding method database.

According to a 15th aspect of the present invention, there is provided the robot according to the second aspect, wherein the recognizing device recognizes a material of the holding object; and the article holding method specifying means specifies the one article holding method from different article holding methods, according to the material of the holding object recognized by the recognizing device.

According to a 16th aspect of the present invention, there is provided the robot according to the 15th aspect, wherein the recognizing device includes, an image-taking device for imaging the holding object; and a material recognizing means for recognizing the material using an optical property of the holding object based on the image taken by the image-taking device.

According to a 17th aspect of the present invention, there is provided the robot according to the 16th aspect, further comprising a light source for irradiating light to the holding object; wherein the material recognizing means recognizes the material using a reflectance property of the holding object.

According to an 18th aspect of the present invention, there is provided the robot according to the 17th aspect, wherein the light source is arranged so that a position with respect to the holding object is changeable;

the image-taking device takes a plurality of images by changing the position of the light source; and the material recognizing means recognizes the material of the holding object by processing the plurality of images.

According to a 19th aspect of the present invention, there is provided an article holding system for holding an article in a living space, the holding system comprising:

a recognizing device for recognizing a condition of a holding object out of articles in the living space; and a robot for holding the holding object based on recognized result of the recognizing device; wherein the robot includes, a holding method specifying means for specifying the holding method corresponding to the condition recognized by the recognizing device; and a holding device for holding the holding object according to the holding method specified by the holding method specifying means.

According to a 20th aspect of the present invention, there is provided the article holding system according to the 19th aspect, wherein the holding device is a holding system mounted on the robot.

The embodiments of the present invention will now be described with reference to the drawings.

First Embodiment

FIG. 1 is a view showing a basic configuration of an article holding system 10 by a robot 2 equipped with a holding device 103 according to a first embodiment of the present invention. The basic constituting portion of the article holding system 10 is mounted on a humanoid household robot 2, as shown in FIG. 2A and the like. The robot 2 is a device for receiving a work command and executing the work according to the command, and the article holding system 10 executes the holding of the article related to the work.

As shown in FIG. 1, the article holding system 10 includes a recognizing device 101, a holding method specifying means 102, a holding method database 102d, and a holding device 103.

The recognizing device 101 recognizes the state of the holding object as one example of the condition thereof. The specific processes in state recognition by the recognizing device 101 will be described below.

The holding method specifying means 102 specifies the article holding method most suitable for the relevant state from a plurality of article holding methods stored in advance, with reference to the state recognized by the recognizing device 101. "Article holding method" herein includes, selecting a gripping hand 103 or a suction hand 103s for gripping or sucking the article, how to move the held article (angle of gripping or suction angle, movement speed, moving direction, etc.), etc. as described below.

The article holding methods that differ according to the states of the holding object are stored in advance in the holding method database 102d.

For example, at least one holding device 103 is arranged on a main body part 390 of the robot 2, and is preferably arranged in pairs on both sides of the main body part 390 of the robot 2. The respective holding device 103 executes the holding of the holding object according to the holding method specified by the holding method specifying means 102. Each holding device 103 may include the hand 103a for gripping the article, and a bendable arm 103b with the hand 103a attached at the distal end, as shown in FIG. 2A, for example. The hand 103a includes a hand with a plurality of fingers of pneumatic type, hydraulic type, motor type, artificial muscle, or the like; or the suction hand 103s; or the like, which are selected according to the specified holding method as described below.

FIG. 2B is a schematic view of the holding device 103 for performing orientation control in time of holding the article. In FIG. 2B, the arm 103b of the holding device 103 has an arm on its basal end side having a length L1, an arm on its distal end side having a length L2, and the basal end part of the arm on the basal end side rotatably connected to the side of the main body part 390 of the robot 2 by a joint P0, and further, the distal end part of the arm on the basal end side and the basal end part of the arm on the distal end side connected in a bendable manner by a joint P1, and the hand 103a connected in a bendable manner to the distal end part of the arm on the distal end side by way of a joint P2. To simplify the description, consideration is made in orientation controlling the contacting point joint P2 of the hand 103a and the arm 103b in a two dimensional plane.

Figure 2C:
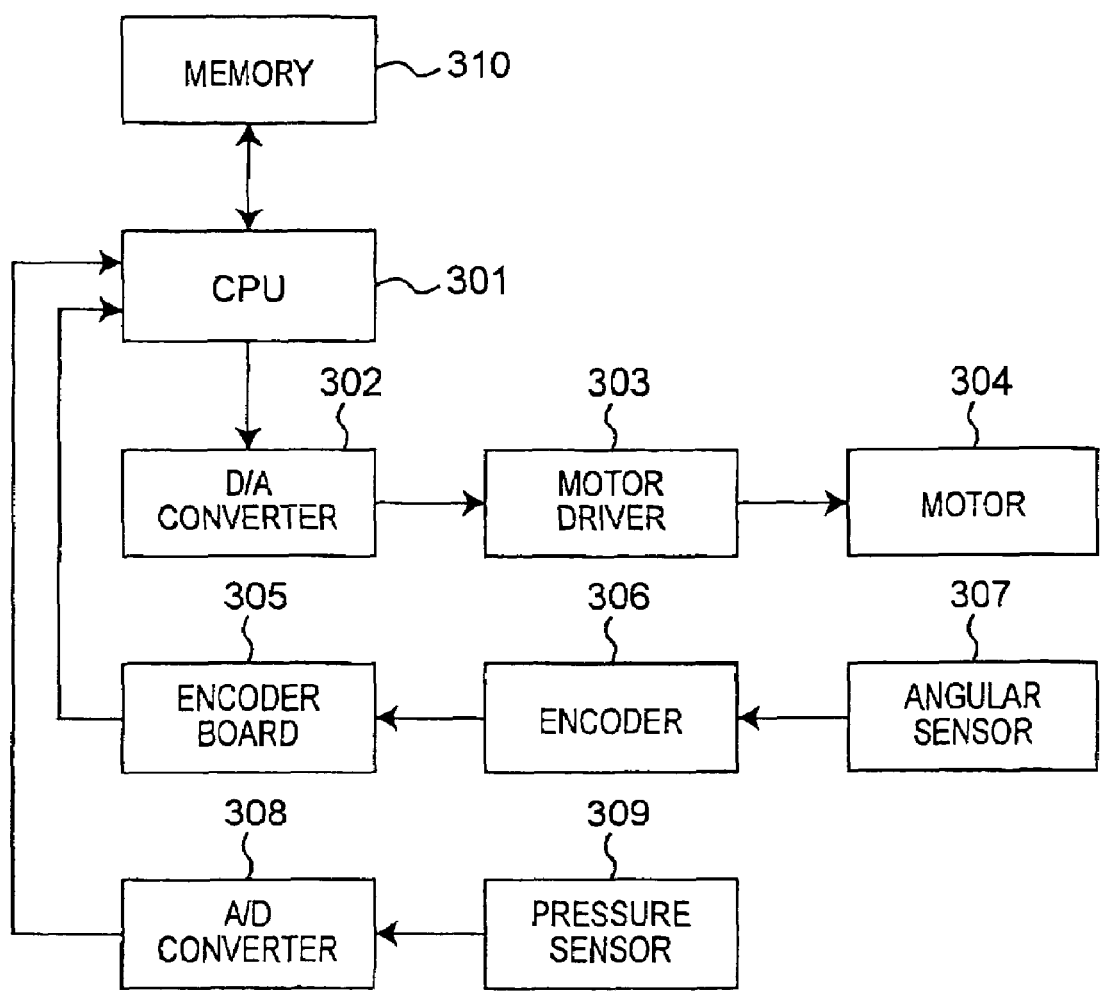
FIG. 2C is a block diagram showing a drive control system of an arbitrary driving section such as a motor control type actuator of a movement device and the holding device.

FIG. 2C shows a drive control system of an arbitrary driving section such as a motor control type actuator of a movement device 414, to be described below, and the holding device 103. Similar drive control system is configured for all the driving sections.

The motor 304 has a rotating shaft forward and reversely driven by current supplied from a motor driver 303, and for example, four wheels 394 are forward and reversely rotated. An angular sensor 307 for detecting the rotation angle of the driven rotating shaft is arranged in the motor 304. The output signal from the angular sensor 307, is input to a CPU 301 via an encoder 306 and an encoder board 305.

The CPU 301 controls the drive of the motor 304. A memory 310 for storing information necessary for control is connected to the CPU 301.

A pressure sensor 309 for detecting whether or not the holding object is properly held is arranged on, for example, the gripping surface at the hand 103a, and the sensor output signal from the pressure sensor 309 is input to the CPU 301 via an A/D converter 308.

The CPU 301 receives the output signal from the angular sensor 307 and the sensor output signal from the pressure sensor 309 as input signals, generates a control signal for the motor 304 according to the received input signals, and sends the control signal to the motor driver 303 via a D/A converter 302. The motor 304 is thus forward or reversely driven according to the control signal, thereby realizing the orientation control of the arm or the hand.

The lengths of the arm 103b are L1 and L2, respectively, and the angles are acquired by the angular sensors (encoders herein) 307 at the joints P0, P1, which angles are assumed as $\theta$, $\phi$, respectively. The position of the distal end position P2 of the arm 103b is obtained by the following relational equation.

$$P2 = (L1 \cos\theta + L2 \cos(\theta - \phi), L1 \sin\theta + L2 \sin(\theta - \phi)) \quad \text{(equation 1)}$$

The position of the holding object can be estimated from the relational equation and moved to an arbitrary position, thereby realizing the orientation control. Orientation control refers to performing fine adjustment based on information of the angular sensor etc. as described above and thus accurately controlling the position and the orientation. Only the positional control in the two dimensional plane has been explained for simplicity, but similar processes may be performed for the position and orientation control in a three dimensional space.

For example, when holding a glass GL with liquid inside with the hand, the orientation control in the three dimensional space refers to controlling the orientation so that the liquid does not spill out. The coordinate system is set as in FIG. 2D. In other words, with regards to the position of the object, the horizontal floor configured by the Xw axis and the Yw axis orthogonal to each other is set as Xw-Yw plane, and the Zw axis is set vertically upward from the plane. With regards to the orientation (rotation), the bottom surface of the glass GL is set as the x-y plane configured by the x axis and the y axis orthogonal to each other, and the vertical direction from the relevant plane towards the mouth of the glass GL is set as the z direction, where the clockwise directions seen from the origin side for each axis of x, y, and z is referred to as $\alpha$, $\beta$, and $\gamma$ directions. When orientation controlling the glass GL with liquid LD inside, control is made so that only $\alpha$ and $\beta$ directions do not change with respect to the six axes.

FIG. 2E is a table showing the acceptable variation range in the $\alpha$ and $\beta$ directions with respect to the holding level, indicating the information of the holding method stored in the holding method database 102d. The "holding level" is determined in advance depending on the amount of liquid LD in the glass GL, and the size of the glass GL. As shown in FIG. 2D, the holding level is determined as below with h as the height of the glass GL, r as the radius of the mouth of the glass GL, hi as the height of the liquid LD in the glass GL, and $\theta_w$ as the acceptable angle for the tilt of the water (liquid) in the glass GL.

$$\theta w = \left| \mathrm{Tan}^{-1}\left(\frac{h - hi}{r}\right) \right|$$

if $\theta_w \leq 1.0$ [deg], then holding level=Level 5
if $1.0$ [deg]$\leq \theta_w < 3.0$ [deg], then holding level=Level 4
if $3.0$ [deg]$\leq \theta_w < 5.0$ [deg], then holding level=Level 3
if $5.0$ [deg]$\leq \theta_w$ [deg], then holding level=Level 2
if no content, then holding level=Level 1

The height h of the glass GL and the radius r of the mouth of the glass GL may be written on an electronic tag given to the glass GL. The height hi of the liquid LD in the glass GL may be measured using a weight sensor, to be described below. In other words, the weight $w_g$ of the glass GL and the shape information of the glass GL may be written on the electronic tag. Assuming the weight of the object measured by the weight sensor is $w_w$, the weight of the liquid LD inside is obtained by $w_w - w_g$. The amount of the liquid LD inside can be estimated assuming the content is water. Since the shape information of the glass GL can be acquired from the electronic tag information, the height hi of the liquid LD in the glass GL can be estimated from such information.

An environment system where the robot 2 is placed will now be described.

Figure 2F:
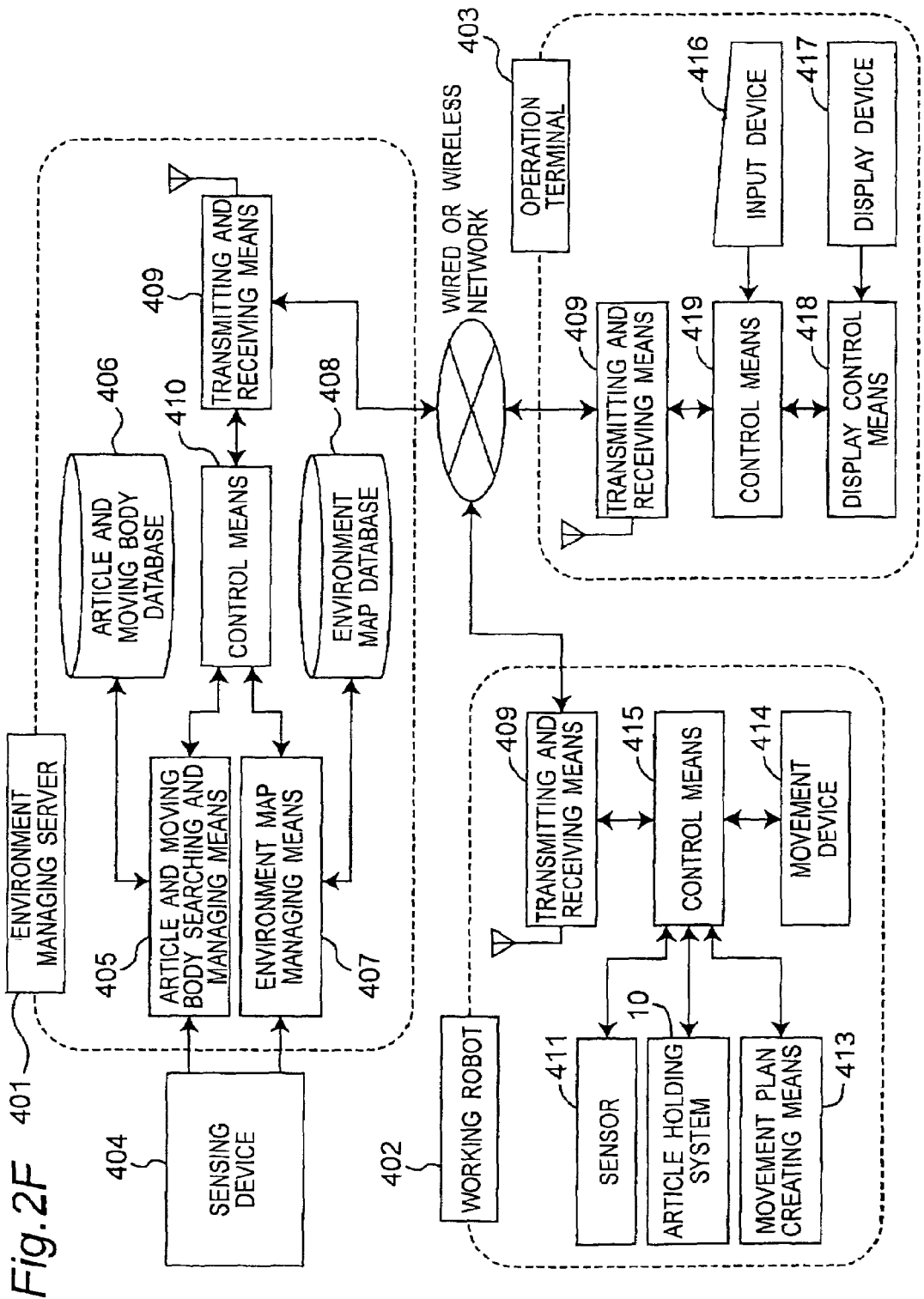
FIG. 2F is a block diagram showing a configuration of an environment system where the robot according to the first embodiment of the present invention operates.

FIG. 2F is a block diagram showing the configuration of the environment system where the robot 2 according to the first embodiment of the present invention operates. As shown in FIG. 2F, the environment system is broadly configured by three subsystems of a working robot 402 that functions as one example of the robot 2 equipped with the article holding system 10; an environment managing server 401 serving as a server including a sensing device (device functioning as one example of the recognizing device 101) 404 for grasping the situation in the environment; and an operation terminal 403 serving as an operation device. The subsystems 401 to 403 each includes a transmitting and receiving means 409, and independently performs exchange of information, data, signal, or the like via wireless or wired network based on the control of the respective control means by means of the transmitting and receiving means 409. Each transmitting and receiving means 409 is denoted by the same reference character 409 in FIG. 2F as each transmitting and receiving means 409 perform a common process.

In the description herein, "environment" refers to a room in the house as one example, but the present invention is not limited thereto, and refers to a living space or a space where articles are arranged.

The configuration and operation of each subsystem will now be described in order.

<Configuration of Environment Managing Server>

The environment managing server 401 includes an article and moving body searching and managing means 405 for managing the states of the article present in the environment and the moving body including humans and robot 402 out of the states grasped by the sensing device 404; an article and moving body database 406 for accumulating the data of the article and the moving body; an environment map managing means 407 for managing the state of the entire environment other than the article and the moving body; and an environment map database 408 for accumulating the data of the entire environment. The output signal from the sensing device 404 is connected so as to be input to the article and moving body searching and managing means 405 and the environment map managing means 407. The article and moving body searching and managing means 405 is connected to the article and moving body database 406 and the control means 410. The environment map managing means 407 is connected to the environment map database 408 and the control means 410. The transmitting and receiving means 409 is connected to the control means 410.

Based on the control of the control means 410, the transmitting and receiving means 409 receives the inquiry (signal) of the data of the article and moving body database 406 and the inquiry (signal) of the data of the environment map database 408 from outside, issues response signals thereof to the outside, and transmits a control command for the robot 402. The control means 410 independently controls the respective operations of the article and moving body searching and managing means 405, the environment map managing means 407; and the transmitting and receiving means 409.

The sensing device 404 constantly monitors the position (positional coordinate) and the state (sit, go out, stand, sleep, walk, hold, sucks, grip, release, etc.) of the article such as furniture in the environment and humans and robot 402 in the environment.

The sensing device 404 can also detect if the article is brought into the environment or if the article is brought out from the environment, by human or robot 402. Specifically, the sensing device 404 may be a camera (imaging sensor), tag sensor, etc. installed in the environment, the detailed description of which will be given later. When the article or the moving body is detected, the sensing device 404 transmits the detected information to the article and moving body searching and managing means 405 and the environment map managing means 407. The information transmitted from the sensing device 404 to the article and moving body searching and managing means 405 and the environment map managing means 407 include detected time of the article, position (positional coordinate) and orientation of the article, and the like.

The article and moving body searching and managing means 405 manages the information of the article and the moving body detected by the sensing device 404 by accumulating the same in the article and moving body database (DB) 406. The information managed in the article and moving body database 406 includes at least the information on the current position (positional coordinate) of the article and the moving body. The details of the article and moving body database 406 and the method of updating the same will be described below.

The article and moving body searching and managing means 405 infers the moving body (human, robot) performing the operation on the article (handling such as holding and/or moving of article) based on the information from the sensing device 404, and accumulates the inferred result in the article and moving body database 406.

Furthermore, when an inquiry regarding the article and moving body database 406 is made to the article and moving body searching and managing means 405 from the control means 410 as a result of reception at the transmitting and receiving means 409 and the like, the article and moving body searching and managing means 405 retrieves the necessary information from the article and moving body database 406 according to the content of the inquiry and sends the relevant information to the control means 410.

The environment map managing means 407 creates an environment map based on the information from the sensing device 404 and accumulates the same in the environment map database 408, and performs the management of the created environment map in the environment map database 408. The environment map accumulated in the environment map database 408 is used when the robot 402 moves in the environment, where the robot 402 acquires the environment map from the server 401 and plans a movement path.

Furthermore, when an inquiry regarding the environment map database 408 is made to the environment map managing means 407 from the control means 410 as a result of reception at the transmitting and receiving means 409 and the like, the environment map managing means 407 retrieves the necessary information from the environment map database 408 according to the content of the inquiry and sends the relevant information to the control means 410.

The control means 410 is an element for controlling the environment managing server 401, and the main controlling content includes the following.

1) When the transmitting and receiving means 409 receives an inquiry regarding various data in the environment managing server 401, the relevant inquired content is judged by the control means 410, and the data reference request is made from the control means 410 to the article and moving body searching and managing means 405 or the environment map managing means 407 according to the judgment result.

2) The result sent from the article and moving body searching and managing means 405 or the environment map managing means 407 to the control means 410 in response to the request is then sent to a source of the inquiry via the transmitting and receiving means 409 based on the control of the control means 410.

3) The work content message of the robot 402 transmitted from the operation terminal 403 to the control means 410 via the transmitting and receiving means 409 is interpreted, a robot control command sequence for the robot 402 to execute the operation is generated in the control means 410, and transmitted from the control means 410 to the robot 402 via the transmitting and receiving means 409. The robot control command sequence will be described below.

4) The partial or entire state of the article managed in the article and moving body database 406 and the state of the environment map managed in the environment map database 408 are broadcasted at every constant time, as necessary, to the robot 402 or the user (operation terminal 403) by the control means 410 via the transmitting and receiving means 409.

(Specific Example of Sensing Device)

The environment targeted by the article holding system in the robot according to the first embodiment is a living space such as household. Therefore, in the environment, the articles are arranged at various places, and furthermore, the positions thereof have no regularity, and the positions thereof constantly change. The moving body such as human and robot is also not restricted with regards to the moving path, and can freely move about. Thus, a sensing technique for accurately detecting the states of the article and the moving body in the environment is required in the article holding system by the robot.

Imaging Sensor

One of the most frequently used sensors for detecting the article is an imaging sensor (camera). In order to efficiently monitor a relatively wide range such as the entire room with a few equipment, the imaging sensor, that is, the cameras are generally fixed to the ceiling, wall, etc. of the room and the article and the like in the room is generally detected using the camera images (image-input images).

A common method of detecting the article or the moving body in the environment using the camera image is a background subtraction method. The background subtraction method is a method of detecting the object by preparing in advance a model image serving as a background and taking the difference between the current camera image and the model image. Since it is necessary for the article holding system by the robot to detect and monitor the article and the moving body in the environment, the image taken when the article and the moving body are not present in the environment may be used as the model image if the variation in the state of the environment is small. Furthermore, if the variation in the state of the environment is drastic, the image obtained by averaging a plurality of images taken at a predetermined time interval may be used as the model image.

However, in the article detection using the imaging sensor, a great number of issues that it is in sensitive to change in brightness, resolution is low, the article cannot be seen when hidden behind another article (issue of blind spot), a plurality of articles overlapping each other is detected as one article, and the like generally arise. For example, the issue of blind spot can be resolved by arranging a plurality of cameras substantially uniformly in the environment and taking pictures of all the articles present in the environment by the cameras. However, the blind spot may be eliminated, but the article detection may not be necessarily performed with reliability. In other words, the issue of resolution and the issue of overlapping of the articles are not resolved even if the number of cameras is increased, and thus the portion standing out in the background subtraction image may not necessarily be specified.

Use of Electronic Tag

Recently, a method of detecting the position (positional coordinate) of the article or the moving body using the electronic tag is being developed. The electronic tag is a device configured by an IC for storing data and an antenna for transmitting and receiving data wirelessly. The information written on the electronic tag is read in a non-contact manner and the information is written on the electronic tag in a non-contact manner by means of a device called read writer. Such read writer is referred to as a tag reader.

The electronic tag is provided to each article, and the data related to the relevant article, for example, data such as type of article (or ID information of article), shape, weight, image of article, date of manufacture, etc. are embedded in the electronic tag. Furthermore, the electronic tag is provided to the moving body (human and robot), and the data related to the moving body, for example, information such as name, birth date, etc. of the human are written. In the case of humans, the electronic tag may be provided to an article that is always carried (e.g., wrist watch, eyeglass, etc.). On the other hand, a plurality of tag readers are arranged in the environment. The detection of the article, etc. present in the environment becomes possible without a camera since the tag readers read the information of the electronic tag, provided to the articles and the moving bodies.

Only the presence of the article is detected when the camera is used, whereas not only the presence of the article is detected, but the data of the relevant article embedded in the electronic tag can also be used when the electronic tag is used. For example, the holding of the article by the robot 402 can be facilitated by using the shape data of the article, as described below. Furthermore, the management of the quality time limit becomes possible by using the data of manufacture date, the article being looked for can be more easily found by using the type data of the article, etc., thereby giving great merits to the user.

However, the issue in that the communication distance is short arises when detecting the article using the electronic tag. That is, since a very weak wireless electric wave that does not affect the human body must be used in exchanging data between the electronic tag and the tag reader, the communication distance is very short or a several tens centimeters at maximum. A number of tag readers may be arranged in the environment in order to resolve the issue of communication distance, but is not realistic since the tag reader is expensive compared to the camera.

Combination of Imaging Sensor and Electronic Tag

As described above, the method using the imaging sensor and the method using the electronic tag have good and bad points. A method of using both the imaging sensor and the electronic tag is thereby considered. In other words, a hybrid process of specifying the approximate position (positional coordinate) of the article in the environment through the background subtraction method described above, and also specifying the relevant article using the electronic tag is performed.

Two examples of a specific process will now be described.

One example includes installing the cameras at the ceiling, wall, etc. in the environment, and attaching the tag reader 404a to the working robot 402. The electronic tags are attached to each article and the moving body. First, the position (positional coordinate) of the article in the environment is detected by the background subtraction method using the camera image. The robot 402 is then moved to the vicinity of the detected article, and the tag reader 404a attached to the robot 402 reads the information from the electronic tag attached to the article, thus specifying the article.

Another example includes installing the cameras at the ceiling, wall, etc. in the environment and installing a plurality of tag readers substantially uniformly in the environment. The tag reader has directivity with respect to the data reading of the electronic tag, and the reading direction is variable. First, the position. (positional coordinate) of the article in the environment is specified through the background subtraction method using the camera image. Then, the tag reader installed at a position (positional coordinate) closest to the detected article is selected and the reading direction of the tag reader is directed to the relevant article. The information is then read from the electronic tag attached to the article, and the article is specified. In this example, the distance between the tag reader and the electronic tag sometimes become long, and thus it is necessary to use a relatively strong wireless electric wave. The information is thus preferably read from the electronic tag after checking that the person is not in the environment through the background subtraction method or the like.

Methods other than the method using the imaging sensor or the electronic tag described herein may be adopted for sensing in the present system.

(Article and Moving Body Searching and Managing Means)

Figure 2G:
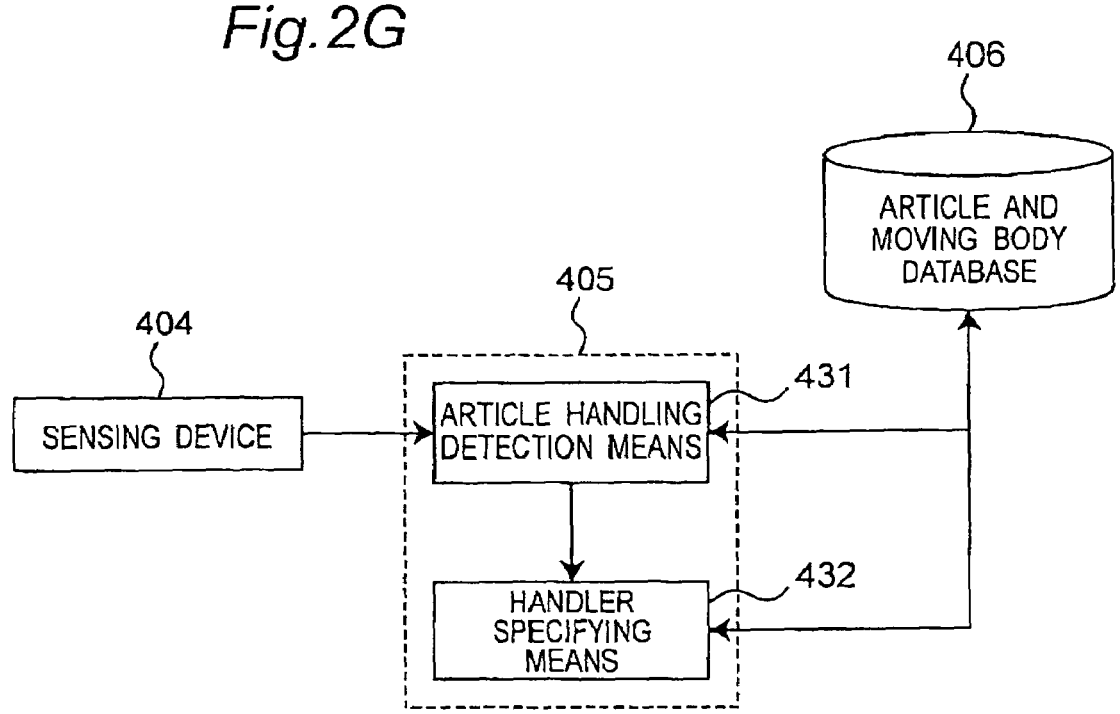
FIG. 2G is a view schematically showing the inner configuration of the article and moving body searching and managing means.

FIG. 2G is a view conceptually showing the inner configuration of the article and moving body searching and managing means 405 in FIG. 2G, the article handling detection means 431 detects that the article is being handled by the moving body (article handling state), and the handler specifying means 432 specifies the moving body (handler) handling the article according to the detection result of the article handling detection means 431.

The article handling detection means 431 detects the article handling state based on the information from the sensing device 404. For example, when article detection is performed using the imaging sensor and the background subtraction method as described above, the camera image and the model image are compared and if a portion different from each other is found, the article is detected as being handled at the relevant portion. The article handling state may be detected using the electronic tag or the like.

When the article handling detection means 431 detects the article handling state, the handler specifying means 432 specifies the handler (human or robot) handling the article, and stores the information on the handler to the article and moving body database 406.

Specifically, the specification of the handler is carried out in the following manner. When the camera is used for the sensing device 404, the region where the article handling state is detected is taken up by the camera. A face authentication process is then performed on the image to specify the moving body. The specified moving body is assumed to have been in the vicinity of the handled article, and thus the relevant moving body is assumed as the handler. Normally, a wide angle camera for image-taking a wide area is used for the sensing device 404, but the resolution of the taken image of the wide angle camera is relatively low, and may not be sufficient to perform the face authentication process. A narrow angle high resolution camera may be installed in the environment or the robot 402 as the camera for face authentication process separate from the wide angle camera. The article handling detection means 431 images the region where the article handling state is detected by means of the narrow angle camera and performs the face authentication process on the image to specify the handler at satisfactory precision.

The specification of the article handler is not limited to face authentication process, and may be performed through other authentication processes such as iris authentication and the like. Furthermore, the camera image itself may be stored in the article and moving body database 406 without performing the authentication process. This may be performed only when the moving body cannot be specified by the authentication process. Furthermore, the specification of the handler may be performed using the electronic tag.

(Article and Moving Body Database)

Figure 2H:
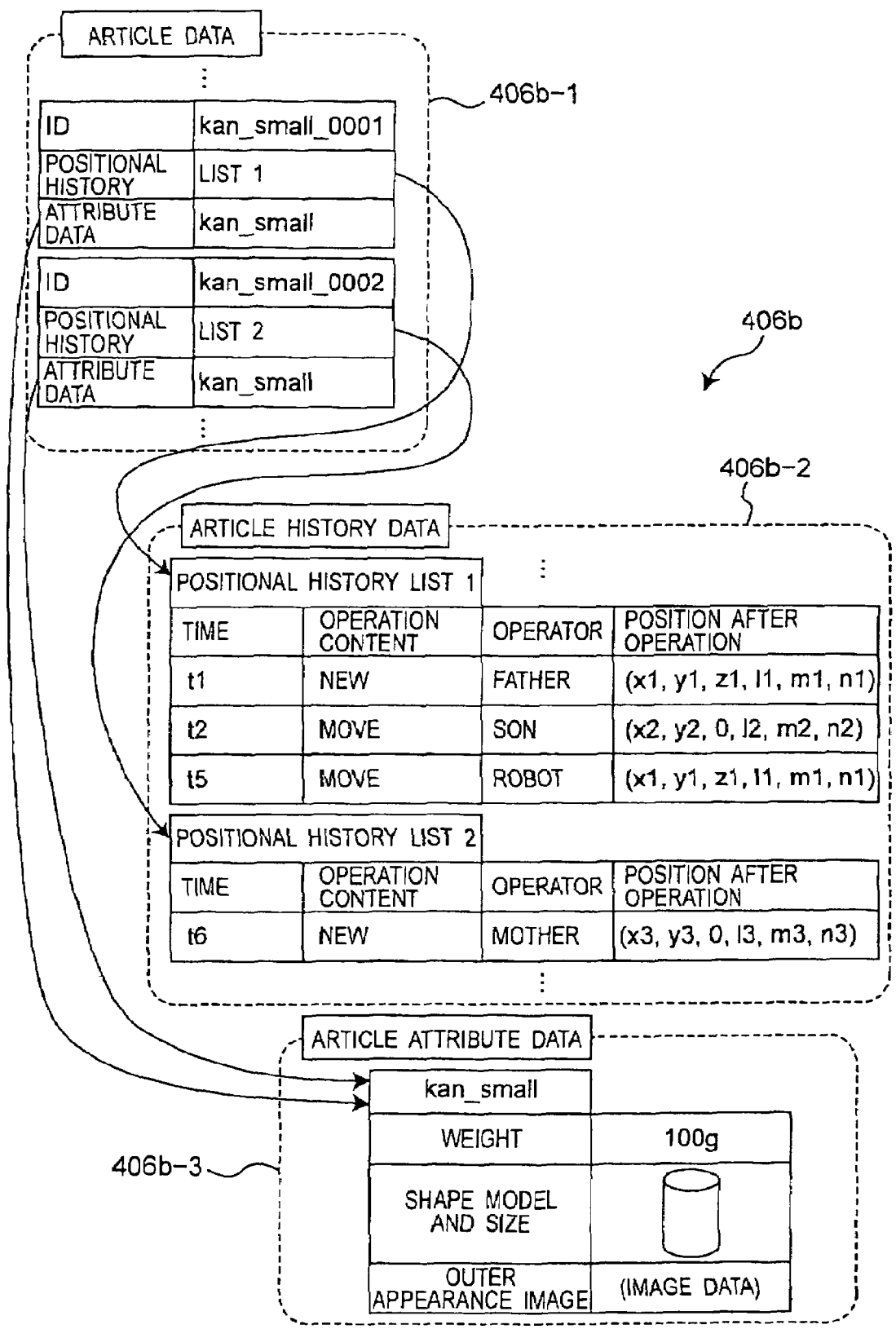
FIG. 2H is an explanatory view of a table stored in the article database handling the article.
Figure 2I:
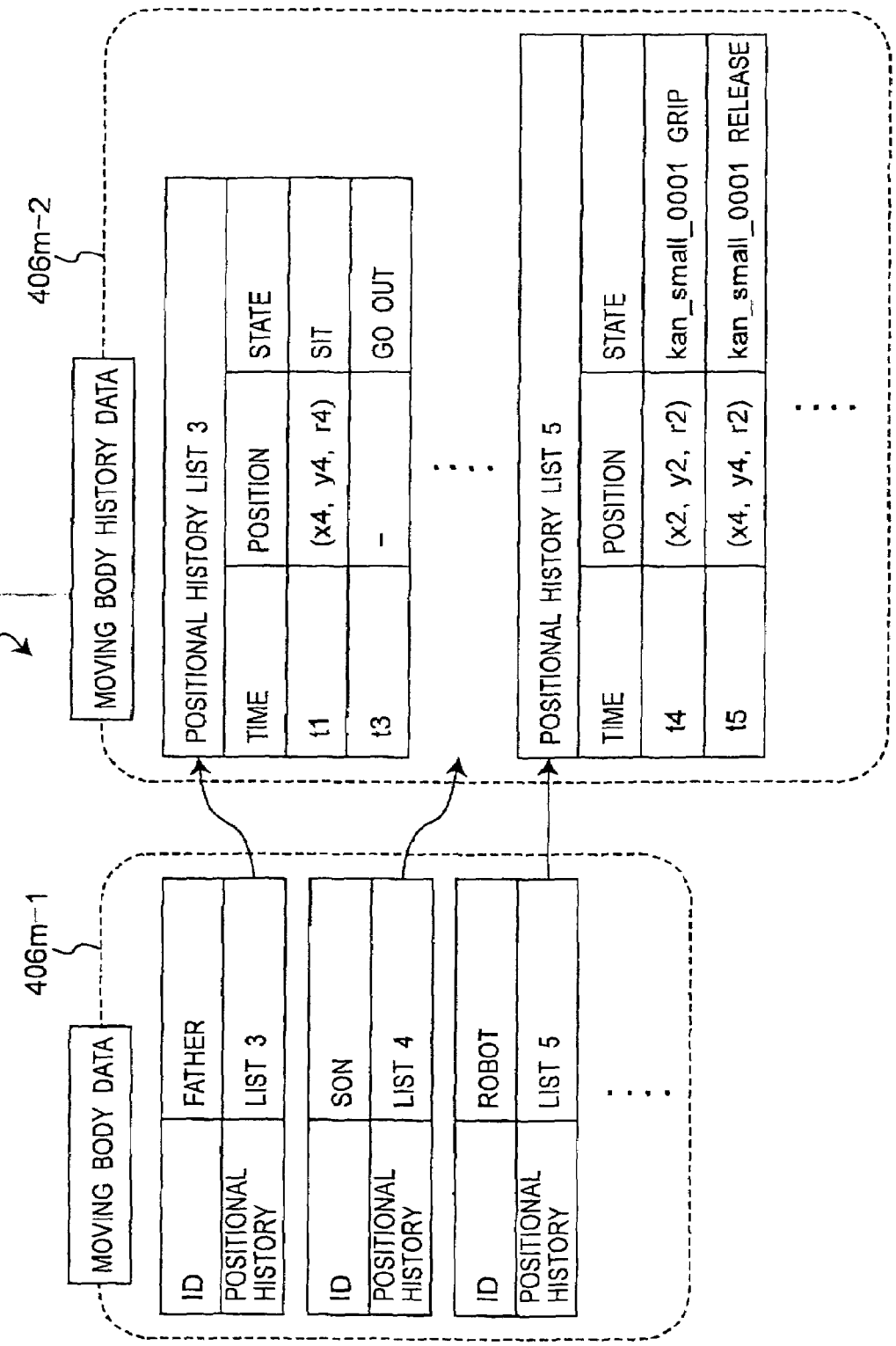
FIG. 2I is an explanatory view of a table stored in the moving body database handling the moving body.

The article and moving body database 406 is a database for storing information on the article and the moving body, and, for example, includes an article database (DB) 406b handling the articles as shown in FIG. 2H and a moving body database (DB) 406m handling the moving bodies as shown in FIG. 2I.

The article database 406b of FIG. 2H includes three sub-databases 406b-1, 406b-2, and 406b-3 respectively storing the article data, the article history data, and the article attribute data.

1) Article Data

The article data stored in the sub-database 406b-1 of the article data includes ID information for distinguishing each article (e.g., "kan_small_0001", etc. assigned as ID to a small can (kan) in FIG. 2H), a pointer for the article history data (e.g., "list 1", etc. serving as positional history of the small can in FIG. 2H), and a pointer for the article attribute data (e.g., "kan_small" serving as attribute data for the small can, etc. in FIG. 2H). In the example of FIG. 2H, articles that are of the same type but are physically different are assigned with different ID information, and handled as different articles. However, since the articles of the same type have the same physical attribute, the pointers for the article attribute data are common although the pointers for the ID information and the positional history data are different. The capacity of the database is thereby saved.

2) Article History Data

The article history data stored in the sub-database 406b-2 of the article data represents the history the article is handled, and includes four items of the handled time (e.g., time "t1", etc. with respect to the positional history list 1 in FIG. 2H), the handled content (e.g., operation content "new", etc. with respect to the positional history list 1 in FIG. 2H), the handler (operator "father", etc. with respect to the positional history list 1 in FIG. 2H), and the position (positional coordinate) after handling (e.g., positions "x1, y1, z1, l1, m1, n1", etc. after operation with respect to the positional history list 1 in FIG. 2H) in FIG. 2H. Various representations for the positional data (positional coordinate data) are considered, but in the example of FIG. 2H, the position (positional coordinate) is represented with six parameters of three parameters (x1, y1, z1) representing the position (using gravity center positional coordinate, etc.) of the article, and three parameters (l1, m1, n1) representing the orientation of the article. The handler is the moving body specified by the handler specifying means 432.

3) Article Attribute Data

The article attribute data stored in the sub-database 406b-3 of the article data represents the physical attribute information of the article, and may be the weight of the article (e.g., weight "100 g" for the kan_small in FIG. 2H), the shape (e.g., perspective view of cylinder, etc. as shape, model, and size for the kan_small in FIG. 2H), the outer appearance image data (e.g., image data of outer appearance image, etc. for the kan_small in FIG. 2H), and the like, as examples, as shown in FIG. 2H.

The moving body database 406m of FIG. 2I includes two sub-databases 406m-1 and 406m-2 respectively storing the moving body data and the moving body history data.

1) Moving Body Data

The moving body data stored in the sub-database 406m-1 includes the ID information (e.g., "father", etc. as ID in FIG. 2I) for distinguishing each moving body, and a pointer to the moving body history data (e.g., "list 3", etc. as the positional history in FIG. 2I). The ID information stored in the sub-database 406m-1 of the moving body database 406m may be registered by hand in advance by the user.

2) Moving Body History Data

The moving body history data stored in the sub-database 406m-2 includes three items of the time (e.g., time "t1", etc. as the positional history list 3 in FIG. 2I), the position (positional coordinate) at the relevant time (e.g., position "x4, y4", and radius of circle "r4", etc. as positional history list 3 in FIG. 2I), and the state at the relevant time (e.g., state "sit", etc. as positional history list 3 in FIG. 2I). Since the moving body (robot other than the robot 402, or human) occupies a larger volume in the space, compared to the articles, the moving body tends to be an obstruction in the movement of the robot 402. Thus, the position (positional coordinate) of the moving body is preferably represented as realistic as possible so that the robot 402 can move avoiding the obstructions. In FIG. 2I, the region of the floor occupied by the moving body is approximated with a circle to represent with the necessity minimum information, and the position (positional coordinate) of the moving body is represented by the center coordinate and the radius of the circle. The relevant region may obviously be more precisely represented, and for example, the contour of the region of the floor occupied by the moving body may be approximated using a plurality of line segment vectors.

The state of the moving body is represented by the general operation of human such as "sit", "stand", "sleep", "walk", etc., in the case of the human, and is represented by the operation performed on the article by the robot 402 such as "hold" (or "grip" or "suck") "release", etc. in the case of the robot 402. With regards to the robot 402, the state of the moving body is represented as "article ID: operation content" with the article ID information of the work target, in addition to the operation. Specifically, for example, the state becomes "kan_small_0001 grip" as shown for time t4 of the positional history list 5 of FIG. 2I. The specification of the state is performed by preparing in advance a plurality of state candidates of the moving body in the moving body history data, and determining to which state candidate the state of the moving body applies by the article and moving body searching and managing means 405 based on the detection result of the sensing device 404.

The article and moving body searching and managing means 405 stores the information on the article and the moving body in the article and moving body database 406, and updates the relevant information each time the position (positional coordinate) of each article or the moving body is changed. The timing of update is not limited thereto, and, for example, the timing of the update may be appropriately set such as updating at every predetermined time etc.

The article history data and the moving body history data are preferably data stored over as long period of time as possible. Thus, the history can then be traced back to the past. The moving body history data preferably has the data stored at as short time interval as possible. The movement path of the moving body such as human, robot, and the like can thus be more finely managed. Since the capacity of the database is limited, the data of a predetermined period is stored, and the past data before the relevant period may be erased as needed. The time interval for storing the data is shortened if the change in the state of the moving body is great, and the time interval is extended if the change in state is small.

(Environment Map and Facility Database)

Figure 2J:
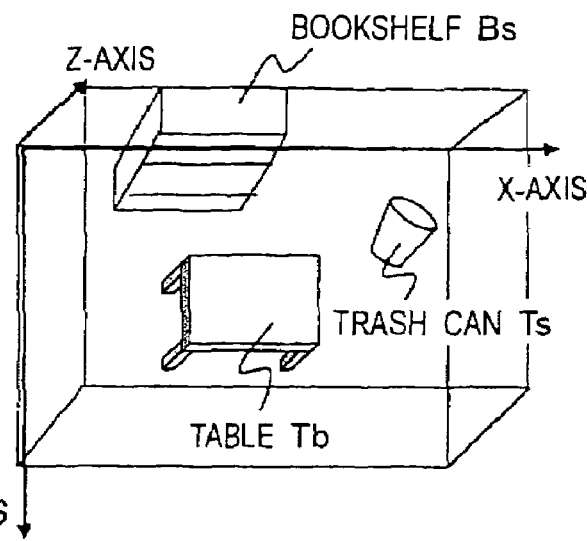
FIG. 2J is an explanatory view of an example of an actual environment of the environment map of an environment map database.
Figure 2K:
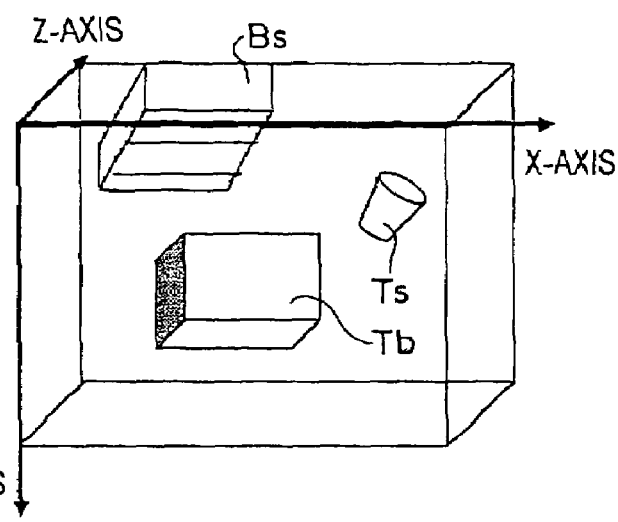
FIG. 2K is an explanatory view of an environment map simplifying the actual environment of FIG. 2J of the environment map of the environment map database with a three dimensional model.
Figure 2L:
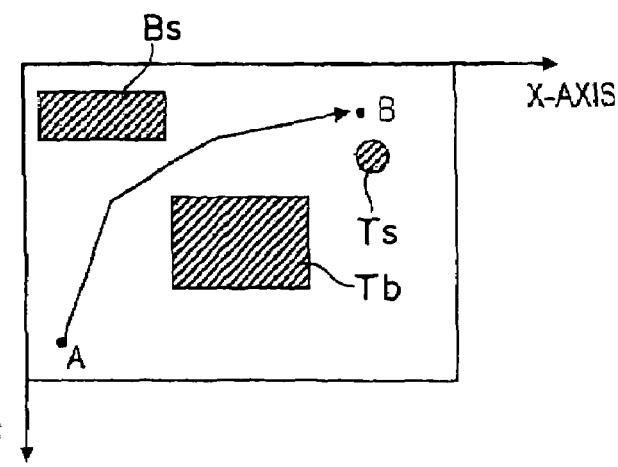
FIG. 2L is an explanatory view of an environment map further simplifying the actual environment of FIG. 2J of the environment map of the environment map database with a plane model.

FIGS. 2J to 2L are examples of the environment map of the environment map database 408. FIG. 2J is an example of the actual environment, FIG. 2K is an environment map simplifying the actual environment of FIG. 2J with a three dimensional model, and FIG. 2L is an environment map further simplifying it with plane model.

The environment map may be created according to the intended purpose thereof and the time (trouble) required in the creation. For example, when it is necessary to create the environment map made of a three dimensional model in an extremely short period of time, the three dimensional objects present in the environment are modeled with a smallest rectangular solid that covers the object as in FIG. 2K. In FIG. 2K, the table Tb and the bookshelf Bs are respectively modeled with rectangular solids, and the trash can Ts is modeled with a substantially circular column. This is the same for the environment map made of a plane model, where the table Tb and the bookshelf Bs are respectively modeled with rectangular regions (regions with slashed lines) orthogonally projected onto the plane, and the trash can Ts is modeled with a circular region (region with slashed lines) in FIG. 2L. The two rectangular regions and the circular region are set as regions where the robot 402 cannot move. Furthermore, the result of three dimensionally modeling the actual environment as shown in FIG. 2J as it is may be considered as the environment map.

FIG. 2M is a view showing one example of a facility database 408e attached to the environment map, and corresponds to the environment of FIG. 2J. The facility database includes two sub-databases 408e-1 and 408e-2 respectively storing the facility data and the facility attribute data.

1) Facility Data

The facility data stored in the sub-database 408e-1 includes the ID information (e.g., "room_0001", etc. as ID in FIG. 2M) for specifying the environment itself and the individual facility (unlike article, fixed or installed in the environment and not the target of handling work of the robot) in this environment, and the pointer (e.g., "room01", etc. as attribute data in FIG. 2M) for the facility attribute data. More specifically, in FIG. 2M, the "room_0001" is given to the environment (room) as the ID information, and the "table_0001", "bookshelf_0001", and "trash_0001" are respectively given to the table Tb, the bookshelf Bs, and the trash can Ts present in the environment as the ID information.

2) Facility Attribute Data

In the facility attribute data stored in the sub-database 408e-2, the facility attribute data related to the environment itself includes the floor data of the environment. For example, when a plurality of floors having different heights from each other are present in the environment, the floor data (e.g., "floor 1, floor 2", etc. as configuration surface of room_01 in FIG. 2M) for the number of floors are stored. For example, the floor data is expressed as below.

((X1,Y1,Z1), (X2,Y2,Z2), (X3,Y3,Z3), (X4,Y4,Z4), 2200, 0)

Here, the first four sets of coordinate values represent the actual world coordinates of respective vertexes configuring the floor, and the next value (2200) represents the distance (mm) from the floor to the ceiling. The last value (0) refers to the material of the floor. For example, "0" refers to flooring, "1" refers to tatami mat, and "2" refers to carpet, etc.

The facility attribute data related to the facilities such as furniture and the like includes the data (surface 1, surface 2) of each surface configuring the facility, the type of facility, and when the facility has a surface on which the article can be placed, the shape and the orientation of the main article to be placed on the relevant surface. Specifically, for example, the data of the surfaces configuring the facility is expressed as below.

((X1,Y1,Z1), (X2,Y2,Z2), (X3,Y3,Z3), 1, 400)

Here, the first three sets of the coordinate values represent the actual world coordinates of respective vertexes configuring the surface. The next value (1) is a flag on whether or not the article can be placed on the relevant surface, where "1" means that the article is placeable, and "0" means that the article is not placeable. The last value (400) represents the upper limit height (mm) of the placeable article when the article can be placed on the relevant surface. For example, if the relevant surface is the top plate of the table, the upper limit height is the distance from the top plate to the ceiling, and if the relevant surface is one of the shelf surface in the bookshelf, the distance from the shelf surface to the shelf immediately above becomes the upper limit height.

The "shape of the main article" in the facility attribute data is the shape of the article to be accommodated in the facility. If the type of facility is the bookshelf, it becomes "shape of the book". That is, the rectangular solid whose depth and height are extremely long compared to its width is the shape of the main article of the bookshelf. The "orientation of the main article" is the orientation of the article when accommodated in the facility. If the type of facility is the bookshelf, it is at what orientation the relevant book should be placed on the shelf surface of the bookshelf, and normally, is the orientation of the book in the standing state. For example, when the work for the working robot 402 to move the book to the bookshelf is specified by storing the data of "shape and orientation of the main article" in the facility attribute data, the working robot 402 is able to place the specified book in a standing orientation on the shelf of the bookshelf based on the data of "shape and orientation of the main article".

However, "shape and orientation of the main article" data may not be provided depending on the type of facility. For example, the table and the trash can do not have restrictions in the shape and orientation of the article. Thus, the facility attribute data of the table and the trash can does not have the data on the "shape and orientation of the main article".

<Configuration of Working Robot>

The working robot 402 performs a handling work of the article in the environment. In particular, the working robot performs the work of moving the article in the environment according to the instructions of the user.

As shown in FIG. 2A and FIG. 2F, the robot 402 includes: an obstacle sensor 411 (device capable of functioning as another example of the recognizing device 101 of the article holding system 10) for detecting the obstacles or the like near the robot 402; the article holding system 10 including the holding device 103 for holding the article; a movement plan creating means 413 for planning the movement plan of the robot 402 with reference to the environment map in the environment map database 408 of the environment managing server 401 via the transmitting and receiving means 409 and the control means 415 of the robot 402, the transmitting and receiving means 409 and the control means 410 of the environment management server 401, the article and moving body searching and managing means 405, or the like; and a movement device 414 for moving the robot 402 itself. The transmitting and receiving means 409 performs transmission and reception of various data between the environment management server 401 and the operation terminal 403, based on the control of the control means 415. The control means 415 is connected to the obstacle sensor 411, the transmitting and receiving means 409, and the article holding system 10, the movement planning creating means 413, and the movement device 414, and independently controls the respective operations.

As described above, FIG. 2A is a schematic view showing one example of the configuration of the robot 402, where the robot 402 includes a substantially box shaped main body 390 for accommodating the movement planning creating means 413, the control means 415, and the like, as described above. Hereinafter, the near side of the plane of drawing in FIG. 2A is referred to as the front side, the back side of the plane of the drawing as the back side, the right side of the plane of the drawing as the left side, and the left side of the plane of the drawing as the right side.

As described above, each holding device 103 of the article holding system 10 is configured by the articulate arm 103$b$, the hand 103$a$ arranged at the distal end of the arm 103$b$, and a driving device for independently driving the arm 103$b$ and the hand 103$a$, and is attached to each of the upper parts on both sides of the main body 390. Each of the driving devices of the arm 103$b$ and the hand 103$a$ may be configured by an actuator by motor control, or may be configured by other actuators such as the actuator by artificial muscle. Furthermore, when arranging the suction hand 103$s$ for holding the article through suction of air as the holding device 103, it may be configured by the suction hand 103$s$ and a suction device for controlling the suction operation and the suction release operation of the suction hand 103$s$.

In the article holding system 10 by the robot, a tag reader 404$a$ serving as one example of the sensing device 404 of the environment management server 401 is attached to each holding device 103 (see FIG. 2A) assuming the electronic tag is provided to each article present in the environment. Thus, when the holding device 103 holds the article, the information written on the electronic tag of the held article is read by the tag reader 404$a$, and what article is held by the holding device 103 can be specified from the read information by the article and moving body searching and managing means 405 of the environment management server 401 referring to the article and moving body database 406. The tag reader 404$a$ to be attached to the holding device 103 is omitted, and the tag reader 404$a$ installed in the environment may be used.

The movement device 414 is configured by four wheels 394, a motor 304 for driving the four wheels 394 for forward and reverse rotations, a motor driver 303 for drive-controlling the motor 304, and the like (see FIG. 2C), and the wheels 394 are attached by twos on both left and right sides of the main body 390 (in the example of FIG. 2A, illustration of wheel 394 on back right side is omitted) An optimum configuration may be selected according to the environment where the robot 402 is used, for the configuration of the movement device 414. For example, if the undulation of the floor of the environment is strong, the movement device 414 is preferably configured as a crawler type or a multi-legged walking type.

The obstacle sensor 411 is configured by ultrasonic sensors 411$a$, a pair of cameras 105 serving as a visual sensor, and a collision sensor 411$c$. The ultrasonic sensors 411$a$ each calculates the approximate distance to the obstacle by measuring the time from when the ultrasonic wave is emitted until the reflected wave thereof is received, and detects the obstacle at a close range before the colliding with the robot 402. The ultrasonic sensors 411$a$ are attached by threes at the lower part of each side surface (front surface, back surface, left and right side surfaces) of the main body 390 as one example. Each camera 105 inputs the state of the surrounding of the robot 402 as an image. The presence of the obstacle is determined and more accurate information is obtained with regards to the article to be held, by performing the recognition process or the like on the image. The camera 105 is attached to the upper part on the front part of the main body 390. Furthermore, the collision sensor 411$c$ detects that a predetermined impact force has been applied to the robot 402. For example, the collision sensor 411$c$ detects that an obstacle has collided to the robot 402 or that the robot 402 itself has collided to an obstacle during the movement. The collision sensor 411$c$ is attached to the lower part of each of the front surface and the back surface of the main body 390.

When the moving work of the article or the movement involved in other works is specified, the movement plan creating means 413 creates the movement path from the positional coordinate of the current position of the robot 402 to the positional coordinate of the target position with reference to the environment map of the environment map database 408. The non-movable regions (regions with slashed lines) are set in the environment map, as shown in FIG. 2L. Thus, the movement path avoiding the obstacle can be created if the movement path is created in the region other than the non-movable regions. For example, in FIG. 2L, a route avoiding the non-movable region as shown with an arrow is created in consideration of the size of the robot 402 when moving from the point A to the point B. A most general Dijkstra method may be used in the creation of the movement path, and a route search algorithm devised from the Dijkstra method may be used if the environment is complicating. Alternatively, as a measure for when the movement path cannot be calculated since the environment is too complicating or when a great amount of time is required for the calculation, a mode for the user to specify the movement path of the robot 402 to the movement plan creating means 413 using the operation terminal 403 may be provided.

(Control Command of Robot)

The control means 415 of the working robot 402 interprets the robot control command sequence sent mainly from the environment management sever 401 via the transmitting and receiving means 409, 409 of the environment management server side and the working robot side, and executes the control command in sequence.

The robot control command is a command for performing the control of holding the article or the movement of the robot 402 itself, and mainly includes three types of "move", "hold", and "release". The three types of commands will now be briefly described.

1) Move: (Move, Coordinate) or (Move, Facility ID)

This is a command for moving from the positional coordinate of the current position of the robot 402 to the position specified with the positional coordinate, or to the positional coordinate of the position of the facility specified with the facility ID information. The positional coordinate is specified with the world coordinate system, and the movement path from the positional coordinate of the current position to the positional coordinate of the target position is planned by the movement plan creating means 413. The path approaching up to a predetermined distance to the facility is created when moving to the positional coordinate of the position of the facility specified with the facility ID information, but in this case, the facility attribute data in the environment map is used.

2) Hold: (Grip, Article ID)

This is a command for holding the article specified with the article ID information by means of the hand 103$b$ serving as one example of the holding device 103. The position (positional coordinate) of the article is obtained with reference to the article and moving body database 406, and the holding plan as well as the hold release plan are created by the holding method specifying means 102 of the article holding system 10.

3) Release

This is a command for releasing the hand 103b based on the hold release plan.

For example, when the work of moving a certain article to a certain location is instructed from the user, the work can be disassembled to four working units of "move (to position B1 of article)", "hold (article)", "move (to destination B2)", and "release (holding of article)". The robot control command sequence in this case then becomes, move, B1 (move robot 402 to position B1 where article is placed)

grip, article ID (hold article at position B1 with holding device 103)

move, B2 (move robot 402 to position B2 or destination (while holding the article with the holding device 103))

release (release article held by the holding device 103).

When the movement of the plurality of articles is instructed, the command sequences are lined for the number of articles with four commands forming a set, and the control means 415 of the robot 402 sequentially executes the control command according to th e relevant order.

The robot control command is obviously not limited to the three types, and may be increased as necessary.

Figure 21:
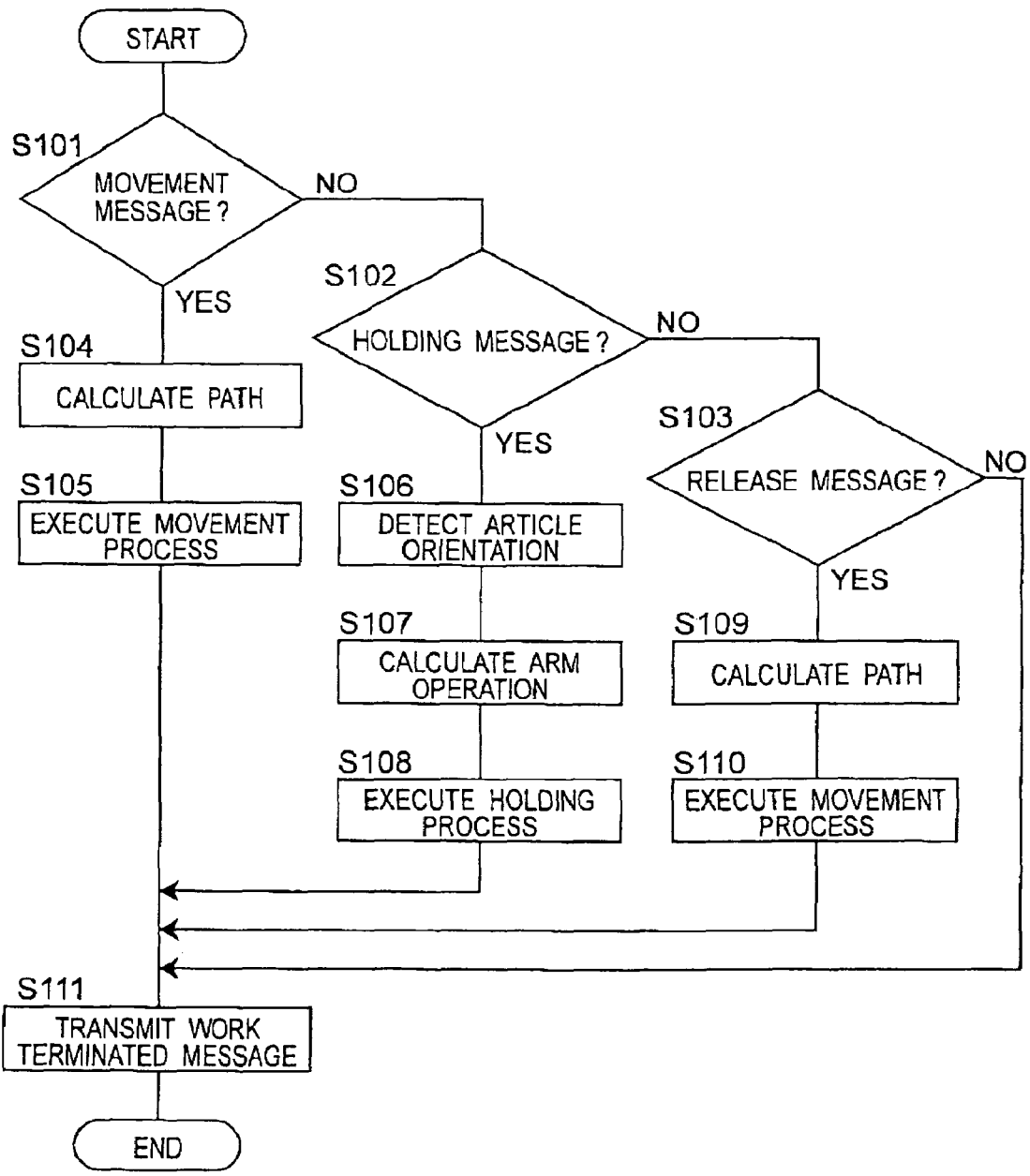
FIG. 21 is a flow chart showing the operation example of the control means of the working robot.

FIG. 21 is a flow chart illustrating the operation example of the control means 415. When the control command sequence transmitted from the environment management server 401 is received by the transmitting and receiving means 409 on the robot side or when the control command sequence is input from the article holding system 10, the control means 415 determines the working unit (steps S101 to S103 of FIG. 21) and executes the processes according to the working unit.

First, if the working unit is "move" (YES in step S101 of FIG. 21), the path to the specified position (positional coordinate) is created by the movement plan creating means 413 (step S104). Then, the movement control command is sent to the movement device 414 according to the path created by the movement plan creating means 413, and the movement process to the specified position (positional coordinate) is executed (step S105).

When the working unit is "hold" (NO in step S101 and YES in step S102), the orientation of the article to be held is detected by the obstacle sensor 411 (step S106) and the operations of the arm 103a and the hand 103b are calculated according to the detection result (step S107) Then, the hold control command is sent to the holding device 103 of the article holding system 10 from the control means 415, and the holding process of the article by the holding device 103 is executed (step S108). In step S106, the orientation of the article is recorded in the article and moving body database 406 of the environment management server 401, and thus the orientation of the article may be inquired to the environment management server 401.

If the working unit is "release" (NO in step S101, NO in step S102, and YES in step S103), the operations of the arm 103a and the hand 103b are calculated (step S109) so that the article can be arranged at the specified destination. The release control command is then sent from the control means 415 to the holding device 103 and the release process of the article is executed (step S110).

After each operation of move, hold, and release is finished, respective notifications are sent in the form of a message to the environment management server 401 or the source of the work instructions on the basis of the control of the control means 415 (step S111). The work content instructed by the operation terminal 403 is executed by the robot 402 in this manner.

<Configuration of Operation Terminal>

The operation terminal 403 is a user interface in the article holding system by the robot, and is a terminal for being operated by the user to instruct the handling work of the article to the robot 402 or to inquire about the article.

As shown in FIG. 2F, the operation terminal 403 includes a display device 417 constructed by CRT, liquid crystal display, or the like for displaying the operation screen, an input device 416 made up of a pointing device or the like for instructing the work content with respect to the robot 402 on the operation screen of the display device 417, and a display control means 418 for performing display control of creating, etc. the operation screen to be displayed on the display device 417. The transmitting and receiving means 409 sends the work content or the inquiry content of the robot 402 input to the input device 416 to the server 401, and receives the response for the inquiry from the environment management server 401 based on the control of the control means 419. The control means 419 is connected to the transmitting and receiving means 409, the input device 416, and the display control means 418, and independently controls each operation.

A general purpose PC (personal computer) or the like may be used as the operation terminal 403. In this case, the general purpose PC can be used as the operation terminal 403 by reading the control program for executing each process therein.

The display control means 418 creates the operation screen based on the information transmitted from the environment management server 401, specifically, the data of the image obtained by taking pictures of the environment by the camera serving as the sensing device 404, the data stored in the article and moving body database 406, and the environment map stored in the environment map database 408. The created operation screen is displayed on the display device 417.

In other words, in the system such as the above, the operation terminal 403 displays the image showing the predetermined living space on the display device 417, the user instructs the operation on the article contained in the image from the operation terminal 403, and the environment management server 401 converts the instructions of the user transmitted from the operation terminal 403 to the control command executable by the robot 402 with reference to the article and moving body database 406 and then transmits the same to the robot 402. According to such article operation method, the user is able to have the working robot, that is, the life support robot 402 easily execute an accurate operation in a situation where the living space is complicating.

In the article holding system 10, each holding device 103 can perform the holding operation using the object information such as the position (positional coordinate), the ID information, and the shape of the holding object, and the information of humans such as the position (positional coordinate) and the ID information of the humans.

Hereinafter, the holding of the article by the article holding system 10 will be described with specific examples.

(1. Holding of Article Capable of Accommodating Object Inside)

As described above, when holding the article with liquid inside such as glass or the like, the holding method is preferably changed according to the state of whether or not the liquid is inside. That is, when holding the glass with the liquid inside, the liquid will spill out if the glass is tilted or vibration is applied to the glass, and thus the glass is preferably subjected to orientation control so as to be as horizontal as possible and so that vibration is not applied. When holding the glass without the liquid inside, on the other hand, such orientation control is not particularly necessary.

When holding the article (glass herein) that can accommodate an object inside, the holding device 103 of the article holding system 10 recognizes whether or not the object is accommodated inside (whether or not water is in the glass) by a camera or the like serving as one example of the recognizing device 101. One example of the recognizing method includes a recognizing method that employs refraction of light.

FIG. 3 is a view showing a configuration of the recognizing device 101 for recognizing the content of the glass 201 by employing the refraction of light. The recognizing device 101 further includes a light source 104 for projecting light to the glass 201, an image-taking device 105 for taking pictures of the state in which the light is projected to the glass 201, and the recognition processing part 101p for recognition-processing the information obtained with the image-taking device 105. The light source 104 is preferably such that irradiates a light of strong directivity, and may be laser irradiation device or the like. The image-taking device 105 only needs to be able to detect the trajectory of the laser light irradiated from the laser irradiation device 104, and may be a camera as an example. The laser irradiating device 104 is preferably attached to the arm 103g of the robot 402, as shown in FIG. 2A, so that the position (positional coordinate) thereof is changeable. The camera 105 may be configured so as to be embedded in the face of a humanoid robot 402.

The recognizing device 101 irradiates the laser light 104g to the holding object (glass 201 having light transmissivity herein) from the laser irradiating device 104 when recognizing the content of the glass 201.

Normally, since the index of refraction of the gas (air) and the index of refraction of the liquid (water) are different (e.g., index of refraction of air is 1.0, index of refraction of water is about 1.33), the trajectory of the laser light 104g changes depending on whether or not liquid 201e is inside the glass 201. That is, since both the inside of the glass 201 and the outside of the glass 201 are filled with air when the glass 201 is empty, the laser light 104g irradiated diagonally from above on the glass 201 advances straightly, as shown in FIG. 3A. On the other hand, if water 201e is in the glass 201, the irradiated laser light 104g is refracted since the index of refraction of the air and the index of refraction of the water 201e are different, as shown in FIG. 3B.

The recognizing device 101 takes pictures of the glass 201 with the camera 105 while the laser irradiating device 104 is irradiating the laser light 104g. The trajectory of the laser light 104g is thereby detected. The recognition processing part 101p recognizes whether or not the liquid 201e is inside the glass 201 based on the detection result. Since the index of refraction of the light differs depending on the object (material), the material of the object in the glass 201 can be detected by detecting the angle of refraction of the laser light 104g.

The holding method specifying means 102 specifies the holding method based on the recognized result of the recognition processing part 101p. This specification is performed by using the holding method database 102d, but may be performed by referring the article and moving body database 406 as necessary.

Figure 4:
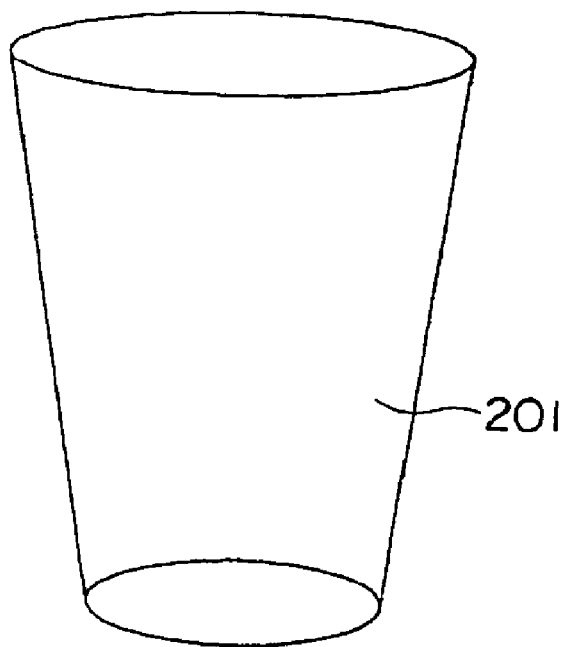
FIG. 4A is a view exemplifying the database for storing the holding method set for the glass in a table form.
FIG. 4B is a view exemplifying an empty glass.
FIG. 4C is a view showing an example of sucking the empty glass of FIG. 4B with the suction hand.
FIG. 4D is a view exemplifying the glass with liquid.
FIG. 4E is a view showing an example of gripping the glass with liquid of FIG. 4D with a finger type hand.
Figure 4:
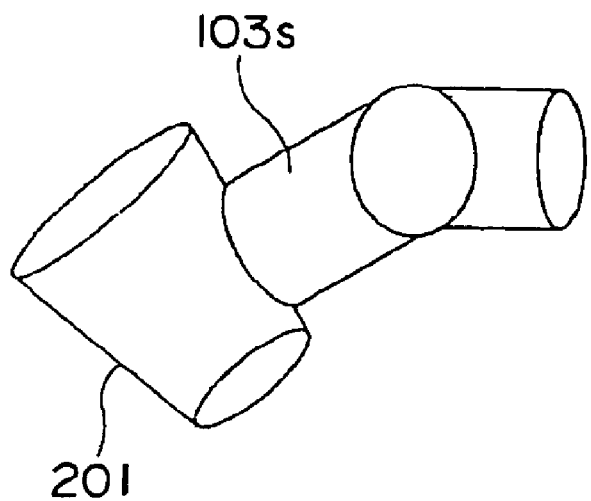
Figure 4:
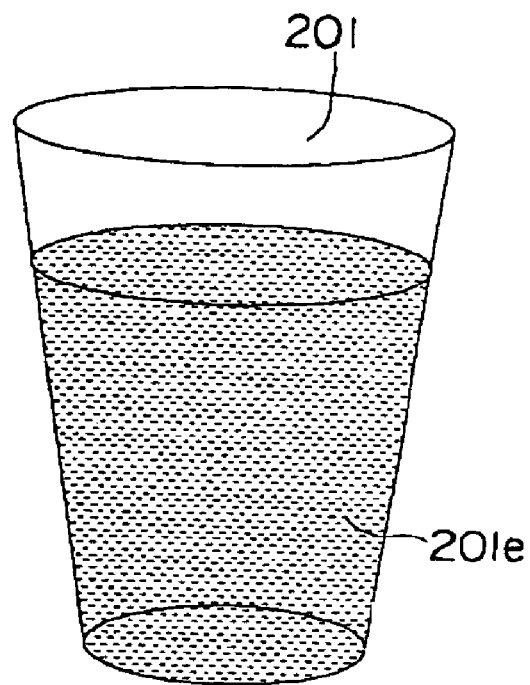
Figure 4:
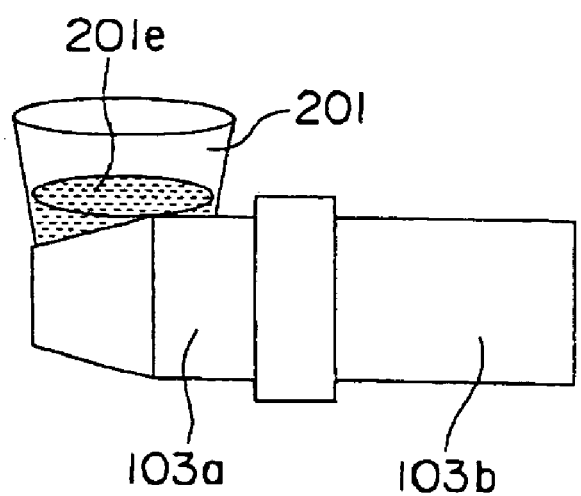

Specifically, the holding method is determined for every holding level in the holding method database 102d, as previously described in FIG. 2E in detail, but for simplicity, it is assumed that the table in which the holding methods that differ depending on the presence of the content are described is provided for every article that acts as the holding target (see FIG. 4A). In each table, the state (e.g., state of presence of content) that the article may take and the holding method most suitable for the relevant state in correspondence to each other are stored. FIG. 4A shows one example of the table corresponding to the glass 201, including "with content" (see FIG. 4D) and "without content" (see FIG. 4B) for the states the glass 201 may take, and setting "perform orientation control using finger type hand" as the holding method corresponding to "with content" (See FIG. 4E), and setting "not perform orientation control using suction hand" as the holding method corresponding to "without content" (see FIG. 4C).

Therefore, the holding method specifying means 102 specifies (selects) the holding method (see FIG. 4E) of "perform orientation control using finger type hand" by referring the holding method database 102d when the recognizing device 101 recognizes the glass 201 as with content, and specifies (selects) the holding method (see FIG. 4C) of "not perform orientation control using suction hand" by referring the holding method database 102d when the recognizing device 101 recognizes the glass 201 as without content.

The holding device 103 holds the holding object based on the control of the control means 415 according to the holding method specified by the holding method specifying means 102. Therefore, the holding device 103 holds the glass 201 while performing orientation control so that the glass 201 maintains a horizontal orientation by the finger type hand 103a (see FIG. 4E) when the glass 201 is filled with water (see FIG. 4D). If, on the other hand, the glass 201 is empty (see FIG. 4B), the glass 201 is held by the suction hand 103s (see FIG. 4C). The orientation control of the glass is not performed in this case.

In order for the holding device 103 to hold the holding object, the position (positional coordinate), the shape, and the orientation information of the holding object become necessary. The information can be acquired through various known methods using a range finder, a stereo vision, etc. The details of the method of acquiring the position (positional coordinate), the shape, and the orientation information of the holding object will be described below, and the method may be performed by referring the article and moving body database 406.

Therefore, with regards to the article that can accommodate an object inside such as the glass 201 described above, the state changes with respect to time such as the object being accommodated inside and not being accommodated inside. When such article is held by the holding device 103, the recognizing device 101 recognizes whether or not the object is accommodated inside the article (holding object), and the holding method specifying means 102 specifies the holding method according to whether or not the object is accommodated inside. The article that can accommodate the object inside can thus be most suitably held according to the state thereof.

(Modification)

The holding method database 102d referred by the holding method specifying means 102 does not need to be possessed by the article holding system 10, and for example, the tag such as electronic tag may be given to the holding object (each article), and information such as holding method and the like corresponding to the state of the holding object may be written in the tag in advance. In this case, the holding method specifying means 102 can specify the holding method corresponding to the recognized result by referring the information such as holding method in the tag given to the holding object.

The address (internet address) of the server having a database storing information such as holding method may be stored in the tag instead of writing information such as the holding method in advance on the tag. In this case, the holding method specifying means 102 accesses the address and refers the information such as the holding method of the database to specify the holding method corresponding to the recognized result. The medium for storing such information is not limited to the electronic tag. The medium may be optical tag, barcode, two dimensional barcode, or the like.

Figure 23:
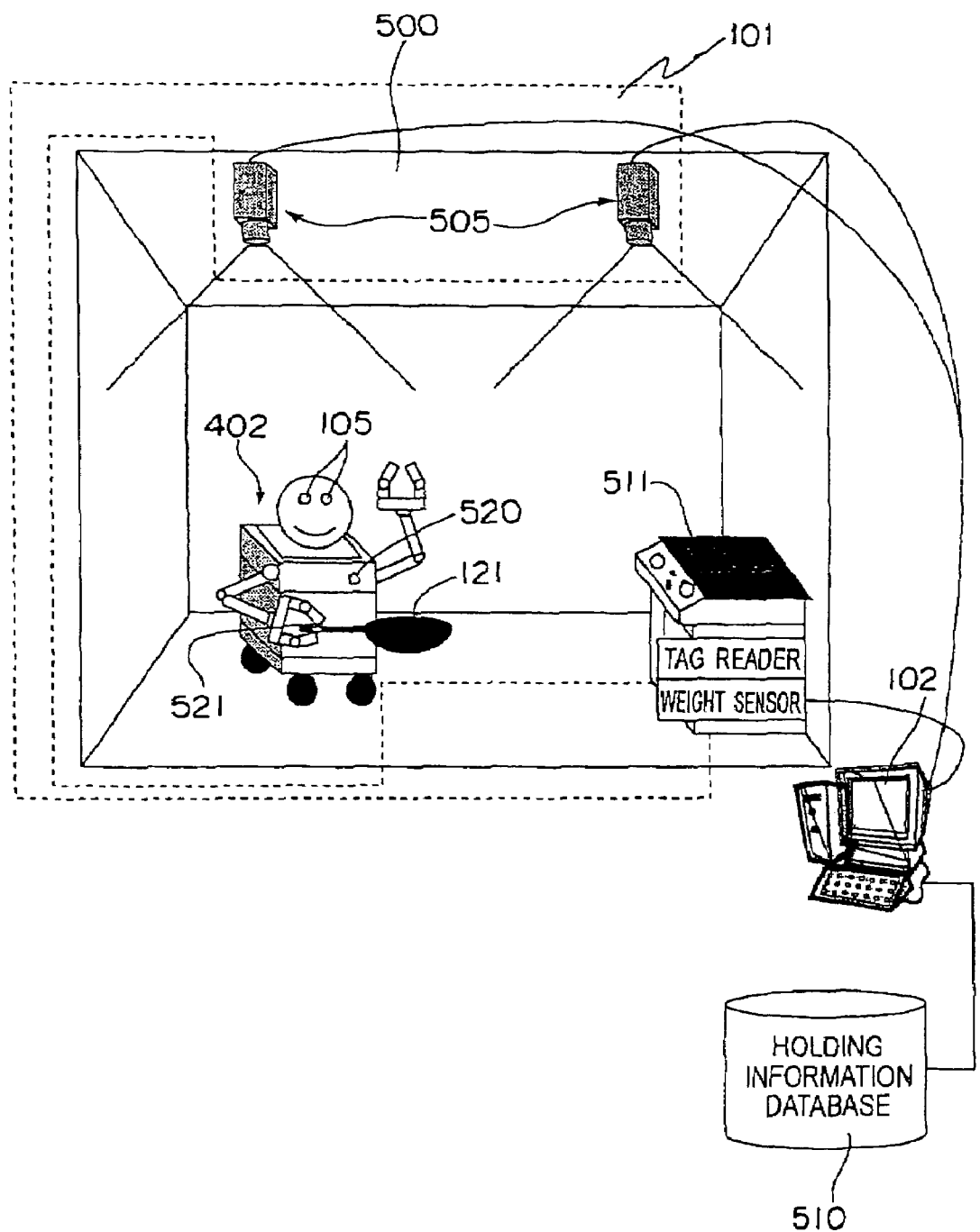
FIG. 23 is an explanatory view for determining the holding method corresponding to the temperature state of the article when the robot performs the work of taking pans and frying pans from the cooking stove.

The article holding system 10 recognizes the presence of the content of the glass 201 based on the trajectory of the laser light 104g in FIGS. 3A and 3B, but the recognition using the refraction of light is not limited thereto. For example, a picture of the object whose relative position (positional coordinate) with respect to the camera 105 is known may be taken through the glass 201, and at which position (positional coordinate) on the glass 201 the object is seen is detected to recognize the presence of the content of the glass 201. In this case, the image-taken object may be the object present in the environment (room in general household). The relative position (positional coordinate) can be obtained by attaching the camera 505 to the ceiling 500 of the room, creating the map information from the image of the camera 505, and storing in advance the positional coordinate in the created map information to the databases of the article and moving body database 406, the holding method database 102d, etc., for example, as shown in FIG. 23.

The presence of the content of the glass 201 can be recognized other than by using the refraction of the light.

For example, the presence of the content of the glass 201 can be recognized by weighing the weight of the glass 201 using a weight sensor or the like. In this case, it is necessary to know the weight of an empty glass 201 in advance, but the weight of the empty glass 201 may be embedded in the tag attached to the glass 201 as one example. The weight sensor may be attached to the holding device 103, and the glass 201 may be held by the holding device 103 before specifying the holding method and then the weight of the glass 201 is weighed thereby, or the weight sensor may be attached to the shelf, the table, or the like where the glass 201 is placed to weigh the weight of the glass 201. The recognition using the weight sensor has an advantage in that a holding object does not necessarily need to have light transmissivity, and in that recognition is possible for all articles. The recognition of the state using the weight sensor is applicable to, for example, recognizing whether food, etc. is placed on a plate when holding the plate etc.

The presence of the content of the glass 201 may be recognized using, for example, a water drop sensor. The water drop sensor is attached to the distal end of the arm 103b of the robot 402, and the sensor only needs to contact the outer surface of the glass 201. In this case, the holding method is determined with reference to the table of FIG. 4A with "with content" for when determined that water droplets are present, and "no content" for when water droplets are not present.

(2. Specification of Holding Method Corresponding to Change in Form)

The holding of the article whose form changes will now be described. When holding (gripping) the article (e g., paper waste) 202a having a three dimensional shape, the article is generally pinched from above by means of the finger type hand 103a, as shown in FIG. 5A.

On the other hand, it is extremely difficult to execute the above holding method when the article is a sheet form article 202b, for example, a sheet of paper or cloth placed on the floor. When gripping such paper or cloth, it is efficient to hold the article through suction by means of the suction hand 103s, as shown FIG. 5B.

Furthermore, if a hundred sheets of paper are stacked, it is difficult to hold the same through suction, even if the paper is the same, in consideration of the weight. In this case, the stack of paper 202c is efficiently sandwiched by the finger type hand 103a in the thickness direction, as shown in FIG. 5C.

Figure 5A:
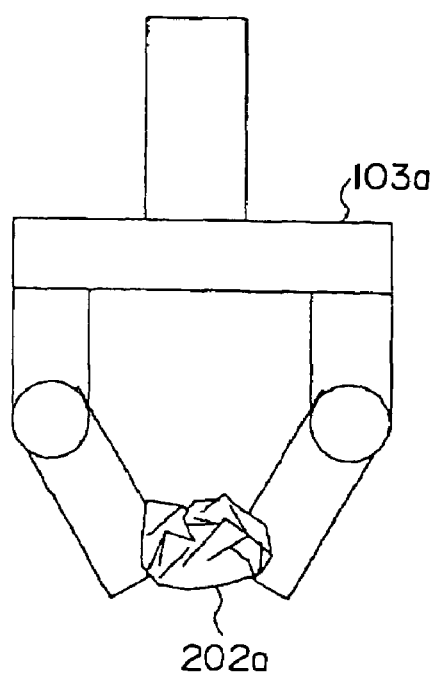
FIG. 5A is a view showing one example of the holding method for pinching the article from above by means of the finger type hand when holding the paper of each form.
Figure 5B:
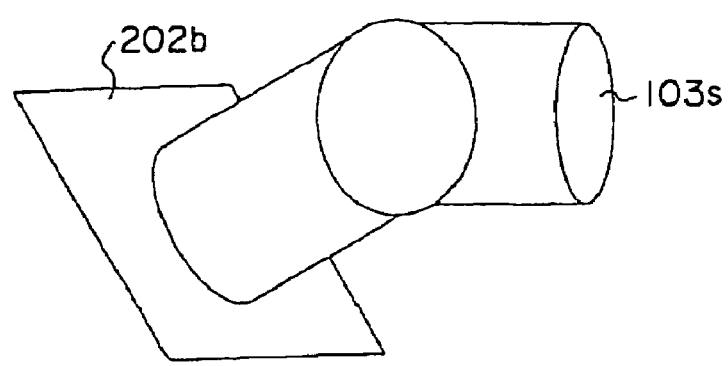
FIG. 5B is an explanatory view showing the state of holding the paper through suction by means of the suction hand.
Figure 5C:
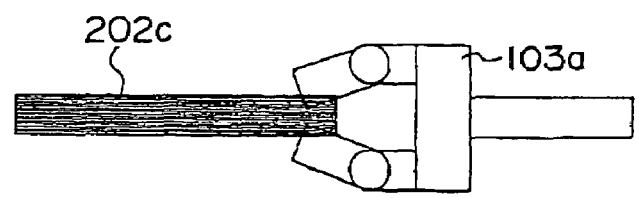
FIG. 5C is an explanatory view showing a state of pinching a stack of paper by means of the finger type hand in the thickness direction.
Figure 5:
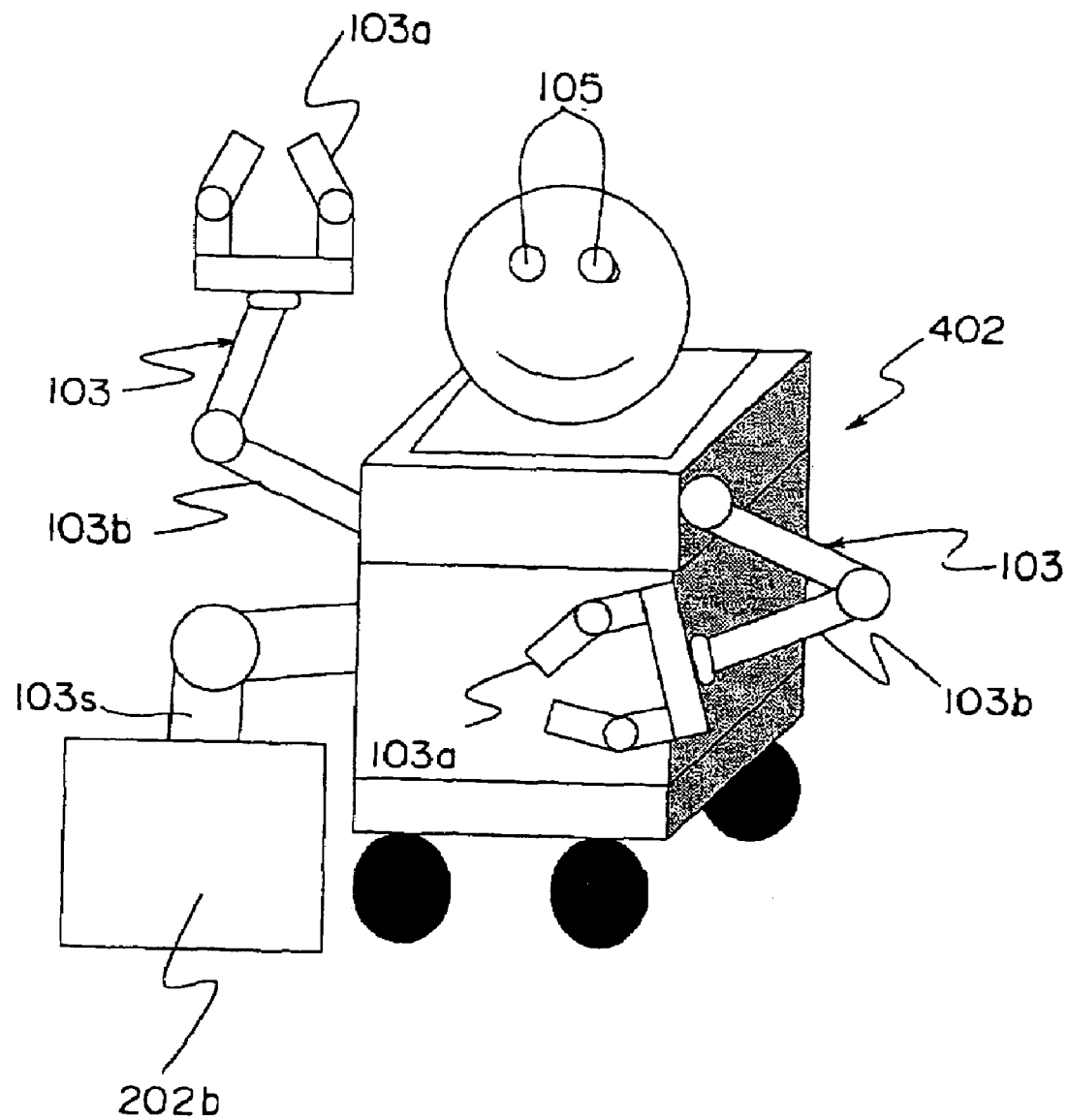
FIG. 5D is an explanatory view showing a state of holding the paper through suction by means of the suction hand.
FIG. 5E is an explanatory view showing a state of pinching the edge of the sucked paper from above and below with the finger type hand.
FIG. 5F is an explanatory view showing a state of realizing the gripping of the paper with the finger type hand by stopping the suction of the suction hand.
FIG. 5G is a view showing a list of the holding methods by the robot shown in FIG. 2A.
FIG. 5H is a view showing a method of holding by sandwiching using two finger type hands of both arms.
FIG. 5I is a view showing a method of holding an object placed on the two finger type hands of both arms while pressing with the suction hand.

Furthermore, if the paper is crumpled into a ball, it is efficiently to pinch the paper from above by the finger type hand 103a, as shown in FIG. 5A, even if the paper is the same.

Therefore, the most suitable holding method changes depending on the form even if the article is the same paper. Thus, the article holding system 10 recognizes the form of the holding object, and specifies (selects) the most suitable holding method according to the recognized result.

The recognition of the form of the holding object can be performed by using a tag reader (tag reader e.g., 404a) for receiving information of the electronic tag attached to the holding object and the range finder. That is, in this case, the tag reader (e.g., tag reader 404a) and the range finder (not shown) are further arranged as the recognizing device 101 of the article holding system 10. Furthermore, it is assumed that what the article is (information specifying the article), and a table associating the state (form) that the article (paper in this example) may take and the most suitable holding method, as shown in FIG. 6, are stored in the electronic tag.

The recognizing device 101 of the article holding system 10 first reads the information of the holding object by means of the tag reader (e.g., tag reader 404a) when recognizing the form of the holding object. The information of the electronic tag given to each paper can be simultaneously recognized even if the holding object is paper stacked in pluralities by having the electronic tag to be anti-collision respondable. Thus, what the holding object is can be specified and the table can be acquired from the information of the electronic tag.

The recognizing device 101 of the article holding system 10 detects the shape of the holding object with the range finder. The form of the holding object is recognized by the recognition processing part 101p from the detection result.

The holding method specifying means 102 specifies the holding method corresponding to the form of the recognized holding object by referring the table based on the recognized result.

The holding device 103 holds the holding object according to the holding method specified by the holding method specifying means 102. That is, if the holding object is a piece of paper 202b placed flat, the holding device 103 holds the paper 202b with the suction hand 103s. If the holding object is the paper 202a crumpled into a ball, the holding device 103 pinches the crumpled paper 202a from above by means of the finger type hand 103a. If the holding object is a stack 202c of a plurality of pieces of paper, the holding device 103 sandwiches the stack 202c of paper in the lateral direction by means of the finger type hand 103a.

The holding object can be thereby held with the most suitable holding method according to the form thereof.

The holding method of the paper is obviously not limited thereto, and may be a combination of a plurality of holding devices 103. An example in which holding is performed by a combination of the suction hand 103s and the finger type hand 103a when the holding object is a sheet of paper placed on the floor will now be described using FIG. 2A and FIG. 5D.

Figure 5E:
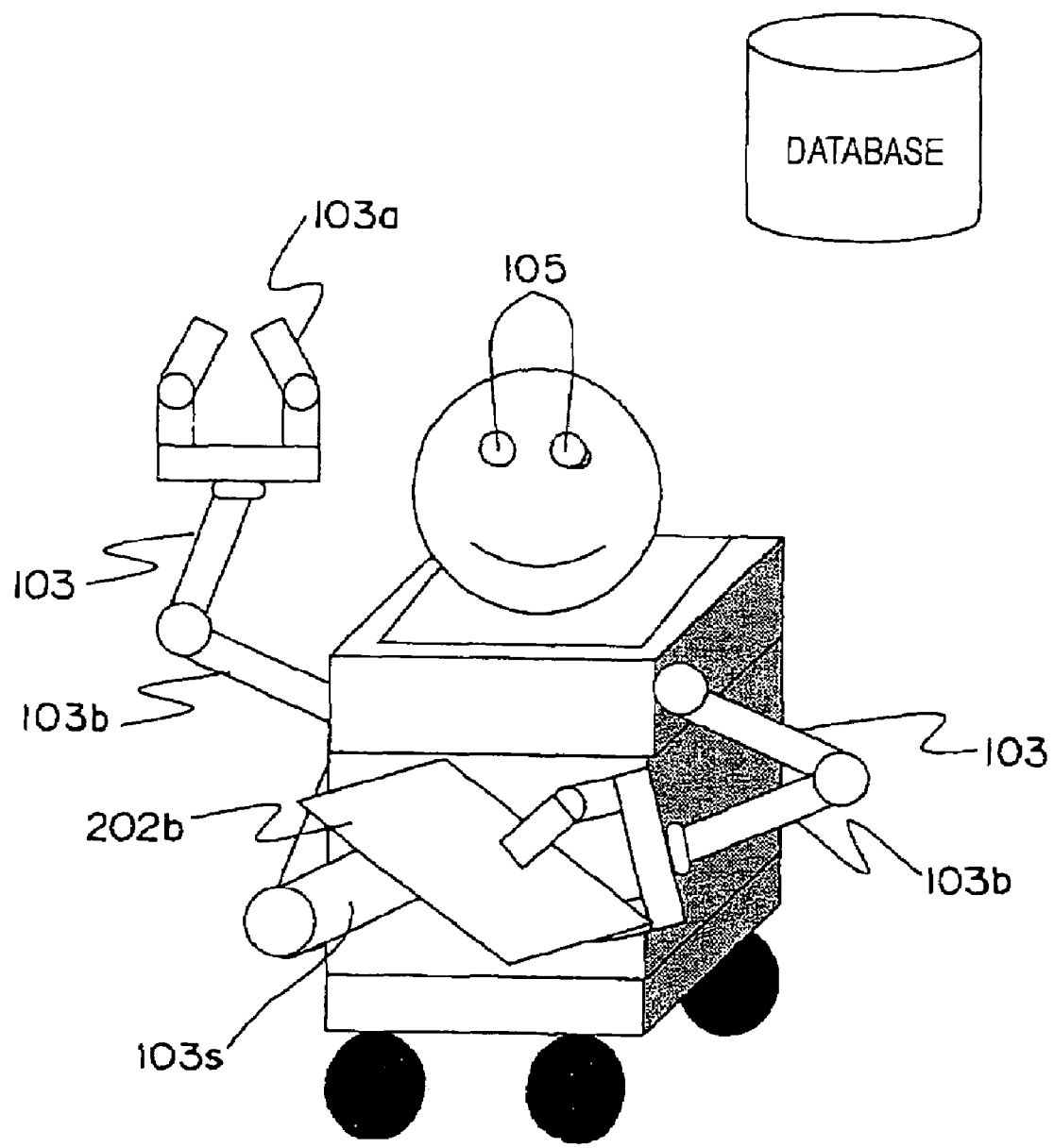

FIG. 2A shows such a state. Even when attempting to pinch the paper with the finger type hand 103, if the paper 202b is placed on the floor, the relevant operation is difficult for the robot 402. Then, first, the robot 402 holds the paper 202b through suction by means of the suction hand 103s, as shown in FIG. 5D. Thereafter, the robot 402 is controlled so as to bring the suction hand 103s and the finger type hand 103a closer to each other, and have the edge of the sucked paper 202b pinched from above and below with the finger type hand 103a (FIG. 5E) Thereafter, the suction of the suction hand 103s is stopped (e.g., suction device is stopped by control of control means 415) and the gripping of the paper 202b by means of the finger type hand 103a is realized (FIG. 5F).

Figures 5F, 5G:
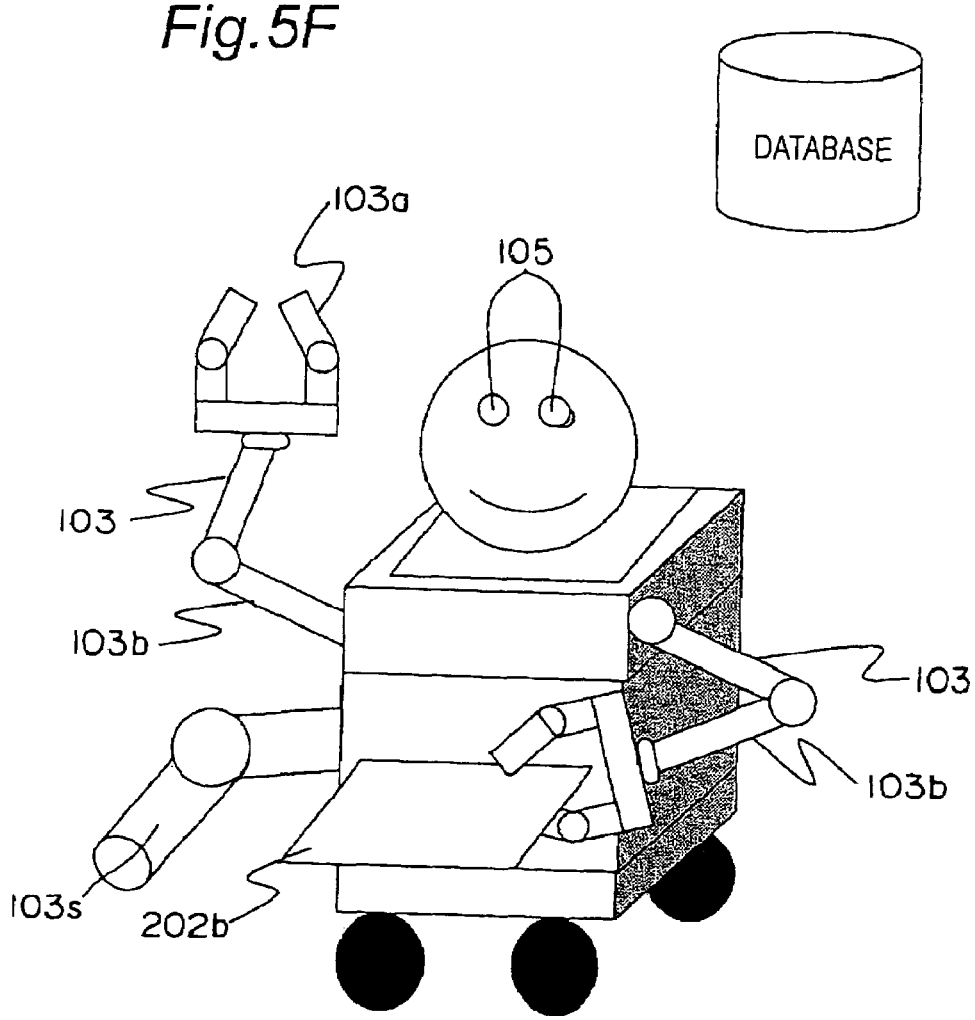
Figure 5:
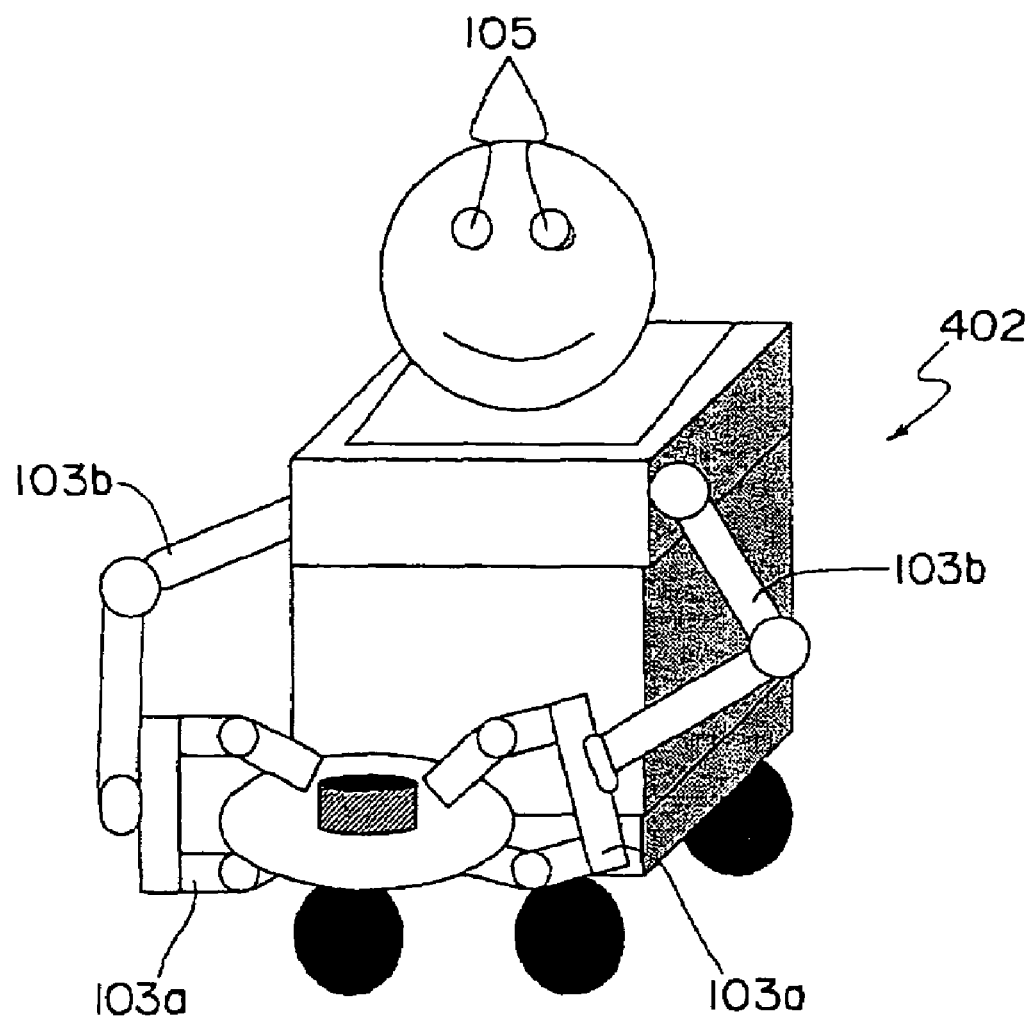
Figure 51:
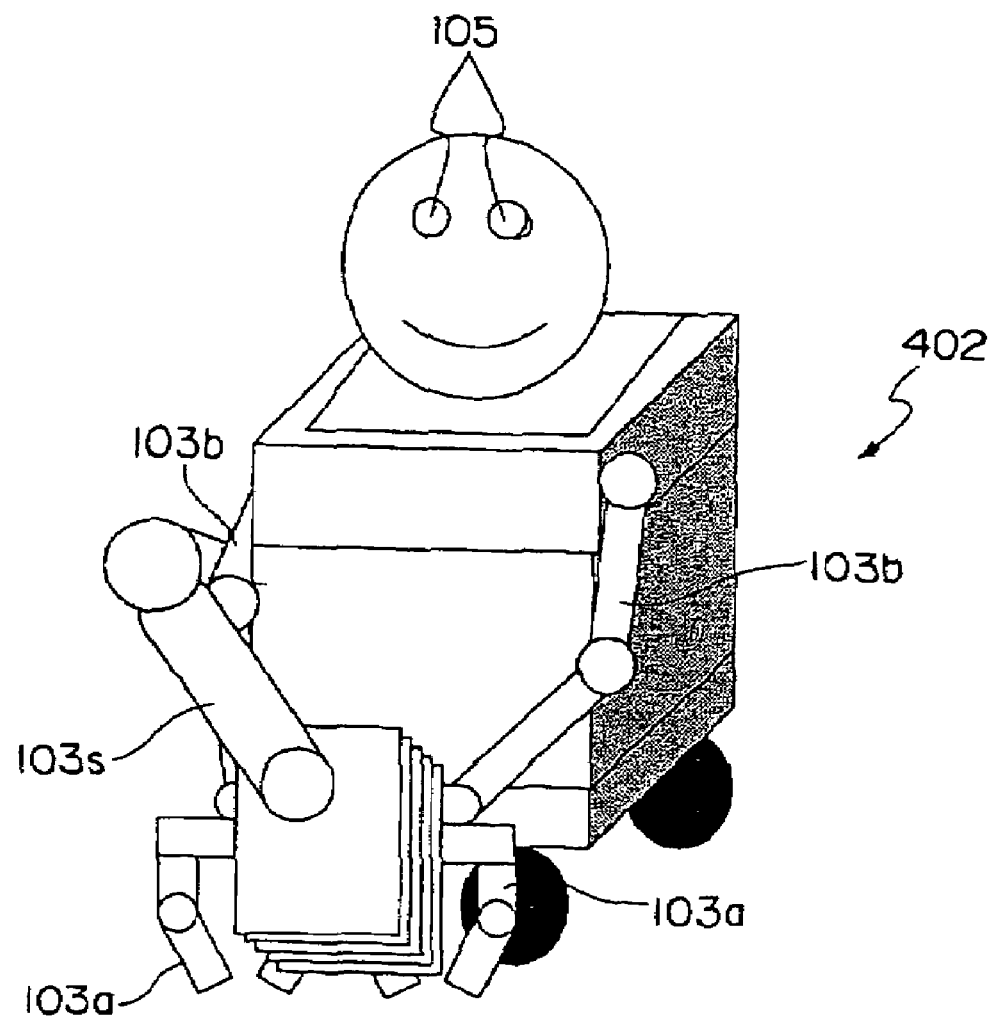

FIG. 5G shows a list of the holding methods of the robot 402 shown in FIG. 2A stored in advance in the holding method database 102d. The robot 402 has two finger type hands 103a and one suction hand 103s, as described above.

First, when using the finger type hand 103a, the method (e.g., FIGS. 5A and 5C) of holding by pinching using the finger type hand 103a of a single arm, the method (e.g., FIGS. 9 and 5H) of holding by sandwiching using two finger type hands 103a of two arms etc. may be used. The holding method using the two finger type hands 103a of two arms is effective in holding a large object and a heavy object, which are difficult to stabilize with the finger type hand 103a of a single arm.

Another holding method is a holding method (e.g., FIG. 5B) using the suction hand 103s. This is effective for paper placed on the floor, which are difficult to hold with the finger type hand 103a and the object having a surface with few bumps.

The holding method combining the finger type hand 103a and the suction hand 103s is also contrived. This includes a method (e.g., FIG. 5E) of first sucking with the suction hand 103s, and pinching the sucked object with the finger type hand 103a of a single arm, or sandwiching the sucked object with the two finger type hands 103a of two arms; a method of holding the object placed on the two finger type hands 103a of two arms while pressing down with the suction hand 103s; and the like. FIG. 5I is a view showing such a state. This is effective as a holding method of when carrying a large amount of books, documents, etc. handed over by the human or another robot, etc. to another place, like a truck.

Another example of specifying the holding method in correspondence to the form of the holding object includes clothes. The case of when the holding object is clothes will now be described with reference to FIG. 7.

In other words, the holding method of "gripping with finger type hand" is effective if the clothes are placed to be washed later. On the other hand, if the clothes have been washed and hanged on hangers or ironed and folded, it is necessary to avoid the holding method that may wrinkle the clothes.

In the example of clothes, the recognition of the form of the holding object may be performed by using the tag reader (e.g., tag reader 404a) for receiving information of an electronic tag attached to the holding object, and the range finder. In this case, for example, the table containing the information such as shown in FIG. 7 is stored in the holding method database 102d in the electronic tag. According to such a table, holding the portion of the hanger 211 with the finger type hand 103a (e.g., grip or hold as if hooking the hook portion of the hanger 211 with the finger type hand 103a) is set when the clothes 210 are hanged on the hanger 211. If the clothes 210a are folded, the holding operation of raising the clothes in the folded state using the arm 103b and the two finger type hands 103a is set, for example. If the clothes 210 are in a state other than the above (e.g., round state etc.) 210b, holding the clothes 210 so as to be pinched with the finger type hand 103a is set.

The process of the recognizing device 101 to recognize the form of the holding object, and the process of the holding method specifying means 102 to specify the holding method are as described above, and thus the description thereof is omitted.

Thus, the paper and clothes that are illustrated above are articles whose form changes with time, but the recognizing device 101 recognizes the form of the article and the holding method specifying means 102 specifies the holding method corresponding to the form when holding such articles with the holding device 103. Therefore, the articles whose form changes can be most suitably held according to the form thereof.

(3. Specification and Change in Holding Position According to State of Article)

The specification and changing of the holding position (positional coordinate) corresponding to the state of the article will now be described. This is effective when the robot 402 (household supporting robot as one example) holds a plate 203 with a food (foodstuff) 204. That is, when holding the plate 203 served with food 204, the portion of the plate 203 where the food 204 is not present is held. Thus, when the holding device 103 holds the plate 203, which is the holding object, the state of the plate 203, which is the holding object, is recognized, and the most suitable holding method is specified according to the recognized result. When holding the plate 203, at which position (positional coordinate) of the plate 203 the food 204 is present is recognized, and the holding position (positional coordinate) is specified according to the recognized result.

In this case, the state of the article is recognized by using the tag reader (e.g., tag reader 404a) and the camera (e.g., camera 105). In other words, the tag reader (e.g., tag reader 404a) and the camera (e.g., camera 105) serving as one example of the recognizing device 101 are used.

The recognition of the state of the plate 203 using the tag reader (e.g., tag reader 404a) and the camera (e.g., camera 105) will now be described using FIG. 8A. FIG. 8G illustrates the flow of the process.

First, the article holding system 10 takes pictures of the plate 203 served with food 204 with the camera at time $t=t_0$ (step S2001). FIGS. 8A and 8D are views of the images of the plate 203 and food 204 served on the plate 203. Assuming the electronic tag is attached to the plate 203, the shape data and the texture information (information such as plate 203 being circular, design 203a of plate 203 etc. shown in FIG. 8B) are stored on the electronic tag.

The article holding system 10 first reads the information of the holding object with the tag reader 404a when recognizing the state of the holding object (step S2002). The data of the plate 203 without food served thereon as shown in FIG. 8B is thereby obtained. The small circles are the design 203a of the plate 203.

Figure 8A:
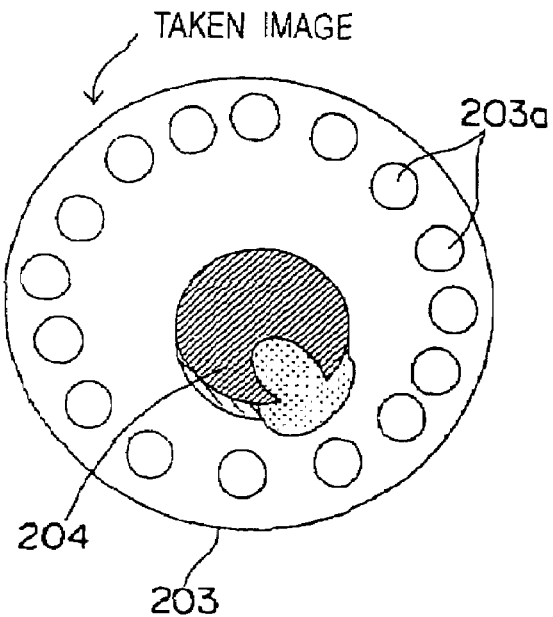
FIG. 8A is a view of an input image for explaining the recognition process of the plate and the food through background subtraction.
Figure 8B:
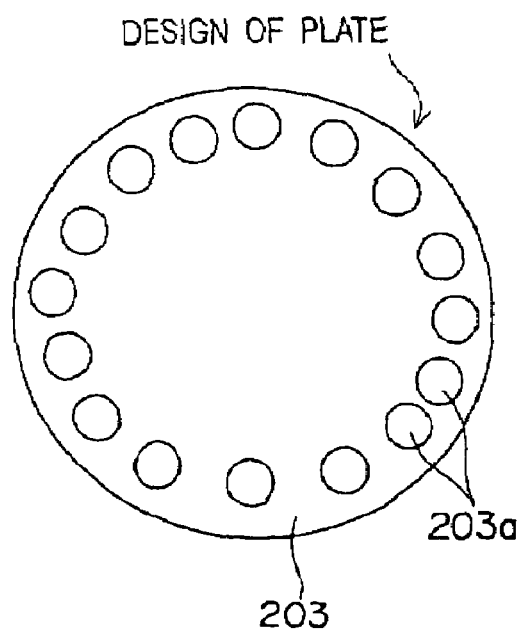
FIG. 8B is a view of a plate with design of when food is not present, for explaining the recognition process of the plate and the food through background subtraction.

The recognition processing part 101p of the recognizing device 101 executes the differential process of the data shown in FIG. 8A and the data shown in FIG. 8B (step S2003). According to the differential process, only the region 81 of the food 204 served on the plate 203 is extracted, as shown in FIG. 8C. In FIG. 8C, reference numeral 82 is the region other than the food region 81, and is the region that can be gripped with the finger type hand 103a.

Figure 8F:
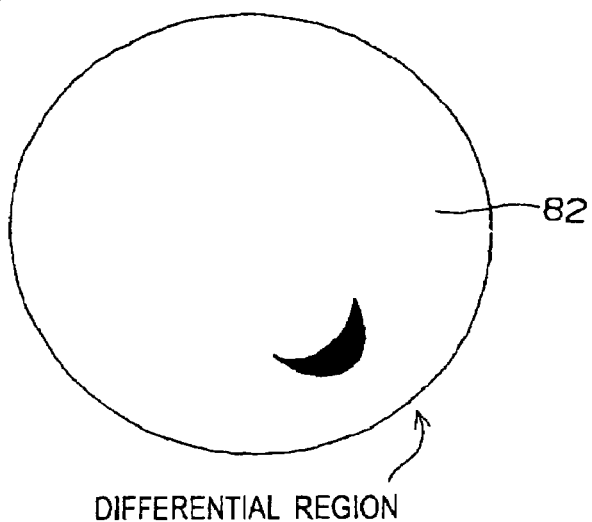
FIG. 8F is a view of a differential image of the input image of FIG. 8D and the input image of FIG. 8E.
Figure 8G:
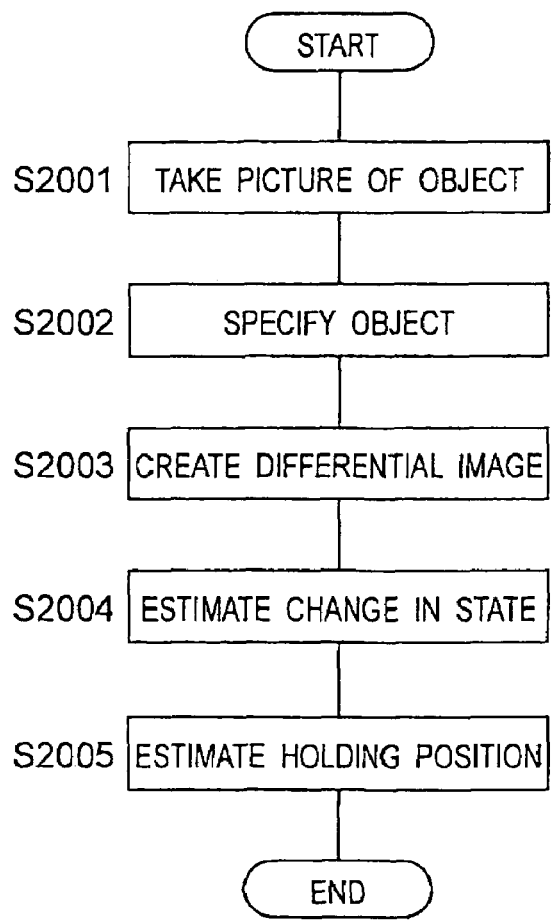
FIG. 8G is a flow chart illustrating the recognition process of the state of the plate using the tag reader and the camera.
Figure 8:
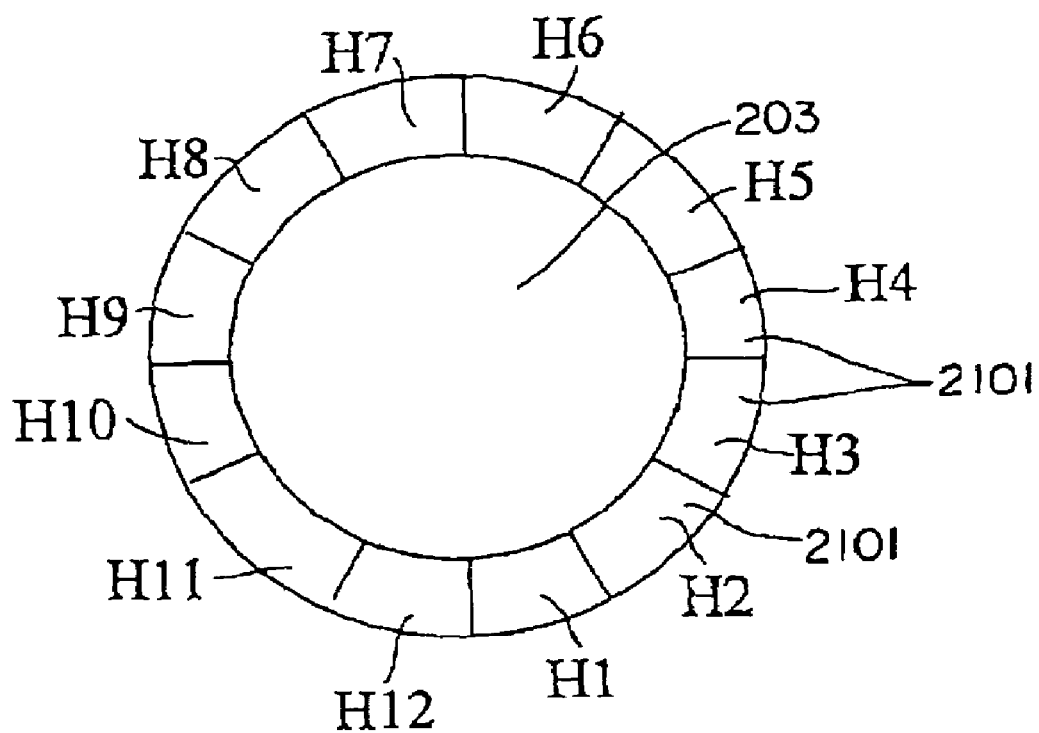
FIG. 8C is a view of the background subtraction image for explaining the recognition process of the plate and the food through background subtraction.
FIG. 8D is a view similar to FIG. 8A, and a view of the input image of the plate and the food placed on the plate at time $t=t_0$.
FIG. 8E is a view of the input image when took again at time $t=t_1$ after a constant time has elapsed from time $t=t_0$.
FIG. 8H is a view showing the holding position candidates (candidates of positional coordinate)
FIG. 8I is a view showing the holding position candidates (candidates of positional coordinate) and the food.
FIG. 8J is a view showing a non-holdable region by overlapping the differential image to the holding position information.
FIG. 8K is an explanatory view of when specifying the region other than the food region out of the entire region of the plate as the holdable region.
FIG. 8L is a view of when having a region with difference considered as holdable region and a region without difference considered as non-holdable region out of the entire region of the plate.
Figure 81:
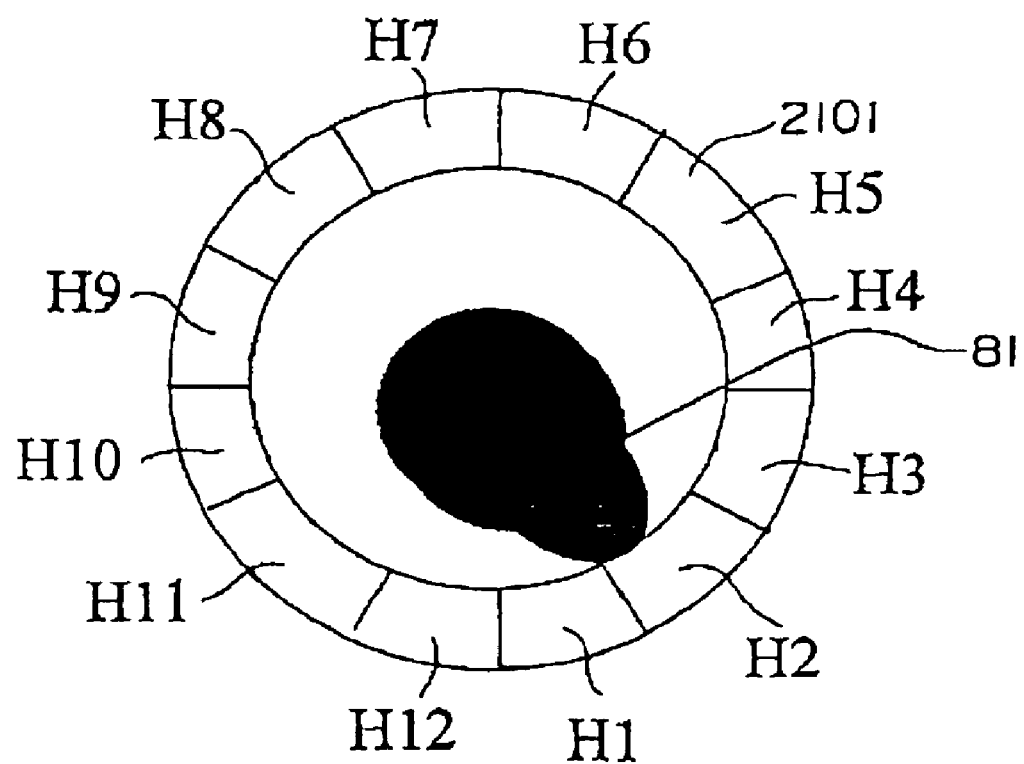

The picture-taking operation is again performed at time $t=t_1$ after a constant time has elapsed (see FIG. 8E) and the differential image is created (see FIG. 8F). The difference of each of the obtained differential images of time $t=t_0$ and time $t=t_1$ is then calculated by the recognition processing part 101p to estimate the change in state of the holding object (change in state that occurs when the sauce on the food moves in the present example) (step S2004). FIG. 8F shows the differential region obtained in the above manner.

The holding position (positional coordinate) of the plate 203 by the holding device 103 is estimated using the above result (step S2005).

More specifically, the process is as follows.

First, the holding position candidate (candidate of positional coordinate) as in FIG. 8H is stored in advance as the holding position information in the electronic tag of the plate 203, the holding method database 102d, the article and moving body database 406, and the like. In FIG. 8H, each region of H1 to 12 indicates the holding position candidate regions 2101, which are the peripheral portion of the plate 203, that may be gripped by the finger type hand 103a of the holding device 103. The holding position candidate regions H1 to 12 are the regions equally divided from the peripheral portion of the plate 203 by way of one example. The holding position information is desirably held as the shape information in the electronic tag of the plate 203, the holding method database 102d, the article and moving body database 406, and the like.

The differential image obtained in step S2003 is overlapped with the holding position information.

Figure 8J:
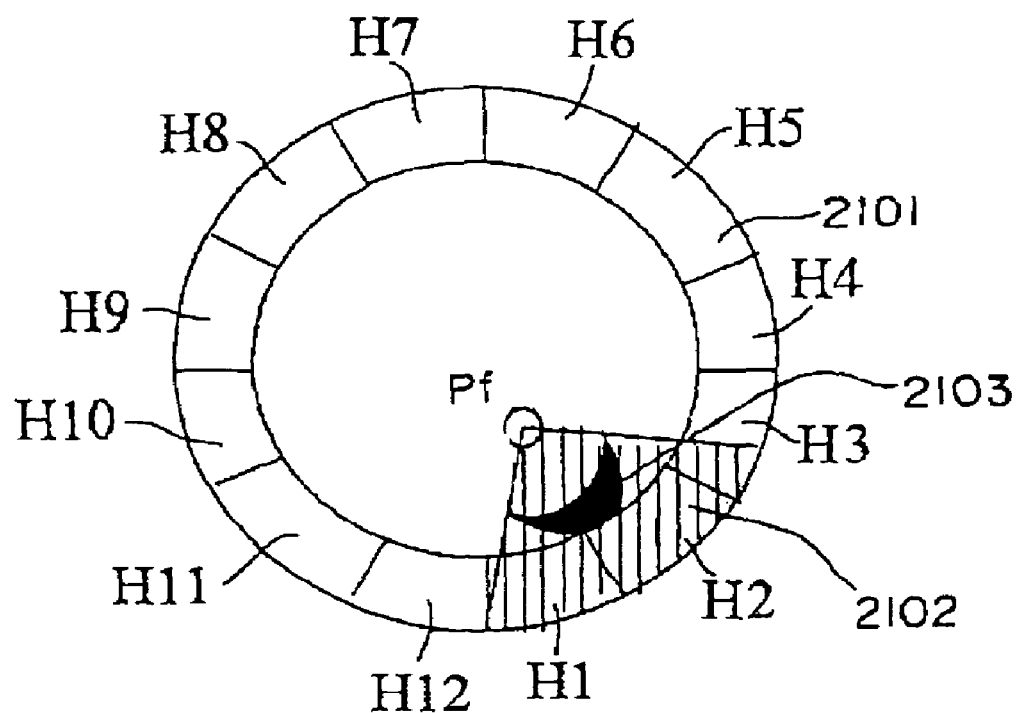

At this time, the region that overlaps the food region 81 in the holding position candidate regions 2101 is excluded from the holding position candidate. FIGS. 8I and 8J are views showing the relevant state. In FIG. 8I, the region H2 is excluded from the holding position candidate and is considered as the non-holdable region since the region H2 and the food region 81 overlap.

The food region 81 to be overlapped is desirably the most recent region.

The information on the differential region obtained in step S2004 is then overlapped with the holding position information. The barycenter position (positional coordinate of barycenter position) Pf of the food region 81 is similarly overlapped with the holding position information. The region (slashed region 2102 of FIG. 8J) obtained by connecting each point of the differential region and the barycenter position Pf of the food region and extending to the edge of the plate 203 is assumed to be the region having a high possibility of becoming the food region 81 in the future. Such region 2102 also becomes the non-holdable region.

The holdable region is determined from the holding position candidates that have remained as a result of the above processes. In FIG. 8J, such holdable regions are regions H4 to H12, but preferably, the possibility of contacting the finger type hand 103a even if the food moves during the movement becomes lower if the regions H6 to H9 on the side opposite to the non-holdable region 2102 are considered as the holdable regions.

Figures 8K, 8L:
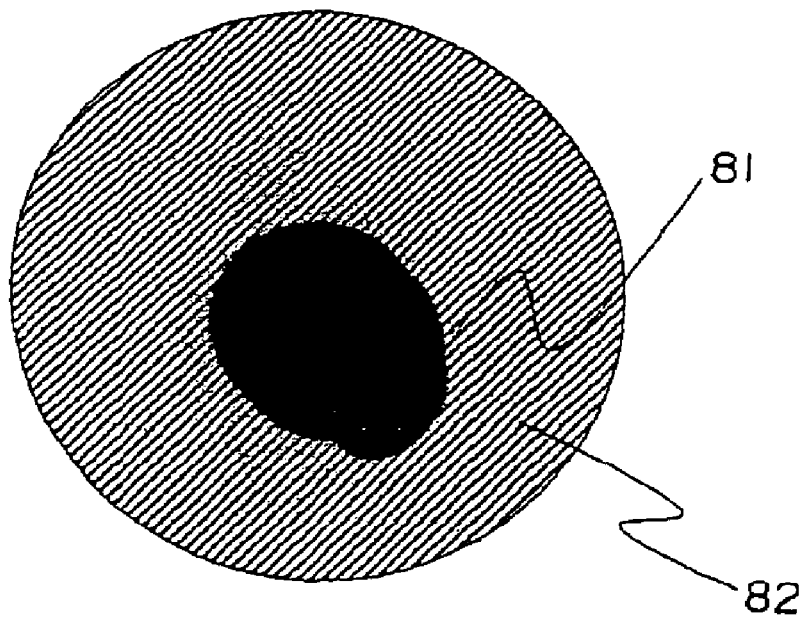

Obviously, the holdable region does not need to be determined by the above method, and for example, the region other than the food region 81 may be specified as the holdable region 82 (region with slashed line of FIG. 8K) of the entire region of the plate (see FIG. 8L). That is, FIG. 8L is a view in which the region with difference is considered as the holdable region and the region without difference is considered as the non-holdable region of the entire region of the plate. The holding position candidate region 2101 (region H7 in FIG. 8I) farthest from the food region 81 may be selected as the holding position (positional coordinate).

Figure 9:
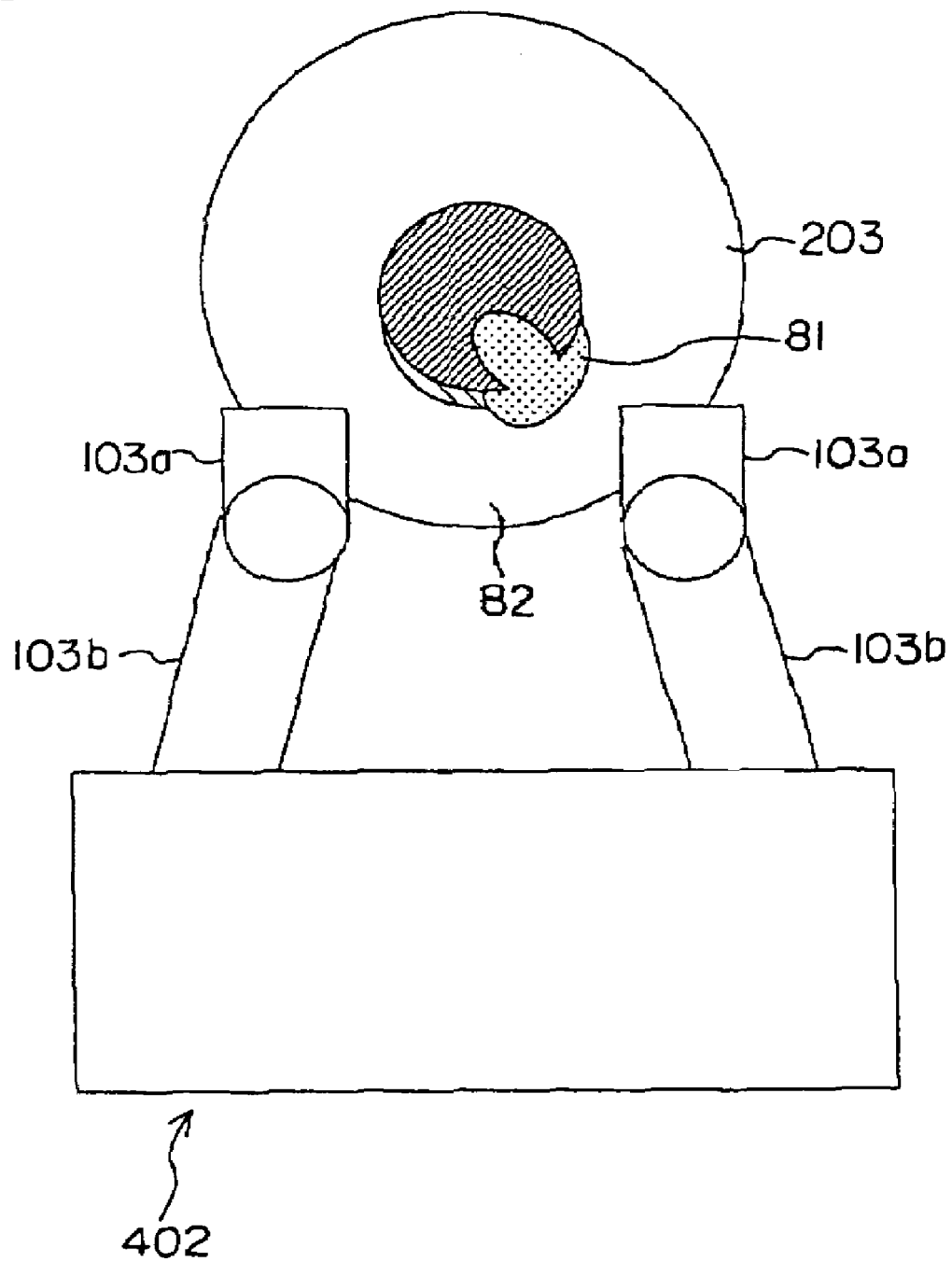
FIG. 9 is a view showing the holding state of the plate by the holding device.

The holding device 103 holds the holdable region 82 with the arms 103b and the hands 103a according to the specified holdable region 82 (see FIG. 9). The plate 203 served with food is thereby held without touching the food.

The food region 81 can be accurately recognized even if the plate 203 has design 203a, for example, by specifying the food region through the differential process. Since the luminance information of the plate 203 changes by the illumination state, the method of background subtraction corresponding to the change in the light source is desirably used. Such method includes a method of obtaining the difference after performing edge extraction on the image, for example.

Therefore, the article such as plate is sometimes an article on which an object is placed, and the state changes with respect to time. When holding such article with the holding device 103, the recognizing device 101 recognizes whether or not the object is placed on the article (holding object) and where the object is placed, and the holding method specifying means 102 specifies the holding method (holding position (positional coordinate) in this example) according to the position (positional coordinate) the object is placed. The article with the object placed thereon can then be most suitably held according to the state thereof.

The holding position (positional coordinate) may be changed in accordance with the change in the state of the holding object while specifying the most suitable holding position (positional coordinate) as above and holding the holding object.

Figure 10:
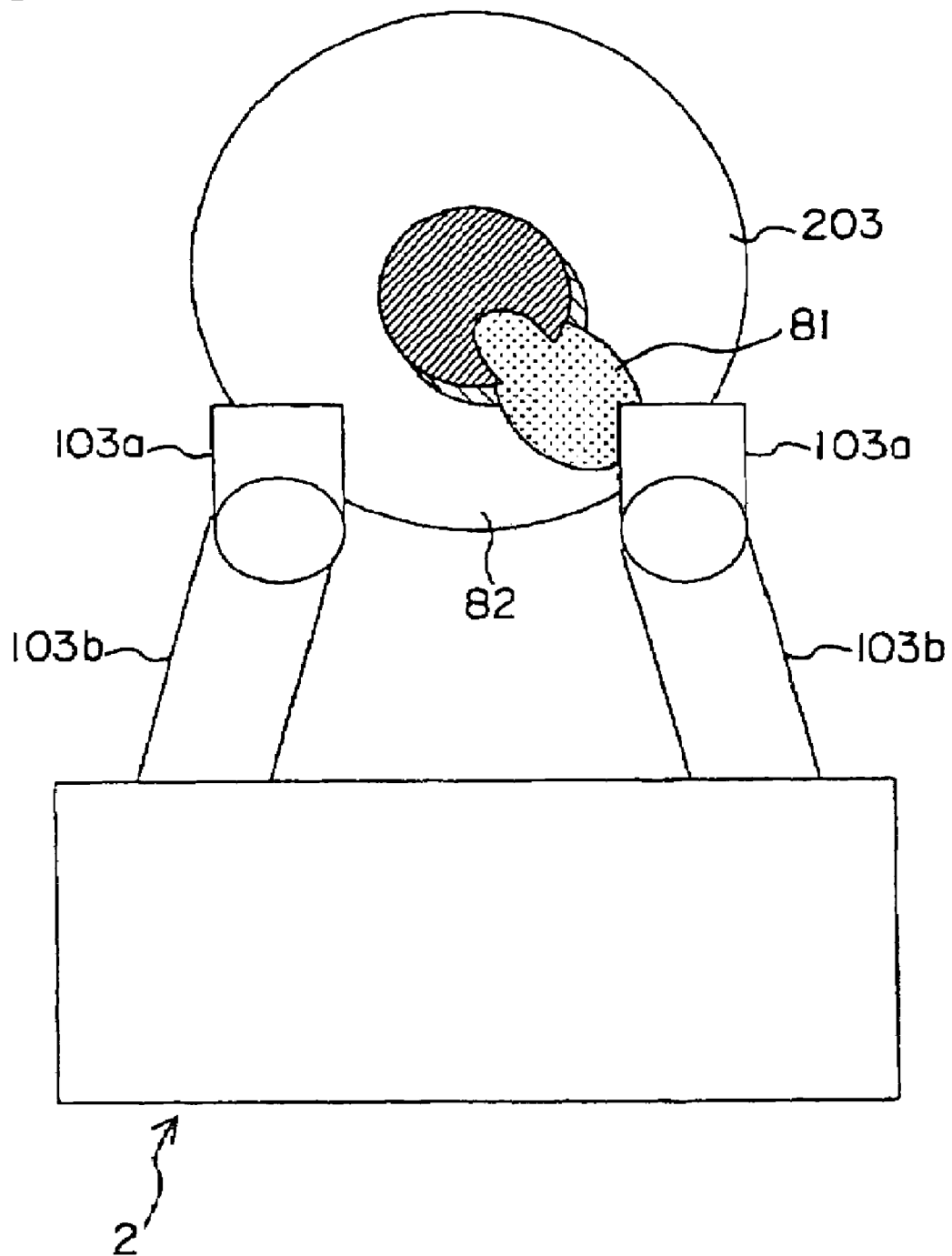
FIG. 10 is a view showing the change in state of the plate with respect to FIG. 9.

That is, suppose sauce, ketchup, or the like on the food moves while the robot 402 is holding the region other than the food region 81 and transporting the plate 203, as shown in FIG. 9, and the food region 81 has changes, as shown in FIG. 10. In this case, the hand 103a may sometimes touch the food.

The recognizing device 101 thus takes pictures of the plate 203 with food by means of the camera 105 even while holding the holding object, and sequentially executes the above differential process. The food region 81 is thereby sequentially recognized.

Figure 11:
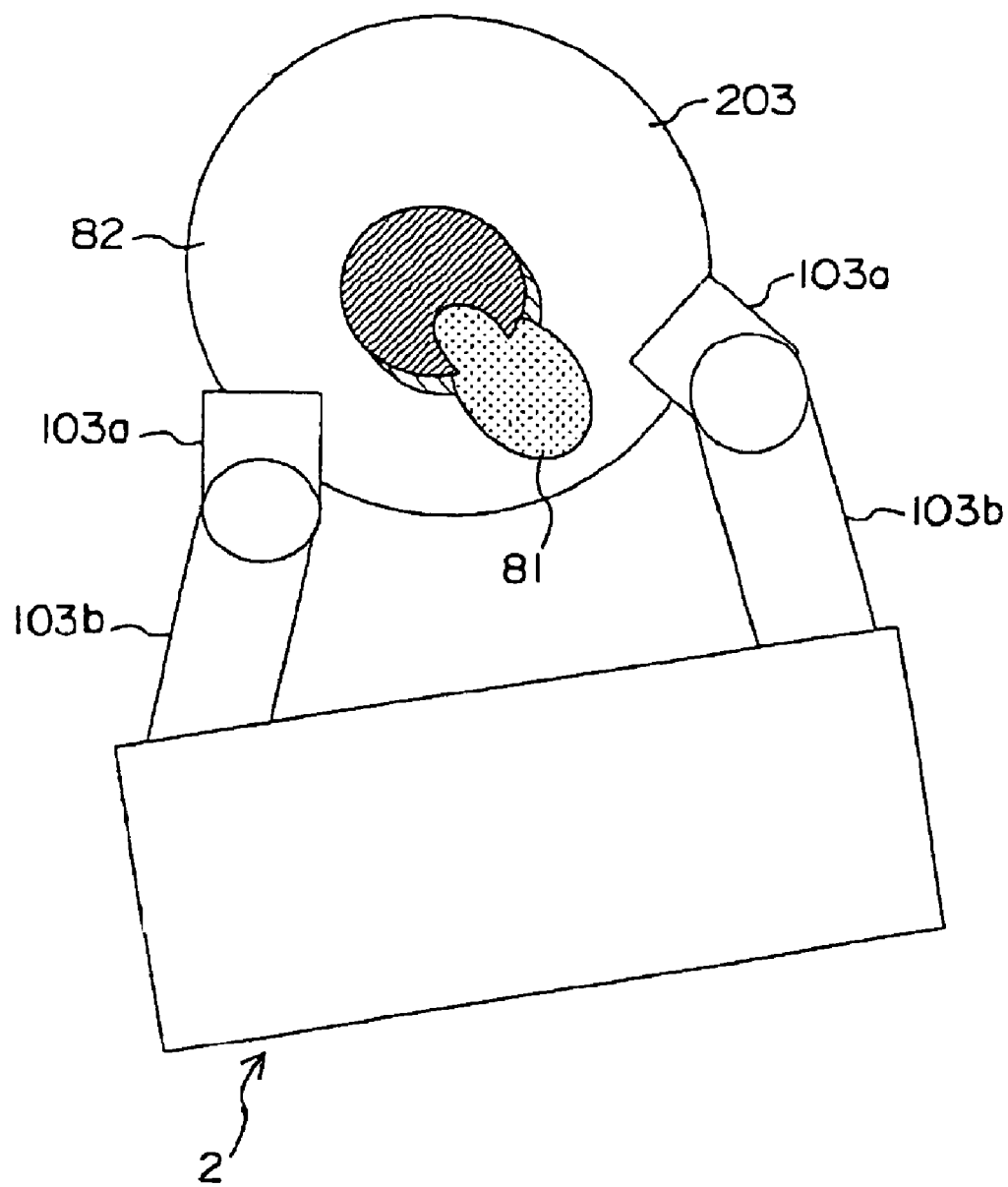
FIG. 11 is a view showing a state in which the holding position is changed according to the change in state of the plate.

The holding method specifying means 102 performs re-specification of the holdable region 82 when the food region 81 changes based on the recognized result, and changes the holding position (positional coordinate) of the hand 103a, as necessary, for example, as shown in FIG. 11.

Therefore, even after the most suitable holding method is once specified, the recognition of the state of the holding object is continued, and the holding method can be constantly optimized in correspondence to the change in the state.

(4. Specification of Holding Method Corresponding to Temperature State of Article)

The specification of the holding method, in particular, the holding position (positional coordinate) by recognizing the temperature state of the article will now be described. This is effective when the electronic tag or the like is not attached to the article, and the holding method (holding position) of the article is not obtained in advance. That is, the holding position (positional coordinate) of the relevant article is specifiable if the holding method is obtained by the electronic tag or the like.

The specification of the holding method according to the temperature state of the article will now be described with an example of when the robot 402 (household supporting robot) performs the task of taking the pan or the frying pan 121 placed on the cooking stove 511 off from the cooking stove 511.

As shown in FIG. 23, a configuration of independently arranging the recognizing device 101, the holding method specifying means 102, the holding device 103, and the holding information database 510 functioning as the holding method database 102d or the article and moving body database 406, and connecting them through network is considered. In the system shown in FIG. 23, the robot 402 becomes the holding device 103 itself. The holding method specifying means 102 is a transport instructing device for specifying the transporting method when receiving the recognized result from the recognizing device 101 and outputting the transportation instructions to the holding device 103 (robot 402) based on the specified method.

First, the recognizing device 101 recognizes the shape of the frying pan 121 placed on the cooking stove 511 using the three dimensional measuring technique such as range finder, stereo vision, etc. That is, the article holding system 10 further includes a range finder or a stereo camera (e.g., 105). Specifically, for example, the recognizing device 101 acquires the three dimensional shape information of the cooking stove 511 not placed with the frying pan 121 in advance, and can specify the shape of the frying pan 121 by comparing the cooking stove 511 with the actually measured three dimensional information (see FIG. 12A).

The recognizing device 101 then measures the temperature distribution of the holding object by the temperature sensor 520 of an infrared sensor, etc. That is, the article holding system 10 further includes a temperature sensor 520. Such temperature sensor 520 is widely known as a sensor using a thermopile element, or as a thermography device, etc., and thus the detailed description will be omitted. Originally, such temperature sensor 520 cannot estimate the accurate temperature if the radiation rate of the object is not known. Thus the data of the radiation rate of the relevant object may be accumulated in the tag 521 such as electronic tag or the like given to the holding object (each article).

FIG. 2A is a schematic view in which the temperature sensor 520 is arranged in the article holding system 10. As shown in FIG. 2A, the temperature sensor 520 may not be incorporated in the article holding system 10 and the temperature sensor 520 may be operated by the hand 103a.

A portion (handle portion 121a for the frying pan 121) to be held by the humans is arranged in cooking equipments used by humans, and such portion is designed so that its temperature does not rise. Therefore, detection is made that the portion of the frying pan 121 placed on the fire has a high temperature and the handle 121a has a relatively low temperature by measuring the temperature distribution of the holding object, as shown in FIG. 12B.

The holding method specifying means 102 specifies the holdable region 122 (in this case, handle 121a which is a portion having a temperature T lower than the threshold temperature $Th_{TH}$ (e.g. 30° C.)) as the holding position (positional coordinate) based on the temperature distribution (see FIG. 12D). The portion having a temperature T higher than the threshold temperature $Th_{TH}$ is the non-holdable region.

The holding device 103 holds the handle 121a of the frying pan 121 by means of the hand 103a and the arm 103b, according to the specified holdable region 122, as shown in FIG. 12C.

The robot 402 thereby holds the same position (positional coordinate) as the position (positional coordinate) to be held by humans. This is a process necessary when the configuration of the hand 103a and the like is weak against heat. Furthermore, even if the configuration of the hand 103a does not need to take the heat into consideration, some people may feel uncomfortable if the position (positional coordinate) to be held by the robot 402 is the position (positional coordinate) not normally held by humans, and thus the advantage is that such uncomfortable feeling is alleviated if the robot 402 holds the same position (positional coordinate) as the human.

The specification of the holding position (gripping position) (positional coordinate) based on the temperature distribution is possible when the holding object is a plate served with food as well as cooking equipments That is, the temperature distribution of the plate served with food may be measured, and the holding method specifying means 102 may specify the portion of the plate of low temperature, in other words, the portion of the plate not served with food as the holding position (positional coordinate).

The recognizing device 101 may use the history information or the positional information of the article to acquire the temperature state of the holding object. This will be described in detail using FIG. 12F.

When the holding object is the frying pan 121 as described above, the temperature of the holding object rises due to placing it on the stove burner. Thus, the temperature state of the holding object can be estimated by checking whether or not the holding object has recently been placed on the gas range. Specifically, the holding method is determined by specifying the holding region 122 as the holding position with reference to the table of FIG. 12F. The method of acquiring the history information of the article by using RFID, camera, etc., is known from Japanese Laid-Open Patent Publication No. 2004-249389,etc., and thus the description of the method will be omitted herein.

Furthermore, the temperature of the holding device 103 may be changed according to the temperature state of the holding object. This is particularly effective when holding the object of low temperature. For example, when holding ice, the ice will melt if the temperature of the holding device 103 is sufficiently high, and holding cannot be performed.

Thus, if the temperature of the holding object is sufficiently low, a process of cooling the temperature of the holding device 103 to a temperature sufficiently close to the temperature of the holding object is performed. Such cooling process may use the known Peltier element, etc.

Therefore, when holding the article that produce temperature distribution such as cooking equipments or dishes, that is, the article whose state changes with respect to time with the holding device 103, the recognizing device 101 recognizes the temperature distribution of the article and the holding method specifying means 102 specifies the holding position (positional coordinate) according to the recognized temperature article, thereby optimizing the holding.

The specification of the holding method according to the temperature state of the article is not limited to the specification of the holding position (positional coordinate) as described above. For example, when holding a pan with hot water, the most suitable holding method corresponding to the temperature of the hot water may be selected. That is, the holding method specifying means 102 selects the holding method of moving the pan at a slow movement speed while maintaining a horizontal state if the hot water is boiling (as shown in FIG. 12E, when temperature t is lower than a predetermined upper limit temperature $Th_{TH}$ and higher than or equal to a predetermined lower limit temperature $Th_{TL}$), and the holding method specifying means 102 sets the movement speed to the movement speed of an extent the hot water does not spill out if the temperature t is lower than the predetermined lower limit temperature $Th_{TL}$. The holding is not possible if the temperature t is higher than the predetermined upper limit temperature $Th_{TH}$. Since the temperature of hot water changes with elapse of time, the recognizing device 101 sequentially measures the hot water temperature while the pan with hot water is being held, and the holding method specifying means 102 optimizes the holding method according to the change in temperature.

(5 Specification of Holding Method Corresponding to Relationship Between Article and Peripheral Articles)

The specification of the holding method corresponding to the relationship between the article and the peripheral articles will now be described. This relates to the holding method of holding a plurality of articles all at once. The robot 402 may hold and transport the articles one at a time when performing the transporting work of a plurality of articles, but since such task is inefficient, holds and transport the plurality of articles all together. The holding method is optimized for when the holding object is one article, and a plurality of articles together constitutes the holding object.

The recognition of the state of the holding object, or whether a plurality of articles are stacked herein can be recognized by reading the information of the anti-collision respondable electronic tag attached to the article. That is, the recognizing device 101 recognizes whether or not another article is present in the vicinity of the holding object based on the information of the electronic tag. In this case, the holding device 103 further includes the tag reader 404a.

The recognizing device 101 may also recognize whether or not the articles are stacked in pluralities based on the image obtained with the camera 105.

Figure 24:
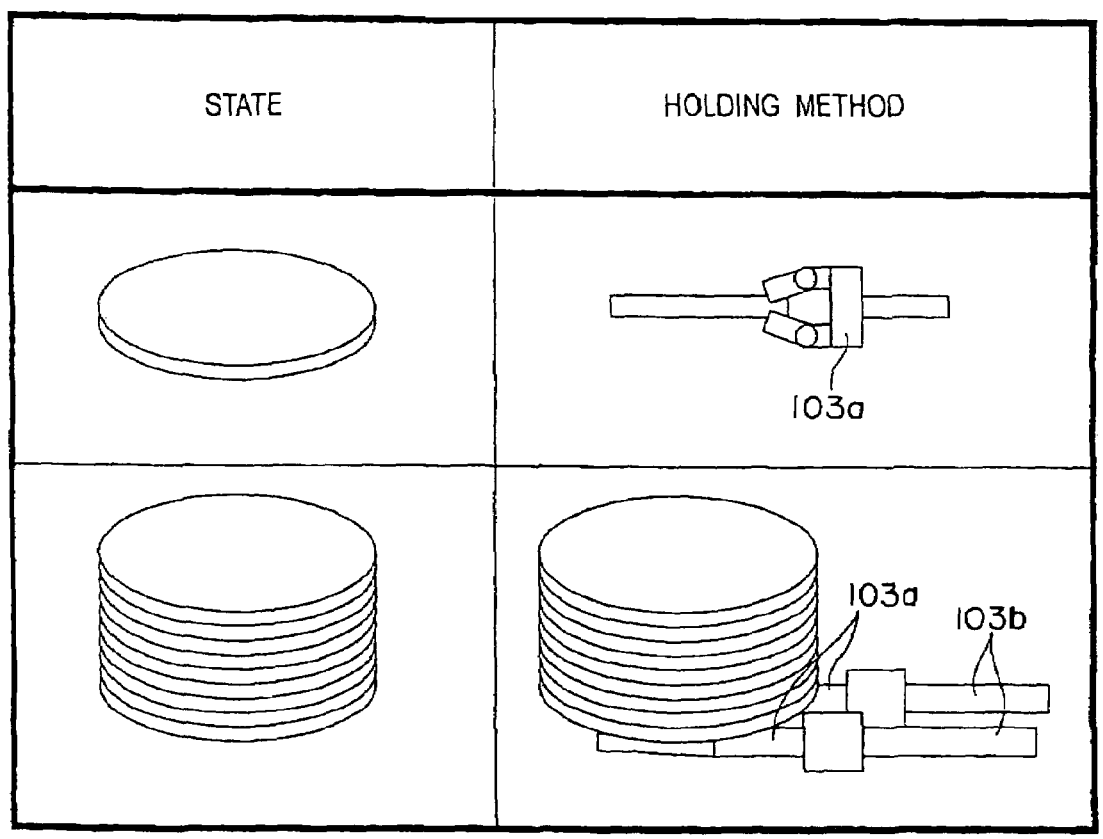
FIG. 24 is a view explaining a case of selecting a holding method of picking with the finger type hand when holding only one plate, and selecting a holding method of supporting the stacked plates from under then using the arm and the hand when the plates are stacked in pluralities.

The holding method specifying means 102 selects the holding method of picking with the finger type hand 103a when holding only one plate, and selects the holding method of supporting the stacked plates from under using the arm 103b and the hand 103a when the plates are stacked in pluralities (see FIG. 24).

The holding device 103 holds the holding object according to the holding method specified by the holding method specifying means 102.

Whether or not the articles are stacked is a state that changes with respect to time, but the holding method corresponding to the state can be specified by recognizing the relevant state, and thus the article can be held with the most suitable holding method corresponding to the state.

(6. Specification of Holding Method Using Learning)

Setting the holding method for each article in advance is difficult, and further, for example, setting the holding methods corresponding to the states of the article shown in FIGS. 4A, 6, and 7 for all the articles in advance is more difficult. In order to optimize the holding method for each article, and further, for each state of the article, it is necessary to set the holding method for each article and each state of the article.

The holding method of the article may be learnt and set based on the operation performed by humans to easily and accurately set the holding method.

Figure 13:
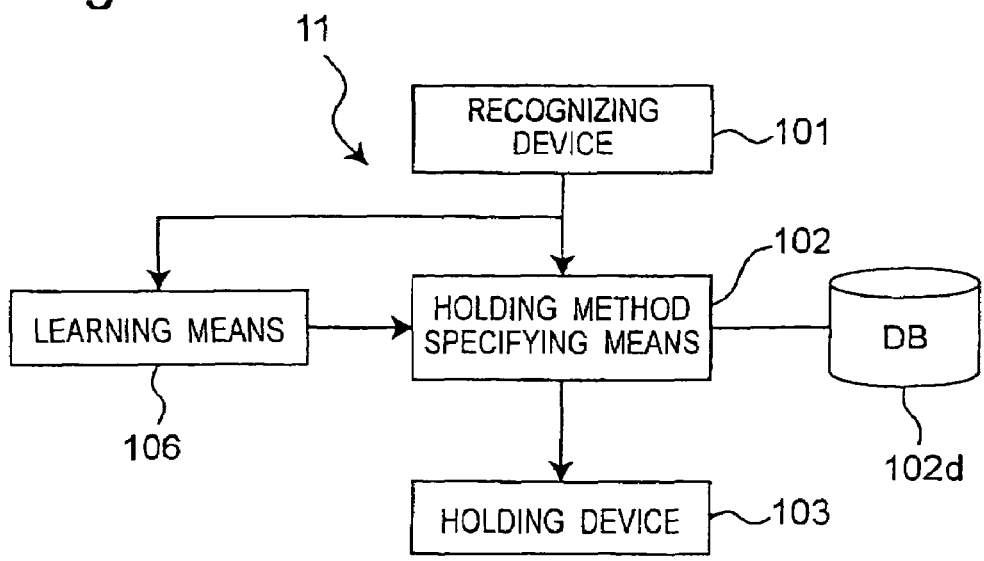
FIG. 13 is a block diagram showing the holding device further including a learning means.

FIG. 13 is a block diagram of the article holding system 11 for performing learning, as a modification of the embodiment of the present invention, where the article holding system 11 further includes a learning means 106 compared to the article holding system 10 shown in FIG. 1. The learning means 106 recognizes the holding operation of the article performed by humans, and learns and sets the holding method for each article or each state of the article based on the recognized result. The recognition of the holding operation of the article performed by humans is performed by the recognizing device 101.

The holding operation of the article performed by humans can be recognized by using the stereo camera and the tag reader. That is, the article holding system 11 further includes the stereo camera 105 and the tag reader 404a.

Two learning methods will now be specifically described. The articles that may become the holding object are all attached with the electronic tag storing information such as shape information and texture information of the article, etc. The electronic tag is also always carried around by humans operating the article, and thus the positions (positional coordinates) and the ID information of the article and the human can be acquired by the tag reader 404a.

Figure 25:
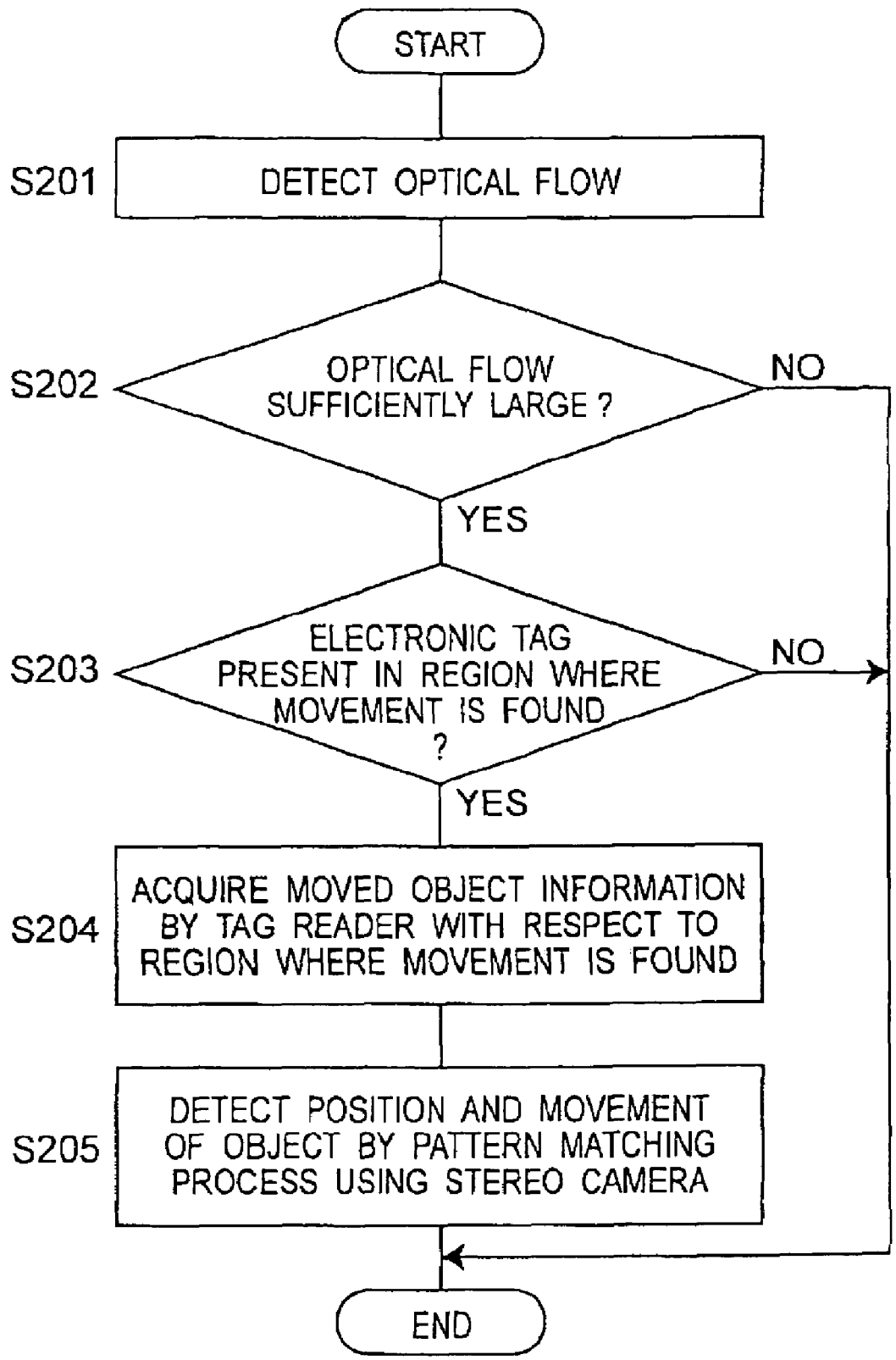
FIG. 25 is a flow chart explaining the learning and setting of the holding method based on the movement speed of the article as one learning method.

One learning method is learning and setting of the holding method based on the movement speed of the article. FIG. 25 shows the flow of such process. In this method, the recognizing device 101 first takes pictures of the holding state when the human is holding the article with the stereo camera, and obtains the optical flow from the image (step S201).

If no movement is found (no movement of electronic tag) within the viewing angle range, all the detected optical flows become very small.

If movement is found (movement of electronic tag is found) within the viewing angle range, the optical flow of the region where movement is found becomes large. The size of the optical flow in the region is examined (step S202), and determination is made that no movement is found in the viewing angle range if a sufficiently large optical flow is not present, and the process is terminated (No in step S202).

If a sufficiently large optical flow is present, the region where the large optical flow is present is extracted as the movement region (Yes in step S202).

The recognizing device 101 then detects what is moving in the region where movement is found, by using the tag reader. In other words, what article is being moved by the human is specified by receiving the information of the electronic tag. If both electronic tags of the article and the human are not detected in the movement region, learning is not required to be currently performed in the relevant movement region, and the process is terminated (No in step S203). If both electronic tags of the article and the human are detected (Yes in step S203), learning is performed since the article that may become the holding object is assumed to be currently being moved by human in the relevant movement region.

First, the shape information and the texture information of the object are acquired by acquiring the information of the electronic tag in the movement region (step S204). Only the object is extracted from the image of the movement region, and the movement, specifically, the movement speed of the relevant object is measured (step S205). Using the shape information and the texture information of the object acquired from the electronic tag, pattern matching process is performed on the stereo camera image to detect the position (positional coordinate) of the object in the image, and measure the movement thereof. The known method is used therefor, and thus the details will be omitted (see e.g., Japanese Patent Publication No. 2961264).

If the object is small, the human may be grasping the object, in which case the object may be hidden by the hand of the human thereby not being recognized in the image. In such case, the region of the hand of the human is extracted from the image, and the movement speed thereof is measured. The measured movement speed may be assumed as the movement of the object. In extraction of the hand of the human, only the region of the skin color in the image needs to be extracted using color information etc. This extraction process is performed for each frame, and the comparison of the position (positional coordinate) is performed between the frames to measure the movement of the object.

The stereo camera and the tag reader obviously do not need to be directly installed in the article holding system 11. They may be installed in the previously described environment management sever 401, and the information detected by the environment management server 401 may be transmitted and received by means of the transmitting and receiving means 409.

Figure 14A:
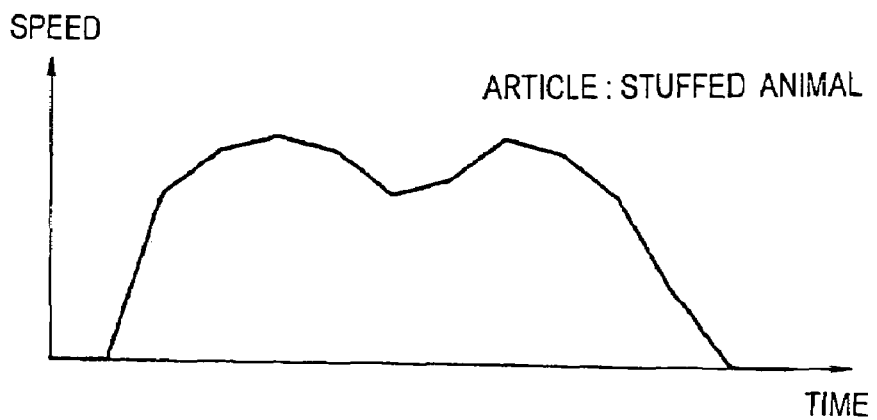
FIG. 14A is a view exemplifying an article movement speed history of when the human is holding.
Figure 14B:
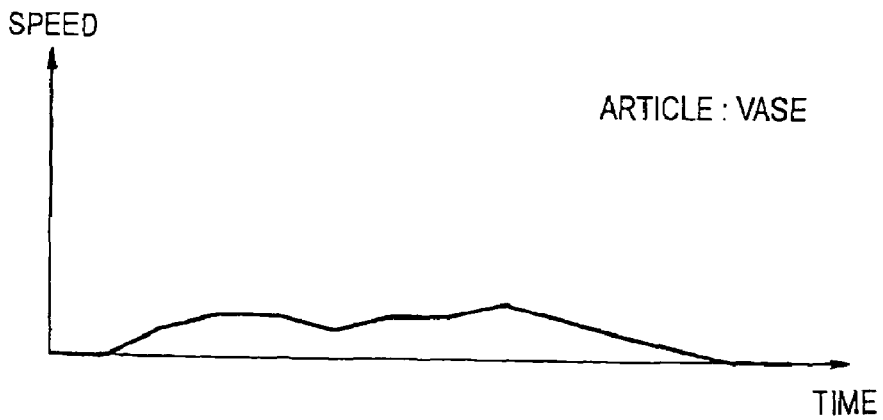
FIG. 14B is a view exemplifying an article movement speed history of when the human is holding.

According to the above processes, the movement speed of the article in a state where the relevant article is held by the human can be measured, and, for example, the movement speed of a stuffed animal (see FIG. 14A) is found to be higher than the movement speed of a vase (see FIG. 14B), as shown in FIGS. 14A and 14B. That is, a person rapidly moves the stuffed animal but slowly moves the vase. The movement speed of the article can be acquired with the tag sensor using the ultrasonic wave described above.

The learning means 106 sets the holding method of each article in, for example, a table format as shown in FIG. 26 based on the recognition result, and the holding method specifying means 102 specifies the holding method learnt and set by the learning means 106 based on the result (recognized result of what the holding object is) recognized by the recognizing device 101. Then, as shown in FIG. 26, the holding method of a relatively fast movement speed is specified when the holding object is a stuffed animal, whereas the holding method of a relatively slow movement speed is specified when the holding object is a vase. This is achieved by accumulating at what speed, or at what movement speed, the human is moving each object in a table format shown in FIG. 26 in the database of the article and moving body database 406, the holding method database 102d, etc. and using the relevant database, as described above.

Another learning method is learning and setting of the holding method based on where the position (positional coordinate) of the hand of the human is with respect to the article.

Figure 15A:
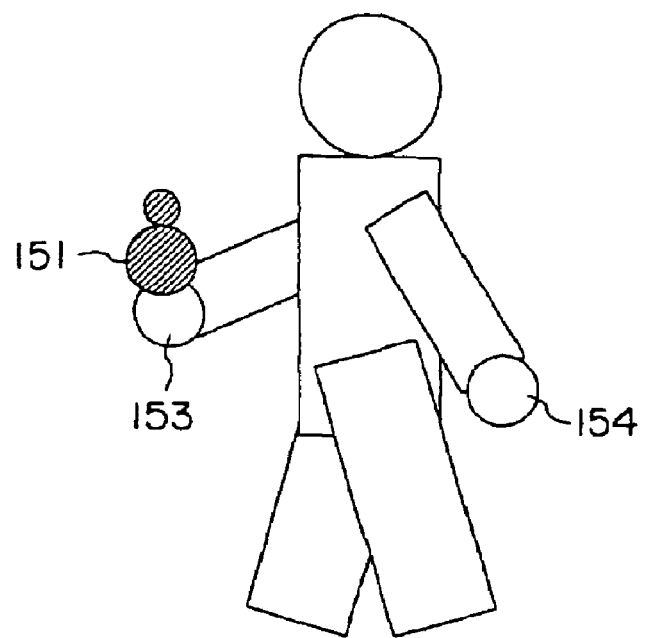
FIG. 15A is a view showing one example of a state in which the human is holding the article.
Figure 15B:
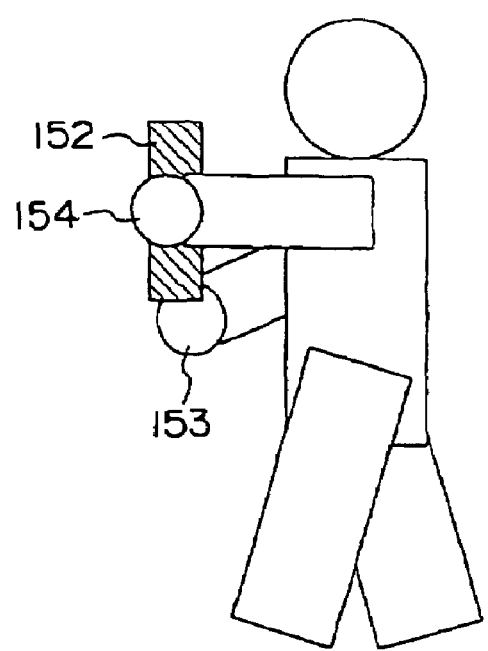
FIG. 15B is a view showing another example of a state in which the human is holding the article.

This learning method will be described with reference to FIG. 15A and FIG. 15B. FIG. 15A shows a state in which the human is holding the stuffed animal 151, and FIG. 15B shows a state in which the human is holding the vase 152.

The recognizing device 101 takes pictures of the holding state when the human is holding the articles, with the stereo camera. As described above, the positions (positional coordinates) of the hands 153, 154 of the human and the position (positional coordinate) of the article are specified in the image to detect how the human is holding the article.

In. FIG. 15A, one hand 153 of the human is in the vicinity of the stuffed animal 151, but the other hand 154 is at a position (positional coordinate) distant from the stuffed animal 151. Thus, the human is recognized as holding the stuffed animal 151 with one hand on the other hand, in FIG. 15B, two hands 153, 154 of the human are in the vicinity of the vase 152. Thus, the human is recognized as holding the vase 152 with both hands.

The learning means 106 sets the holding method of holding with one hand with respect to the stuffed animal 151 based on the recognized result, and sets the holding method of holding two locations of the vase with two hands with respect to the vase 152. The learning method is desirably adopted when the holding device 103 has a two-arm configuration similar to the human.

FIGS. 27 and 28 show one example of accumulating the learnt holding method in a table format in the database such as the article and moving body database 406, the holding method database 102d, etc. One of the holding levels of FIG. 28 is stored in the electronic tag of the object, as shown in FIG. 27. A flexible holding operation can be realized for each holding object by learning the database.

The database such as the article and moving body database 406, the holding method database 102d, etc. may be created as shown in FIG. 29 to use a single arm, two arms, and two holding methods according to the situation. This is for example, effective when holding another object while holding an object with one arm. That is, two arms are used when holding one object, but separate holding is performed with a single arm when holding two objects. Thus, the object can be held with the most suitable holding method even if the holding object is in pluralities.

The learning by the above described learning means 106 is simply learning the holding method for each article, but learning may be performed associating the state and the holding method of the article by further recognizing the state of the article being held by the human. For example, when the human is holding the glass, the holding method of when water is in the glass, or the holding method of when water is not in the glass can be learnt by further recognizing whether or not water is in the glass. The databases shown in FIGS. 4A, 6, and 7 are created through learning by performing such learning.

The holding method does not need to be set in advance for each article or for each state of the article by setting the holding method by learning, and a suitable holding method can be set by learning the holding method based on the holding operation performed by the human.

The learning by the learning means 106 may be performed when the human hands over the article to the robot 402 and instructs the work for the article. In other words, the operation of when the human hands over the article to the robot 402 is recognized, and the holding method is learnt, so that the robot 402 subsequently performs the work with the same operation as the human.

The learning accuracy enhances by performing learning at this timing. In other words, when the human hands over the article to the robot 402, the human is likely to be facing the robot 402. Since the stereo camera is normally designed so that the accuracy of the measurement of the facing object is enhanced, the detection accuracy of the position (positional coordinate) of the hand and the position (positional coordinate) of the holding object enhances, and thus the accuracy of the learning, enhances, by performing learning when the human hands over the holding object to the robot 402.

The above described learning method is performed based on the image taken of the state of the human holding the article, but is not limited thereto. For example, the ID tag from which the three dimensional position (positional coordinate) can be detected is attached to each article that may become the holding object, and the learning may be performed based on the tag information. In other words, since the movement trajectory of the object can be detected by the tag information, how the object is held (movement speed thereof) can be detected based on the movement trajectory. The tag using the ultrasonic wave is known as the tag from which the three dimensional position (positional coordinate) can be detected (e.g., "Measurement of daily human activity using ultrasonic 3D tag system—Robust estimation of position by redundant sensor data—", Yoshifumi Nishisa, Hiroshi Aizawa, Toshio Hori, Masayoshi Kakikura, 20$^{th}$ Annual Conference of the Robotics Society of Japan, 3C18, 2002).

How the human is griping the article can be detected and recognized by also using the technique disclosed in e.g., "Grasp Recognition with volumetric fitting using infrared images", Kentaro Hashimoto, Koichi Ogawara, Jun Takamatsu, Katsushi Ikeuchi. Computer vision and Image media 135-10, pp. 55-62, 2002". The holding device 103 desirably includes the arms 103b and the hands 103a, similar to the human, when using the above method.

Moreover, a specific human is set as the learning target, and the learning by the learning means 106 is preferably performed only when the relevant human is holding the article. This is because the holding operation differs among people even if the article is the same. For example, even if the article to be held is the same stuffed animal 151, a child holds it in a random fashion, the mother holds it in a careful manner, and the grandmother holds it slowly, etc. In other words, since the holding operation of the article by humans differs among individuals, the individual difference tends to be contained when learning the holding method of the article based on the operation performed by the human. Thus, a specific human is set as the learning target, and learning is performed when the relevant human is holding the article. The individual difference can then be excluded from the holding method learnt and set.

Unlike this, the holding operation of the article by a plurality of humans may be learnt individually, and the most suitable holding method may be selected therefrom. Various methods may be considered as the method of selecting the most suitable holding method. For example, the various learnt holding methods can be actually tried, and selection can be made by evaluating the stability of the holding methods. Furthermore, the various learnt holding methods can be actually tried and selection can be made according to the reaction of the people around. In other words, the comfortable or uncomfortable feeling of the human around is recognized from the face image, and the holding method in which the human feels the most comfortable may be selected.

Moreover, the holding operations of the article by a plurality of people are individually learnt, and the holding method corresponding to the human acting as the target when the article holding system 11 executes the holding of the article may be selected. For examples when the robot 402 executes the work of handing over the article, to the human, the holding of the article is performed according to the holding method learnt from the holding operation of the opponent to whom the hand-over is performed. Thus, the robot 402 is able to hold the article in the same manner as when the opponent is holding normally, and the holding operation of the robot 402 can be individually applied.

(7. Analogy of Holding Method)

The specification of the holding method by analogy will now be described. This process has an advantage in that the holding method does not need to be set in advance for all the holding objects.

This process will be described by way of a specific example. The holding method of the plate and the holding method of the stuffed animal are assumed to be set in advance (may be set by above described learning, or may be set in advance by user or manufacturing company), and the holding method of the cup is assumed to be not set.

When the holding object is recognized as a cup by the recognizing device 101, the holding method specifying means 102 selects the holding method considered as most suitable from the already set holding methods for the holding method of the cup. In selection, the holding method specifying means 102 may use the reflectance parameter or shape data of the article, for example. The reflectance parameter is the parameter that depends on the material of the article, and the material can be determined as being close when the parameters are close (reflectance parameter will be described below). That is, the articles in which the material or the shape are close are assumed to have the same holding method, and the holding method specifying means 102 specifies the holding method set for the article which material or shape is close to the article (non-set article) whose holding method is not set as the holding method of the non-set article.

Specifically, in the above example, the holding method specifying means 102 compares the reflectance parameter of the cup, the reflectance parameter of the plate, and the reflectance parameter of the stuffed animal with respect to each other. The reflectance parameter of the cup is closer to the reflectance parameter of the plate than to the reflectance parameter of the stuffed animal, and thus the holding method specifying means 102 adopts the holding method of the plate for the holding method of the cup. Therefore, the various articles are most suitably held by the holding device 103 by specifying the holding method using analogy even if the holding method is not set in advance for all the holding objects.

Second Embodiment

Figure 16:
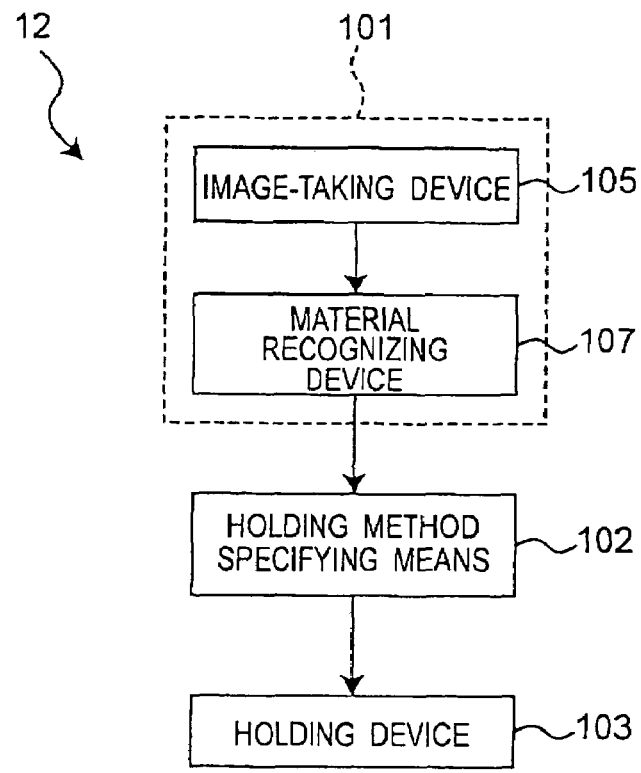
FIG. 16 is a block diagram showing a configuration of the article holding system according to a second embodiment of the present invention.

FIG. 16 is a block diagram showing a basic configuration of an article holding system 12 according to a second embodiment of the present invention. The article holding system 12 of the present embodiment includes the recognizing device 101, the holding method specifying means 102, and the holding device 103. The recognizing device 101 includes an image-taking device 105 for taking pictures of the holding object and a material recognizing means 107 for recognizing the material of the object from the image.

In the article holding system 12 of the second embodiment, the same reference characters are denoted for the same means and devices as those of the article holding system 10 of the first embodiment, and the detailed description thereof is omitted.

The image-taking device 105 takes pictures of the holding object using the image sensor element such as the camera 105.

The material recognizing means 107 first estimates the reflectance parameter of the object from the image obtained with the image-taking device 105, and then recognizes the material thereof from the estimated reflectance parameter. This uses the fact that the reflecting property changes depending on the material.

The holding-method specifying means 102 specifies the holding method based on the material recognized by the material recognizing means 107.

The article holding system 12 of the present embodiment is also mounted on the robot 402 as shown in FIG. 2A. In this robot 402 as well, the camera serving as the image-taking device 105 may be embedded in the face of the humanoid robot 402. The light source 104 (in the present embodiment, no need to be the laser irradiating device as in the first embodiment) for illuminating the holding object is desirably attached to the arm 103g of the robot 402 so that the position (positional coordinate) thereof is arbitrarily changed.

The method of estimating reflectance parameter of the object from the image by the material recognizing means 107, and recognizing the material from the estimated reflectance parameter will now be described in detail. The Torrance-Sparrow model, which is the widely used reflection model, will be explained first.

The Torrance-Sparrow model, which is one of the dichromatic reflection model, expresses the object reflected light as the sum of the specular reflectance component and the diffuse reflectance component. (Equation 1) is the equation of the simplified Torrance-Sparrow model.

$$i_c = \left[ K_{d,c}\cos(\theta_i) + \frac{K_{s,c}}{\cos(\theta_r)}\exp\left[-\frac{\alpha^2}{2\sigma^2}\right]\right]\frac{L_c}{R^2} \quad \text{(equation 1)}$$

The first term in (equation 1) represents the diffuse reflectance component, and the second term represents the specular reflectance component. c is one of the RGB (red, green, blue), $i_c$ is the brightness of the image surface, $L_c$ is the light intensity of the light source, and R is the distance from light source to each point on the object surface, where the property in that the illumination light intensity attenuates inversely proportional to the squares of the distance is considered and introduced. $K_{d,c}$ and $K_{a,c}$ respectively represents the reflectance coefficients corresponding to the diffuse reflectance component and the specular reflectance component, and a shows the surface roughness. $\theta_i$ is an incident angle at a point on the surface of the object and is an angle formed by the normal direction and the light source direction, $\theta_r$ is an angle formed by the normal direction and the view direction, and $\alpha$ is an angle formed by the bisector direction of the light source direction and the view direction, and the normal direction.

Figure 17:
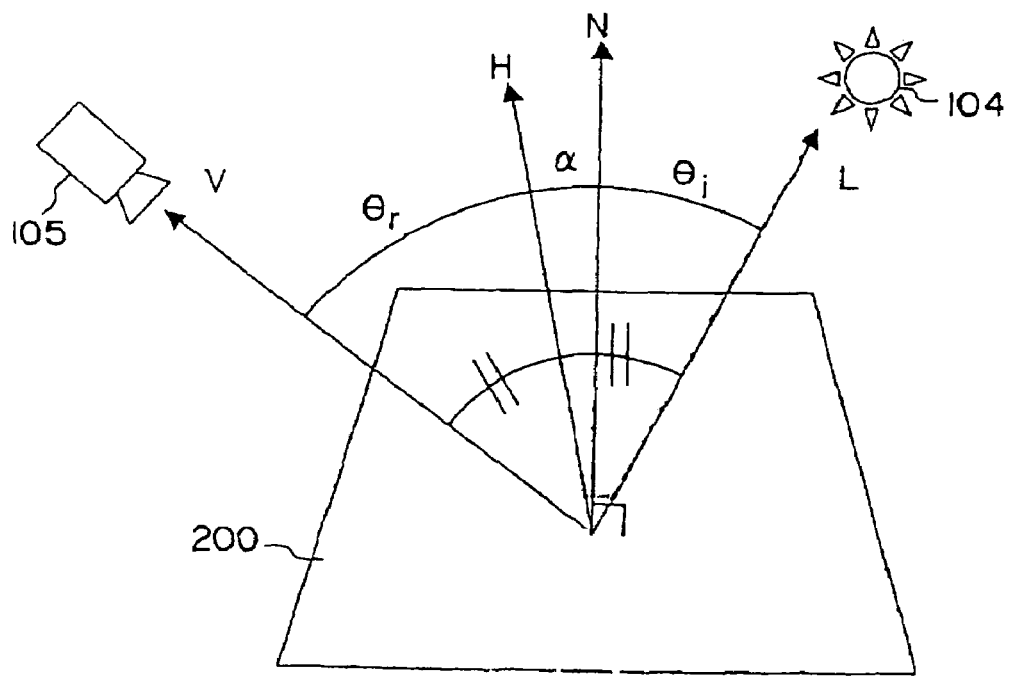
FIG. 17 is a conceptual view for explaining the Torrance-Sparrow model.

These relationships are shown in FIG. 17. In the figure, 200, 105, 104 denotes the holding object, the camera, and the light source, a vector N is the normal direction of the surface of the holding object 200, and vectors V, L, H are respectively the camera direction, the light source direction, and the bisector direction of the camera direction and the light source direction. If, $$K_d = K_{d,c} L_c$$

$$K_s = K_{s,c} L_c$$

$$I_c = i_c R^2$$

(equation 1) can be modified as, $$I_c = K_d \cos(\theta_i) + \frac{K_s}{\cos(\theta_r)} \exp\left[-\frac{\alpha^2}{2\sigma^2}\right] \quad \text{(equation 2)}$$

That is, if the parameters of $K_d$, $K_s$, and $\sigma$ can be estimated, the reflective property of the object can be described, and the material of the object can be estimated. Thus, these parameters are referred to as reflectance parameters.

The estimation of the reflectance parameter consists of the following three steps.
1) estimate accurate position (positional coordinate), shape, and orientation of the holding object;
2) separate the diffuse reflected region and the specular reflected region;
3) estimate the reflectance parameters.

Each step will be described in order below.

1) Estimate accurate position (positional coordinate), shape, and orientation of the holding object.

The electronic tag storing the shape is assumed to be arranged at the holding object.

The method of obtaining accurate position (positional coordinate), shape, and orientation of the object by obtaining the correspondence of the shape information and the three dimensional positional information of the holding object obtained from stereo vision will now be described. The three dimensional positional information of the holding object is not only for estimating the material of the holding object, but are information necessary for the holding device 103 to hold the holding object, as described above.

The stereo vision using the block matching method is widely used as a three dimensional position detecting method using the image. In this method, the object is obtained with a plurality of cameras, and the correspondence between the images is obtained for each divided block (point). The three dimensional position (positional coordinate) is obtained from the obtained correspondence point.

If the number of correspondence points to obtain is large enough, the shape of the object can be obtained with the relevant method, but in many cases, a few number of the three dimensional position (positional coordinate) with respect to the object may be obtained in terms of processing time and matching precision. Thus, although the required information is the position (positional coordinate), the shape, and the orientation information of the object, the three dimensional position (positional coordinate) of the plurality of points are obtained from the relevant method, resulting in causing an issue. That is, a means of obtaining the accurate position (positional coordinate), the shape, and the orientation of the holding object from the set of points, the three dimensional position (positional coordinate) of which is obtained, becomes necessary. Using the surface shape information stored in the electronic tag, the position (positional coordinate) and the orientation thereof are estimated.

Figure 18A:
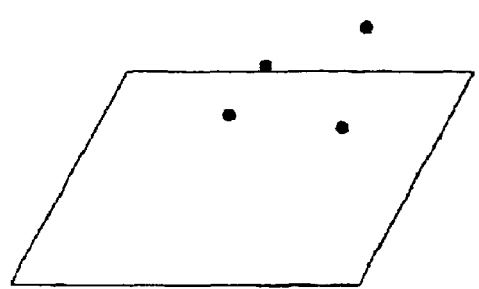
FIG. 18A is a conceptual view for explaining a method of estimating position, shape, and orientation of the holding object.
Figure 18B:
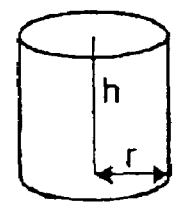
FIG. 18B is a conceptual view for explaining the method of estimating position, shape, and orientation of the holding object.
Figure 18C:
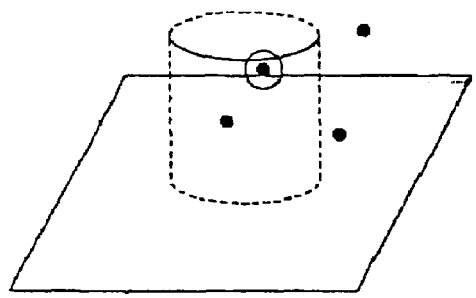
FIG. 18C is a conceptual view for explaining a method of estimating position, shape, and orientation of the holding object.

FIGS. 18A to 18E show the conceptual views related to the process. Each point of FIG. 18A shows the point whose three dimensional position (positional coordinate) is obtained by the block matching method. FIG. 18B shows the shape information of the holding object stored in the electronic tag. The holding object is a circular cylinder having radius r and height h.

Figure 18D:
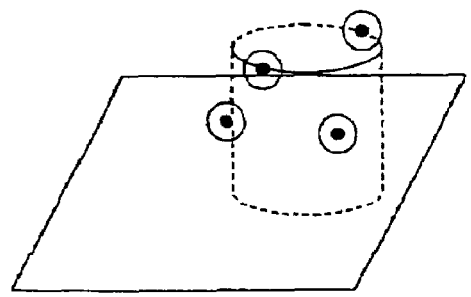
FIG. 18D is a conceptual view for explaining the method of estimating position, shape, and orientation of the holding object.
Figure 18E:
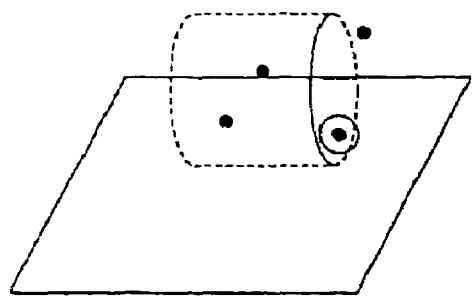
FIG. 18E is a conceptual view for explaining a method of estimating position, shape, and orientation of the holding object.
Figure 19A:
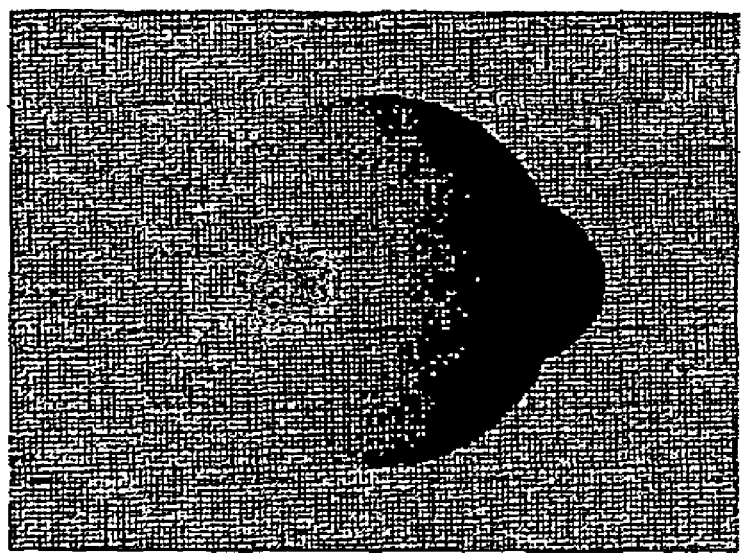
FIG. 19A is a view obtained by taking a picture of a spherical object while moving the light source.
Figure 19B:
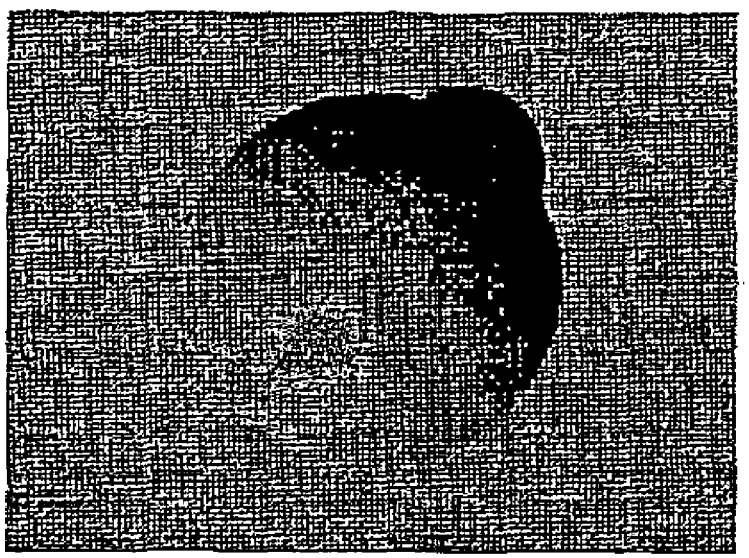
FIG. 19B is a view obtained by taking a picture of a spherical object while moving the light source.
Figure 19C:
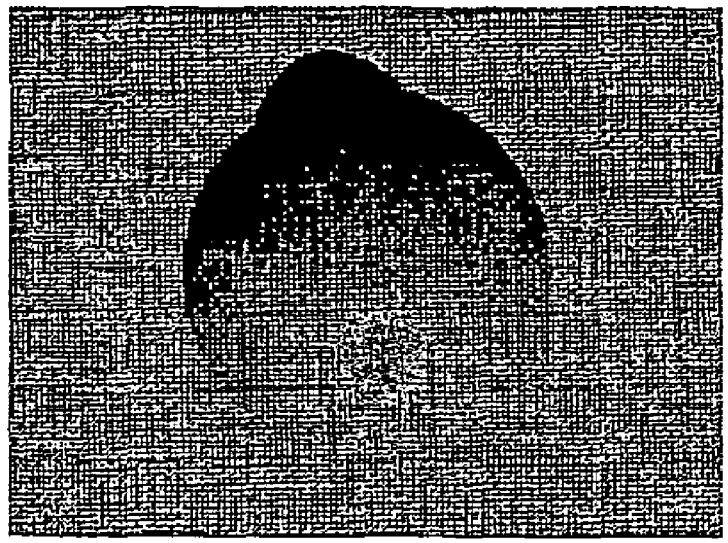
FIG. 19C is a view obtained by taking a picture of a spherical object while moving the light source.
Figure 19D:
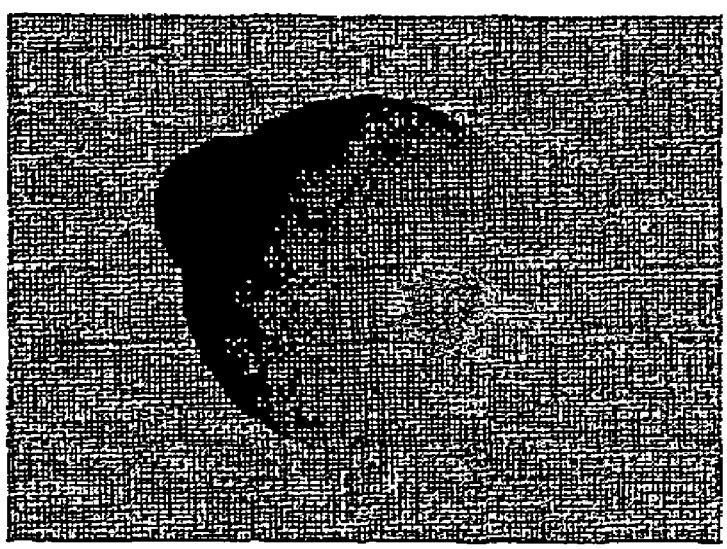
FIG. 19D is a view obtained by taking a picture of a spherical object while moving the light source.
Figure 20:
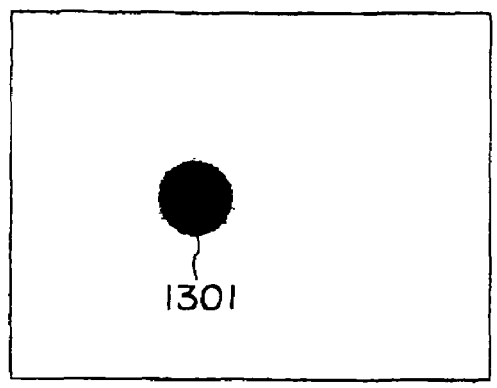
FIG. 20A is a view extracting only the specular reflected region from the image of FIG. 19A.
FIG. 20B is a view extracting only the specular reflected region from the image of FIG. 19B.
FIG. 20C is a view extracting only the specular reflected region from the image of FIG. 19C.
FIG. 20D is a view extracting only the specular reflected region from the image of FIG. 19D.
Figure 20:
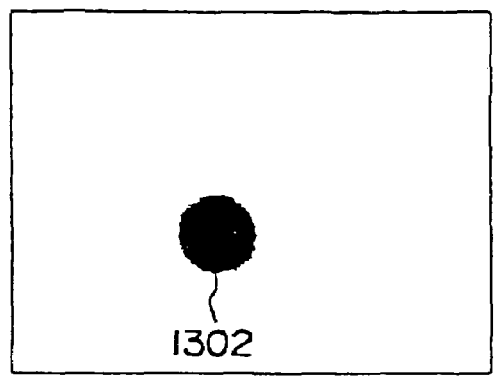
Figure 20:
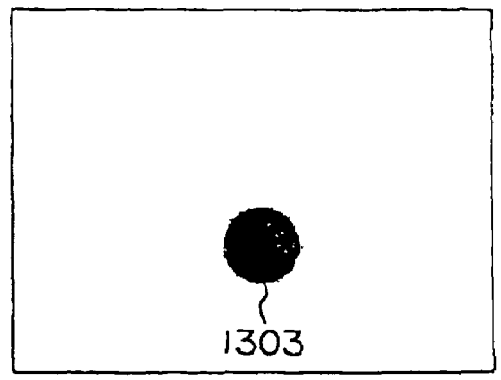
Figure 20:
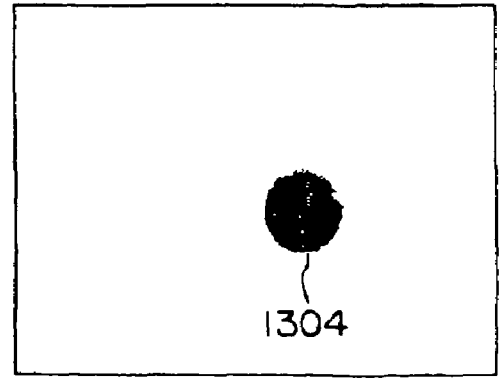

All the points whose three dimensional position (positional coordinate) is obtained by the block matching method are assumed as points on the surface of the object. The shape data obtained from the electronic tag is virtually arranged in order while slightly changing the position and the orientation in the three dimensional space (see FIGS. 18C, 18D, 18E). The number of points present on the surface of the virtual shape data is counted (encircled points in FIGS. 18C, 18D, 18E) out of the points whose three dimensional position (positional coordinate) is obtained by the block matching method. The position (positional coordinate) and the orientation in which the number of counted points becomes a maximum are estimated as the position (positional coordinate) and the orientation of the object (FIG. 18D in the illustrated figure).

The position (positional coordinate), the shape, and the orientation of the object may be directly obtained by using the high precision three dimensional measurement method such as laser range finder, ultrasonic wave sensor, light cutting method, high precision stereo vision, or the like even if the electronic tag is not arranged on the holding object, and the shape thereof is not known.

2) Separate the Diffuse Reflected Region and the Specular Reflected Region

The image taken of the object is separated into diffuse reflected region and the specular surface reflected region. In this case, a method of performing region division using the plurality of images (see FIGS. 19A to 19D) obtained, with the camera 105 fixed, while moving the light source 104 is used ("Photometric Linearization based on Classification of Photometric Factors", Yasunori Ishii, Kohtaro Fukui, Yasuhiro Mukaigawa, Takeshi Shakunaga, Meeting on Image Recognition and Understanding (MIRU2002), vol. 2, pp. 167-176).

The method is a method of categorizing the image assuming the Lambertian model into a complete diffuse reflected region, specular reflected region, and the like using the fact that the image of the light source can be arbitrarily represented by linear combination of three images of different light sources.

FIGS. 20A to 20D respectively show the view in which the images shown in FIGS. 19A to 19D are subjected to region division with the above method. In FIGS. 20A to 20D, the painted regions 1301 to 1304 show the specular reflected region.

In this case, the light source 104 is desirably arranged on the arm 103b of the robot 402, as described above, to allow the position thereof to be changed, but such arranged in the infrastructure such as lighting or the like arranged in the household may be used for the light source 104. In this case, household electric appliances cooperation may be performed so that the position of the light source can be changed.

The light source 104 may be fixed and the position of the camera 105 may be changed instead of fixing the camera 105 and changing the position of the light source 104. In this case, it is necessary to obtain the correspondence between respective pixels between the images with the camera position changed.

The method of estimating the specular reflected region is not limited to the above, and may be a method of estimation using the polarizing filter or the like. The method of estimation may be performed by cutting out the high-luminance region within the image. Specifically, the specular reflected region is assumed as the pixels having a sufficiently large luminance, and when the luminance i(x) of a certain pixel satisfies the following equation, the pixel is considered to be diffuse reflected region.

$$i(x) < Th_d$$

$Th_d$ is a threshold value for distinguishing between the specular reflection and the diffuse reflection.

3) Estimate Reflectance Parameter

A method of estimating the reflectance parameter using the information of the separated diffuse reflected region and the specular reflected region will now be described.

Estimation of the reflectance parameter $K_d$ is performed by using the information of the diffuse reflected region. Since the specular reflectance component is assumed as substantially 0 in the diffuse reflected region, the following relationship is met according to (equation 2).

$$I_c = K_d \cos(\theta_i) \quad \text{(equation 3)}$$

As described above, since the light source 104 has the position controlled by the arm 103b, the direction of the light source 104 is known. The normal direction of the surface of the object, that is, $\cos(\theta_i)$ is also known since the position (positional coordinate), the shape, and the orientation of the holding object are obtained.

As such information are known for all of the plurality of images obtained with the position of the light source 104 changed, the change in $I_c$ of when changed at each point of the object is known in (equation 3). $K_d$ of each point can be estimated by solving (equation 3) by using the methods of least squares method or the like for each point of the object. In this case, since each luminance value tends to be an outlier value by influence such as noise or three dimensional position estimation error, an optimization method of removing the outlier value such as RANSAC (RANdom Sample Consensus) or SVDMD (Singular Value Decomposition with Missing Data) is desirably used.

The image may be region-divided for each material as the pre-process, and the reflectance parameter $K_d$ may be obtained for every region instead of obtaining the reflectance parameter $K_d$ for each point.

In the method of region division, division may be performed with the color as reference assuming that the region of the same color is the same material. Furthermore, division may be performed using the shape information. For example, division is also possible on the assumption that "regions on a certain plane all have the same material".

The reflectance parameter $K_s$ and $\sigma$ are estimated by using the information on the specular reflected region. Assuming that the reflectance parameter of the specular reflected region is the same as that of the vicinity thereof, the parameter $K_d$ indicating the diffuse reflectance component of the specular reflected region can be obtained from the peripheral region. (equation 2) can thus be modified as below.

$$\frac{K_s}{\cos(\theta_r)} \exp\left[-\frac{\alpha^2}{2\sigma^2}\right] = I_c - K_d \cos(\theta_i) \quad \text{(equation 4)}$$

The right side and $\cos(\theta_r)$ and $\alpha$ are all known, and thus the reflectance parameters $K_s$, $\sigma$ representing the specular reflectance component can be estimated.

The material of the object can be estimated by comparing and categorizing the reflectance parameters obtained as above and the reflectance parameter of each material stored on the database through a known method such as SVM (Support vector Machine) or the like.

The above process uses the camera as the image-taking device 105 but the image-taking device 105 may be an infrared camera and the like.

The material of the holding object may be recognized by using the spectrum image of infrared region or visible light region. The former method is known as an infrared spectroscopic analysis (FTIR), and the latter method is known from, for example, ("Material classification from spectral images for object recognition", Yoshitsugu Manabe, Kosuke Sato, Seiji Inoguchi, The Transactions of the Institute of Electronics, Information and Communication Engineers D-II, Vol. J79-D-II, No. 1, pp. 36-44, 1996), etc.

The article holding system 12 of the present embodiment specifies the holding method based on the recognized material, as described above.

The article holding system 12 for recognizing the material of the holding object as in the present embodiment can be used when holding dishes. That is, assume the robot 402 performs the work of transporting each dish to the dishwasher to clean up the dishes after meal. In this case, the work of placing the dishes in the dishwasher after throwing out the leftovers if there are leftovers, and placing the dishes in the dishwasher as it is if leftovers are not found on the dish.

In holding the dish, the material recognizing device 107 determines the presence of the leftovers by recognizing the material of the dish surface. Specifically, the reflectance parameter of the dish is stored in advance on the electronic tag attached to each dish. The reflectance parameter of the dish is actually detected, and the detected parameter and the stored parameter are compared, as described above. If both parameters are the same, determination is made that nothing is found on the dish, and if both parameters are sufficiently different, determination is made that something is on the dish. The reflectance parameter of the leftovers may be obtained in advance, and the actually detected reflectance parameter and the reflectance parameter of the leftovers may be compared.

In response to the recognition of the presence of the leftovers by the material recognizing device 107, the holding method specifying means 102 specifies the holding method according to the subsequent process. In other words, if leftovers are found on the dish, a holding method most suitable for the work of discarding the leftovers is selected, and if the leftovers are not found, the holding method most suitable for the work of placing the dish in the dishwasher is selected.

The holding device 103 holds the dish according to the holding method specified by the holding method specifying means 102.

Furthermore, the article holding system 12 according to the present embodiment may be used when specifying the holding position (positional coordinate) according to the state of the article as described in the first embodiment. In other words, when holding the plate served with food (foodstuff), the material recognizing device 107 uses the difference between the reflectance parameter of the food and the reflectance parameter of the dish to specify the region where the food is placed on the plate. In response to the specifying result, the holding method specifying means 102 may specify the region other than the food region among the entire region of the plate as the holdable region. The holding method specifying means 102 then specifies the holding method based on the recognized result of the recognizing device 101. This specification is performed using the database (e.g. of table format) shown in FIG. 30. The parameter estimation result based on the aforementioned (equation 1) may be used. First, the reflectance parameters $K_{dp}$, $K_{sp}$, $\sigma_p$ of the plate are acquired in advance. Next, the reflectance parameter at each point of the gripping object is estimated with the above described method. The reflectance parameters estimated in this manner is, $$\hat{K}_{dp}, \hat{K}_{sp}, \hat{\sigma}_p$$

If the estimated reflectance parameter is sufficiently close to the reflectance parameter of the plate, the relevant point is determined as the region of the plate, and the holding is performed with the relevant point as the holdable region. If the estimated reflectance parameter and the reflectance parameter of the plate greatly differ, the relevant point is determined as the food region, and holding is not performed thereat.

Furthermore, the article holding system 12 of the present embodiment is also effective when the electronic tag or the like are not attached to the article, and the holding method of the article is not obtained in advance. For example, when the electronic tag or the like are not attached to the cup, and the information (position (positional coordinate), shape, and orientation information) necessary for holding the cup are not obtained, the recognizing device 101 obtains the shape of the cup by using the stereo vision or the range finder. The material of the cup is recognized by the material recognizing device 107. Thus, the cup is specified as to, for example, whether made of glass, made of stainless steel, or made of paper.

The database storing the holding method (including torque information in holding) corresponding to each material as shown in FIG. 31 may be arranged in the article holding system 12, and the holding method specifying means 102 may select the holding method corresponding to the recognized material. The holding device 103 holds the cup according to the holding method specified by the holding method specifying means 102. Therefore, breakage caused by increasing the torque in excess when holding the cup made of glass, crushing when holding the paper cup, etc. are avoided, for example. In other words, holding is performed with the torque of less than or equal to a limiting torque $T_{Lg}$ in holding the cup made of glass, and with the torque of less than or equal to a limiting torque $T_{Lp}$ in holding the paper cup, thereby preventing the occurrence of the aforementioned defects.

Therefore, the state of the article is recognized by recognizing the material of the holding object, and the holding object can be held with the holding method most suitable for the relevant state.

Other Embodiments

In each of the above embodiments, the holding device 103 to 12 includes the recognizing device 101, but the recognizing device 101 may be arranged exterior to the article holding system 10 to 12. In this case, a holding system in which the recognizing device 101 and the article holding system 10 to 12 (robot 402) are connected to each other via wireless and/or wired network is configured, and the recognized result by the recognizing device 101 may be transmitted to the holding device via the network.

The article holding methods for the plurality of different holding objects, which are the holding objects, are stored in the database such as the holding method database, the different holding objects are articles having the same article ID information but different states such as shape, temperature, content, or amount of water, and thus the holding method differs as the state changes. The articles whose state such as the shape, the temperature, the content, the amount of water, or the like of the holding object are different, or the articles whose state such as the shape, the temperature, the content, the amount of water, or the like of the holding object change are articles having the same ID information but whose change cannot be obtained even by attaching the electronic tag, and include paper and crumpled paper, laundry before washing and folded laundry after washing, empty cup and cup with liquid, dry paper and wet paper.

The present invention is not limited to the above embodiments, and may be performed in various other aspects.

Figure 22:
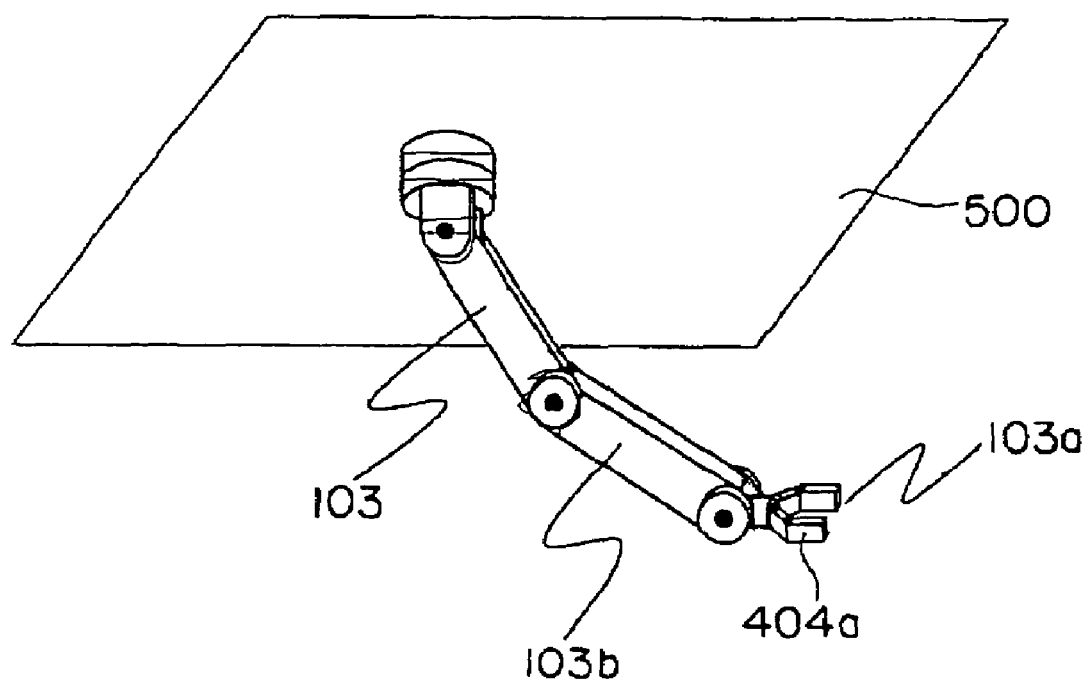
FIG. 22 is a view showing a robot without a movement device.

For example, the robot 402 may or may not include the movement device 414. FIG. 22 shows the holding device 103 including the arm 103b and the hand 103a of the robot without the movement device 414. The robot 402 is fixed to the ceiling 500 or the wall surface of the room, and itself cannot move. Such robot 402 is effective in a limited movement range such as cooking assistance in the kitchen or the like.

By properly combining the arbitrary embodiments of the aforementioned various embodiments, the effects possessed by the embodiments can be produced.

As described above, the present invention is effective in various robots, methods of controlling the robots, and article holding systems including the holding device, household supporting robot, cooking assistant robot, and the like used in the living space since wide variety of articles can be most suitably held by recognizing the state of the article and then holding the holding object with the holding method corresponding to the state even when the information necessary for holding cannot be obtained in advance, even when the information obtained in advance is no longer useful due to change in state, or even when setting of information necessary for holding with respect to each article in advance is difficult.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A robot comprising:
    a recognizing device for recognizing a condition of a holding object in a living space;
    a tag reader for obtaining ID information of the object stored in an electronic tag attached to the object;

a holding method database for storing different article holding methods according to conditions of the holding object, in association with the ID information;

an article holding method specifying means for specifying one article holding method out of different article holding methods, according to the ID information obtained by the tag reader and a form of the object as the condition recognized by the recognizing device; and a holding device for holding the holding object according to the article holding method specified by the article holding method specifying means, wherein article holding methods for a plurality of different holding objects as the holding object are stored in the holding method database, the different holding objects are articles having same article ID information and having different forms of temperature or content, and the article holding methods are stored so that the holding method differs as the form of the article changes.

2. The robot according to claim 1, wherein the holding object is an article whose form including shape, temperature, and content changes;

the recognizing device recognizes the form of the holding object as the condition of the holding object; and the article holding method specifying means specifies the one article holding method out of the different article holding methods in the holding method database according to the form serving as the condition recognized by the recognizing device.

3. The robot according to claim 1, wherein the recognizing device recognizes the condition of the holding object that changes with respect to time.

4. The robot according to claim 3, wherein the holding object is an article capable of accommodating an object inside;

the recognizing device recognizes whether or not the object is accommodated inside the holding object; and the article holding method specifying means specifies the one article holding method out of the different article holding methods, according to a condition of whether or not the object is accommodated inside the holding object recognized by the recognizing device.

5. The robot according to claim 4, wherein the holding object has light transmissive property;

the recognizing device recognizes whether or not the object is accommodated inside the holding object using refraction of light at the holding object; and the article holding method specifying means specifies the one article holding method out of the different article holding methods, according to the condition of whether or not the object is accommodated inside the holding object recognized by the recognizing device.

6. The robot according to claim 3, wherein the holding object is paper or clothes.

7. The robot according to claim 3, wherein the recognizing device recognizes whether or not an object is placed on the holding object; and the article holding method specifying means specifies the one article holding method out of the different article holding methods, according to a condition of whether or not the object is placed on the holding object recognized by the recognizing device.

8. The robot according to claim 7, wherein the holding object is a dish.

9. The robot according to claim 1, wherein the recognizing device recognizes a temperature distribution of the holding object; and the article holding method specifying means specifies the one article holding method out of the different article holding methods, according to a condition of the temperature distribution of the holding object recognized by the recognizing device.

10. The robot according to claim 9, wherein the holding object is cooking equipment or dish; and the holding method specifying means specifies a holding position of the cooking equipment or the dish based on a temperature distribution of the cooking equipment or the dish recognized by the recognizing device.

11. The robot according to claim 1, wherein a holding method set in advance for each of articles is stored in the holding method database;

the holding method specifying means selects the holding method of the holding object from the holding methods set in advance in the holding method database with reference to recognized result of the recognizing device; and the holding method specifying means further selects the holding method set for an article having material or shape close to the holding object from the holding method database and sets the selected holding method as the holding method of the holding object when the holding method corresponding to the recognized result is not set in advance in the holding method database.

12. The robot according to claim 1, wherein the recognizing device recognizes a material of the holding object; and the article holding method specifying means specifies the one article holding method from different article holding methods, according to the material of the holding object recognized by the recognizing device.

13. The robot according to claim 12, wherein the recognizing device includes, an image-taking device for imaging the holding object; and a material recognizing means for recognizing the material using an optical property of the holding object based on the image imaged by the image-taking device.

14. The robot according to claim 13, further comprising a light source for irradiating light to the holding object; wherein the material recognizing means recognizes the material using a reflectance property of the holding object.

15. The robot according to claim 14, wherein the light source is arranged so that a position with respect to the holding object is changeable;

the image-taking device images a plurality of images by changing the position of the light source; and the material recognizing means recognizes the material of the holding object by processing the plurality of images.

16. An article holding system for holding a holding object in a living space, the holding system comprising:

a recognizing device for recognizing a condition of the holding object in the living space; and a robot for holding the holding object based on recognized result of the recognizing device; wherein the robot includes, a tag reader for obtaining ID information of the object stored in an electronic tag attached to the object;

a holding method specifying means for specifying a, holding method corresponding to the ID information obtained by the tag reader and a form of the object as the condition recognized by the recognizing device, out of different article holding methods according to conditions of the holding object, in association with the ID information, with the different article holding methods being stored in a holding method database; and a holding device for holding the holding object according to the holding method specified by the holding method specifying means, wherein article holding methods for a plurality of different holding objects as the holding object are stored in the holding method database, the different holding objects are articles having same article ID information and having different forms of temperature of content, and the article holding methods are stored so that the holding method differs as the form of the article changes.

17. The article holding system according to claim 16, wherein the holding device is a holding system mounted on the robot.

18. A robot comprising:

a recognizing device in which ID information and shape information for holding object stored in an electronic tag attached to a holding object in a living space, is obtained as article data by a tag reader and the shape information is obtained as article attribute data by an image-taking device, for recognizing, as a form of the holding object, whether or not a shape of the holding object is changed by comparing the shape information of the article data and the shape information of the article attribute data with each other;

a holding method database for storing different article holding methods according to forms of the holding object, in association with the ID information;

an article holding method specifying means for specifying one article holding method out of different article holding methods, according to the form recognized by the recognizing device, in association with the ID information; and a holding device for holding the holding object with reference to the article holding method specified by the article holding method specifying means.

19. An article holding system for holding a holding object in a living space, the holding system comprising:

a recognizing device in which ID information and shape information for holding object stored in an electronic tag attached to a holding object in a living space, is obtained as article data by a tag reader and the shape information is obtained as article attribute data by an image-taking device, for recognizing, as a form of the holding object, whether or not a shape of the holding object is changed by comparing the shape information of the article data and the shape information of the article attribute data with each other; and a robot for holding the holding object based on recognized result of the recognizing device; wherein the robot includes, an article holding method specifying means for specifying one article holding method out of different article holding methods, according to the form recognized by the recognizing device, in association with the ID information, with different article holding methods according to the form of the holding object, in association with the ID information being stored in a holding method database; and a holding device for holding the holding object with reference to the article holding method specified by the article holding method specifying means.

20. A method of controlling a robot for holding a holding object in a living space using a holding device of the robot; the method comprising of:

recognizing a condition of a holding object in the living space;

obtaining, by a tag reader, ID information of the object stored in an electronic tag attached to the object;

specifying one article holding method out of different article holding methods, according to the ID information obtained by the tag reader and a form of the object as the recognized condition, with the different article holding methods according to conditions of the holding object, in association with the ID information, being stored in a holding method database; and holding the holding object with the holding device according to the specified article holding method, wherein article holding methods for a plurality of different holding objects as the holding object are stored in the holding method database, the different holding objects are articles having same article ID information and having different forms of temperature or content, and the article holding methods are stored so that the holding method differs as the form of the article changes.

* * * * *

UNITED STATES PATENT AND TRADEMARK OFFICE
CERTIFICATE OF CORRECTION

| | | |
|---|---|---|
| PATENT NO. | : 7,706,918 B2 | Page 1 of 1 |
| APPLICATION NO. | : 11/653470 | |
| DATED | : April 27, 2010 | |
| INVENTOR(S) | : Satoshi Sato et al. | |

It is certified that error appears in the above-identified patent and that said Letters Patent is hereby corrected as shown below:

In column 48, line 60, claim 16, "for specifying a, hold-" should read -- for specifying a hold- --

Signed and Sealed this
Fourth Day of January, 2011

David J. Kappos
*Director of the United States Patent and Trademark Office*